(12) United States Patent
Suzuki

(10) Patent No.: US 7,394,815 B1
(45) Date of Patent: Jul. 1, 2008

(54) MINIMUM BANDWIDTH GUARANTEE FOR CROSS-POINT BUFFER SWITCH

(75) Inventor: Hiroshi Suzuki, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 910 days.

(21) Appl. No.: 10/640,925

(22) Filed: Aug. 14, 2003

Related U.S. Application Data

(63) Continuation of application No. 09/348,133, filed on Jul. 2, 1999, now Pat. No. 6,625,160.

(51) Int. Cl.
*H04L 12/56* (2006.01)

(52) U.S. Cl. .................. 370/395.41; 370/415; 370/468

(58) Field of Classification Search ............ 370/395.41, 370/415, 468
See application file for complete search history.

(56) References Cited

U.S. PATENT DOCUMENTS

| | | | | |
|---|---|---|---|---|
| 5,455,825 A | * | 10/1995 | Lauer et al. ................ | 370/413 |
| 5,517,495 A | * | 5/1996 | Lund et al. ................ | 370/399 |
| 5,748,629 A | * | 5/1998 | Caldara et al. ............. | 370/389 |
| 5,790,522 A | * | 8/1998 | Fichou et al. .............. | 370/236 |
| 5,790,545 A | * | 8/1998 | Holt et al. .................. | 370/398 |
| 5,946,297 A | * | 8/1999 | Calvignac et al. .......... | 370/230 |
| 5,982,771 A | * | 11/1999 | Caldara et al. ............. | 370/389 |
| 5,996,019 A | * | 11/1999 | Hauser et al. .............. | 709/235 |
| 6,324,165 B1 | * | 11/2001 | Fan et al. ................... | 370/232 |
| 6,359,861 B1 | * | 3/2002 | Sui et al. ................... | 370/230 |
| 6,456,592 B1 | * | 9/2002 | Vishnu et al. .............. | 370/232 |
| 6,532,234 B1 | * | 3/2003 | Yoshikawa et al. ....... | 370/395.4 |
| 6,628,609 B2 | * | 9/2003 | Chapman et al. ........... | 370/229 |
| 6,661,788 B2 | * | 12/2003 | Angle et al. ................ | 370/390 |
| 7,027,457 B1 | * | 4/2006 | Chiussi et al. ............. | 370/414 |

* cited by examiner

*Primary Examiner*—Alpus H. Hsu
(74) *Attorney, Agent, or Firm*—Campbell Stephenson LLP

(57) ABSTRACT

A method and system for use in data communications. The method and system substantially ensure that actual data transmission per unit time from at least one cross-point buffer switch ingress to at least one cross-point buffer switch egress substantially satisfies a designated target amount of actual data transmission per unit time.

41 Claims, 42 Drawing Sheets

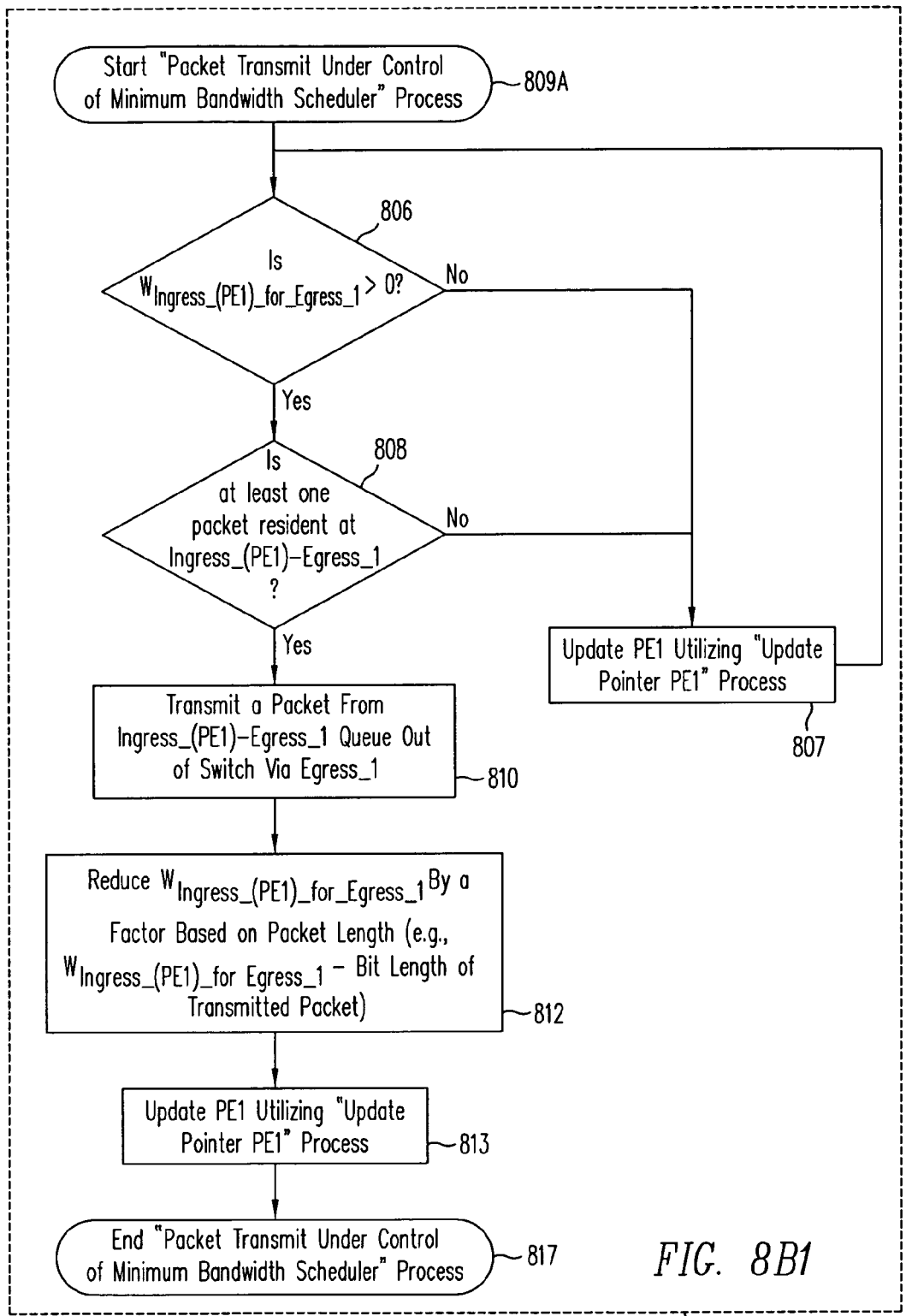
FIG. 8B1
Packet Transmit Under Control of Guaranteed Minimum Bandwidth Scheduler

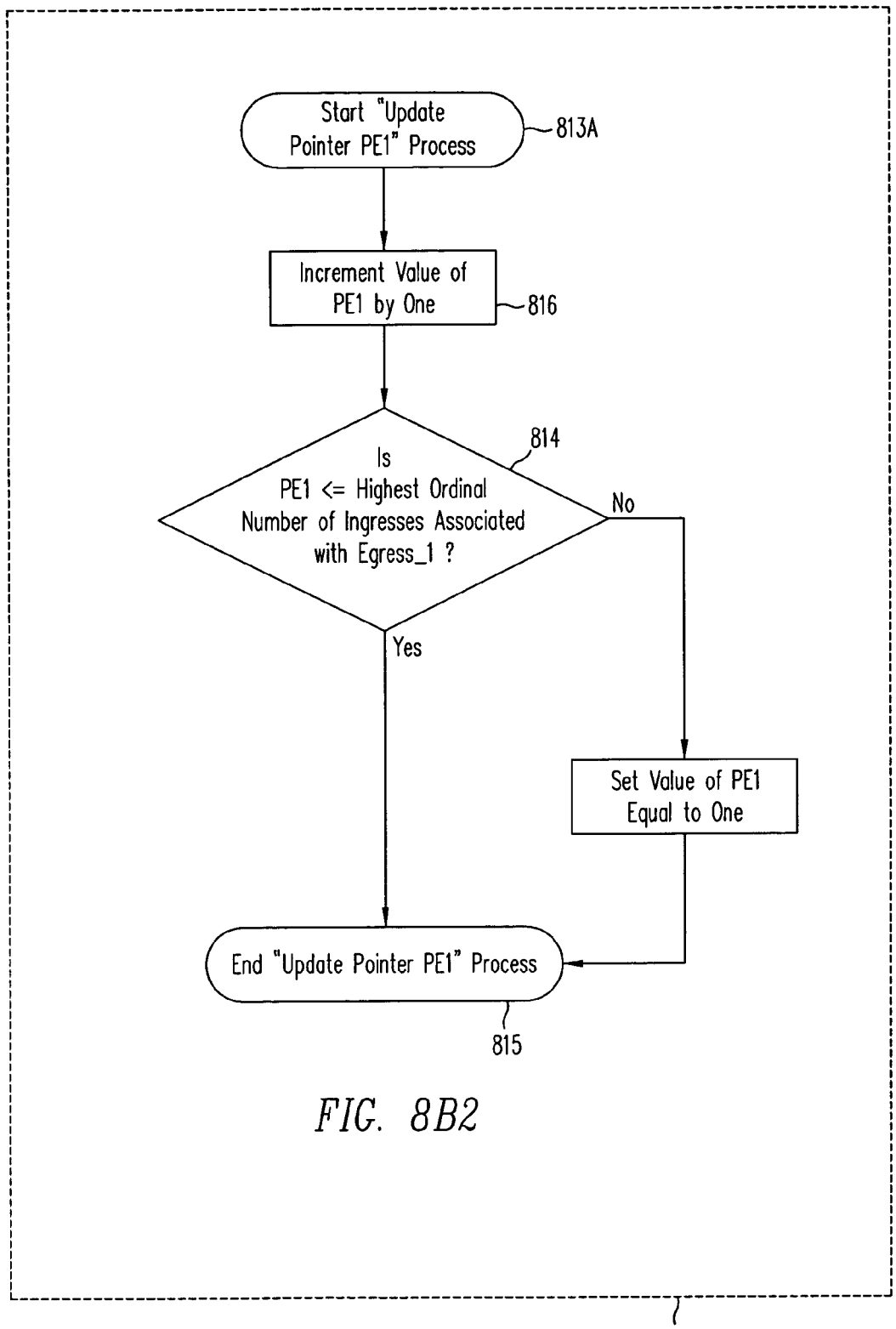
FIG. 8B2
Packet Transmit Under Control of
Guaranteed Minimum Bandwidth Scheduler

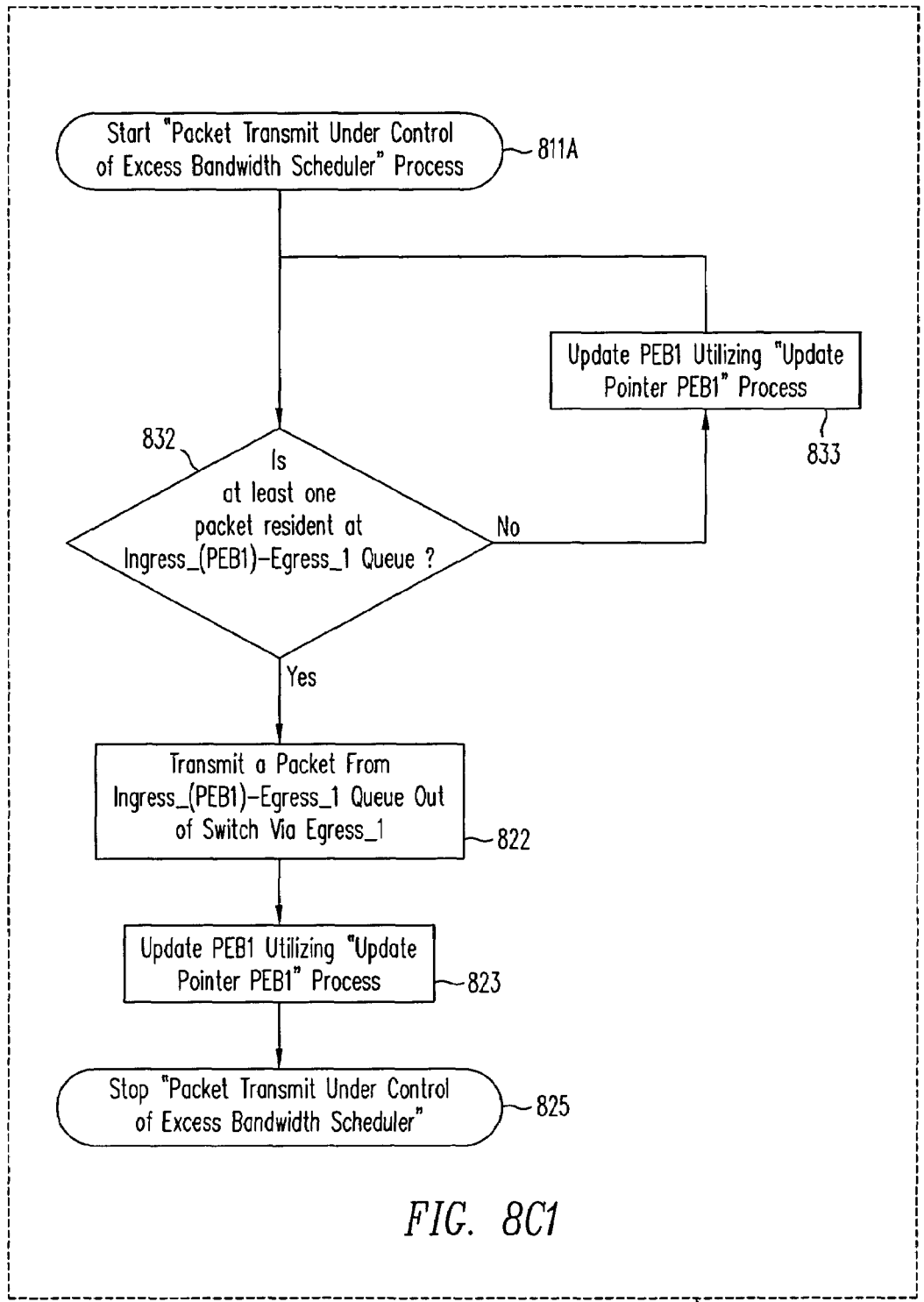
FIG. 8C1
Packet Transmit by Excess Bandwidth Scheduler

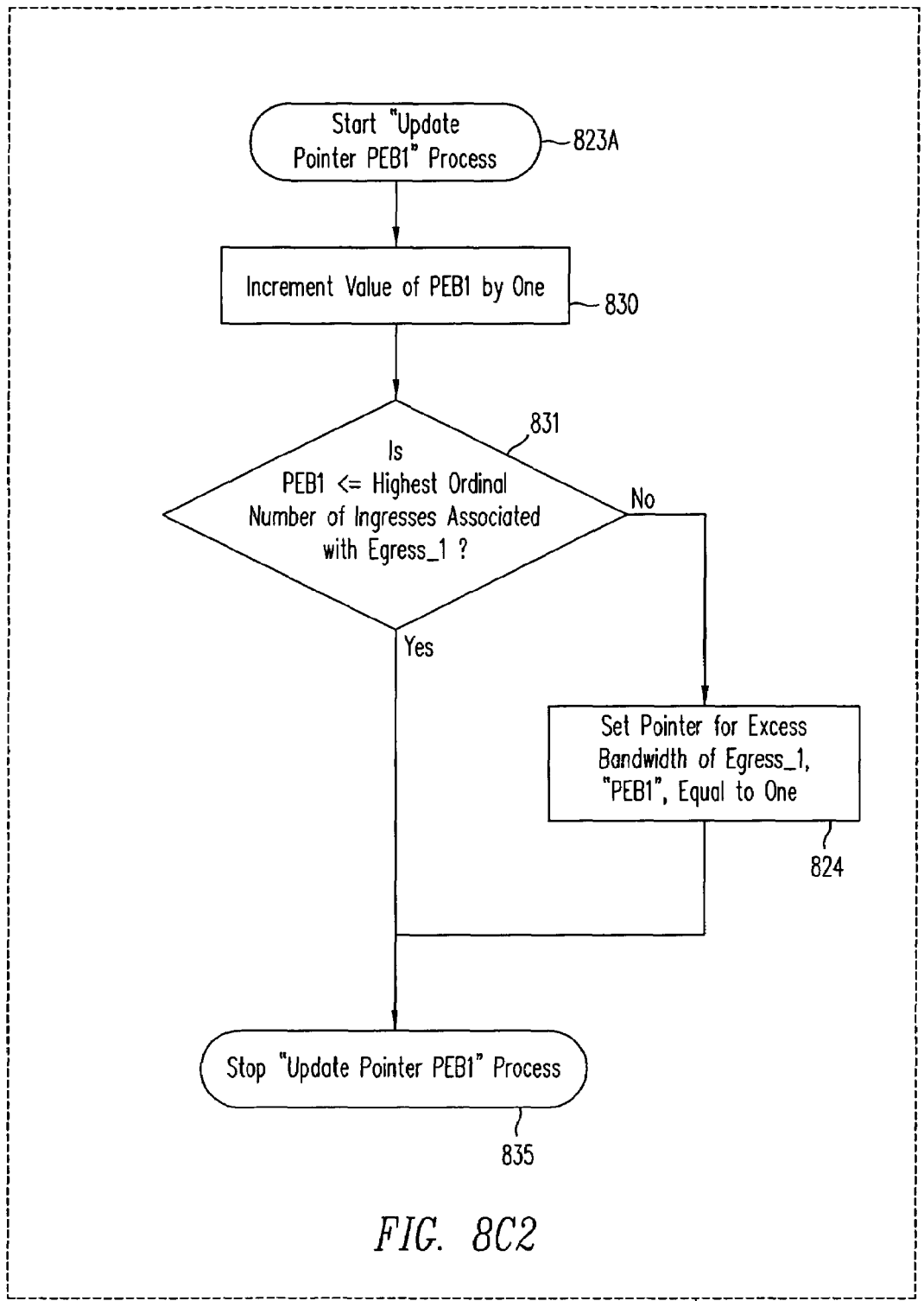
FIG. 8C2

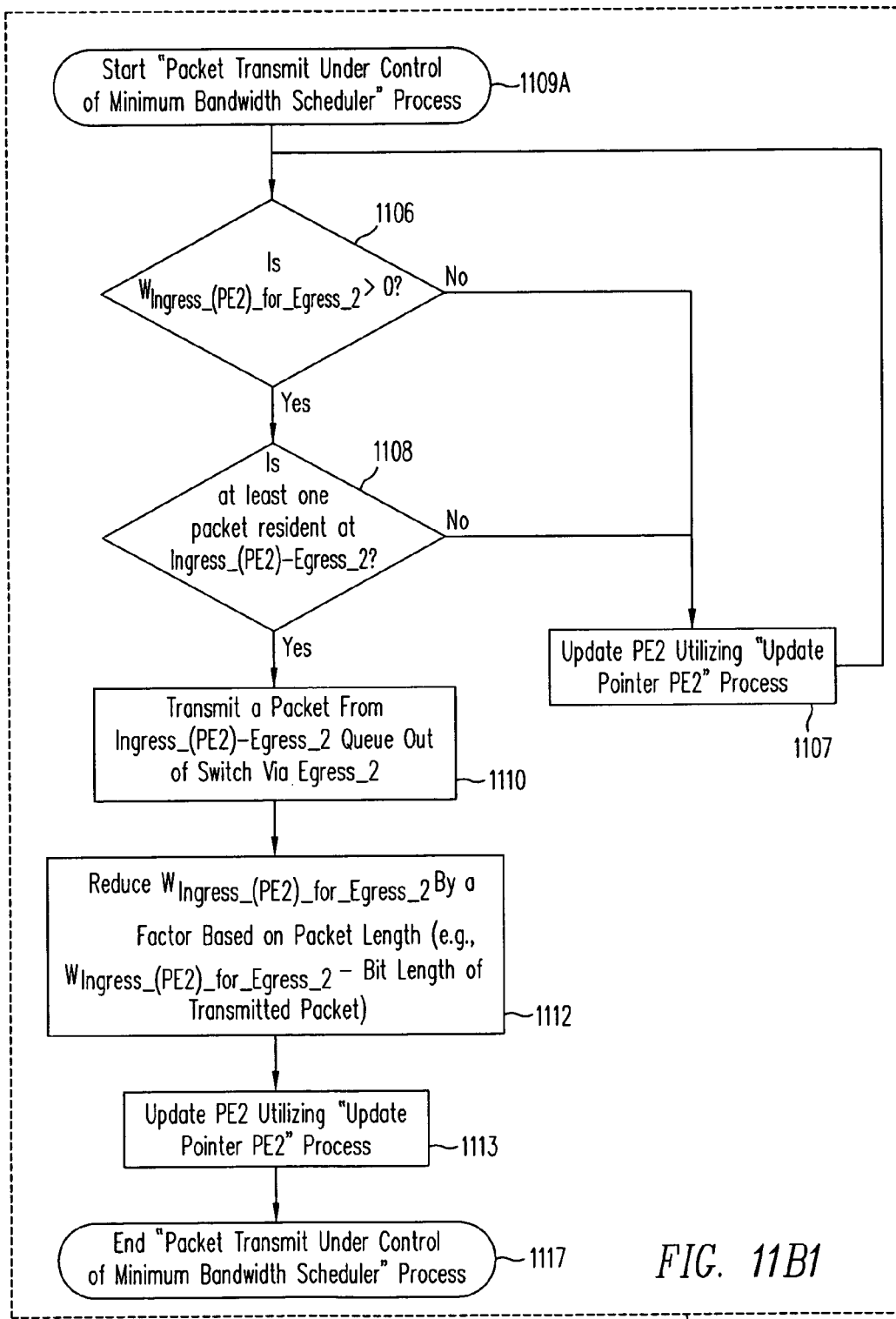
FIG. 11B1
Packet Transmit Under Control of Guaranteed Minimum Bandwidth Scheduler

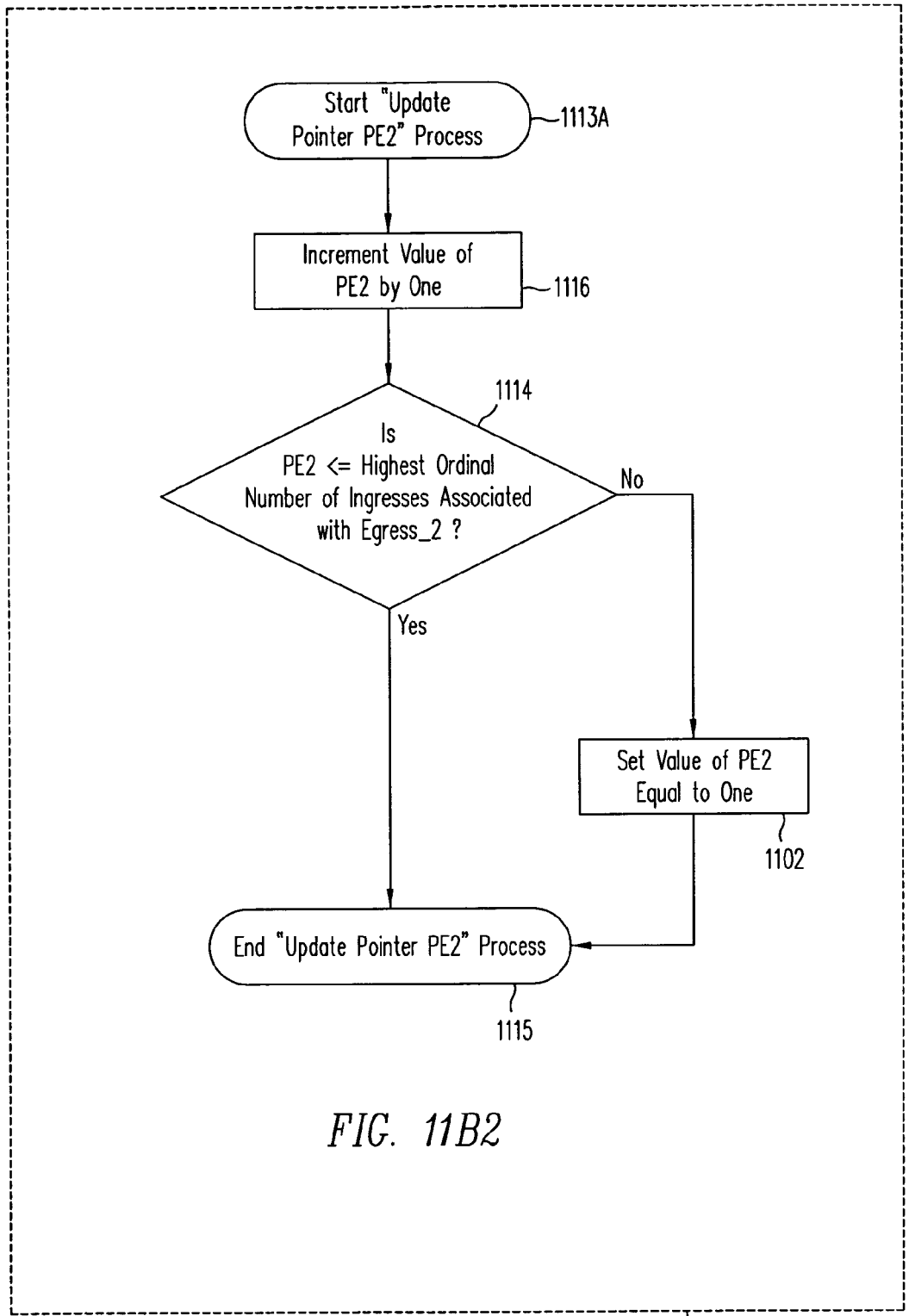
FIG. 11B2
Packet Transmit Under Control of
Guaranteed Minimum Bandwidth Scheduler

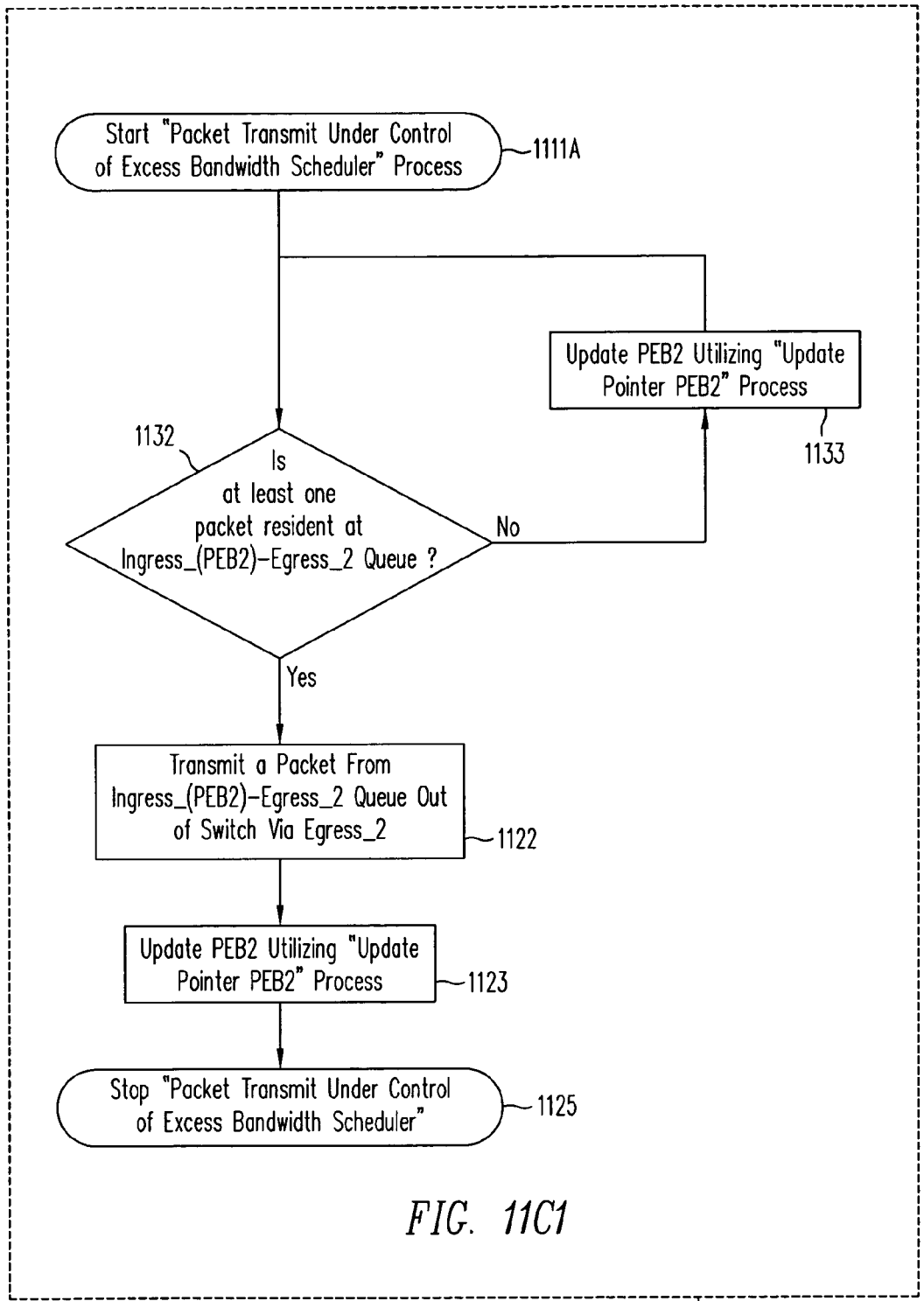
FIG. 11C1
Packet Transmit by Excess Bandwidth Scheduler

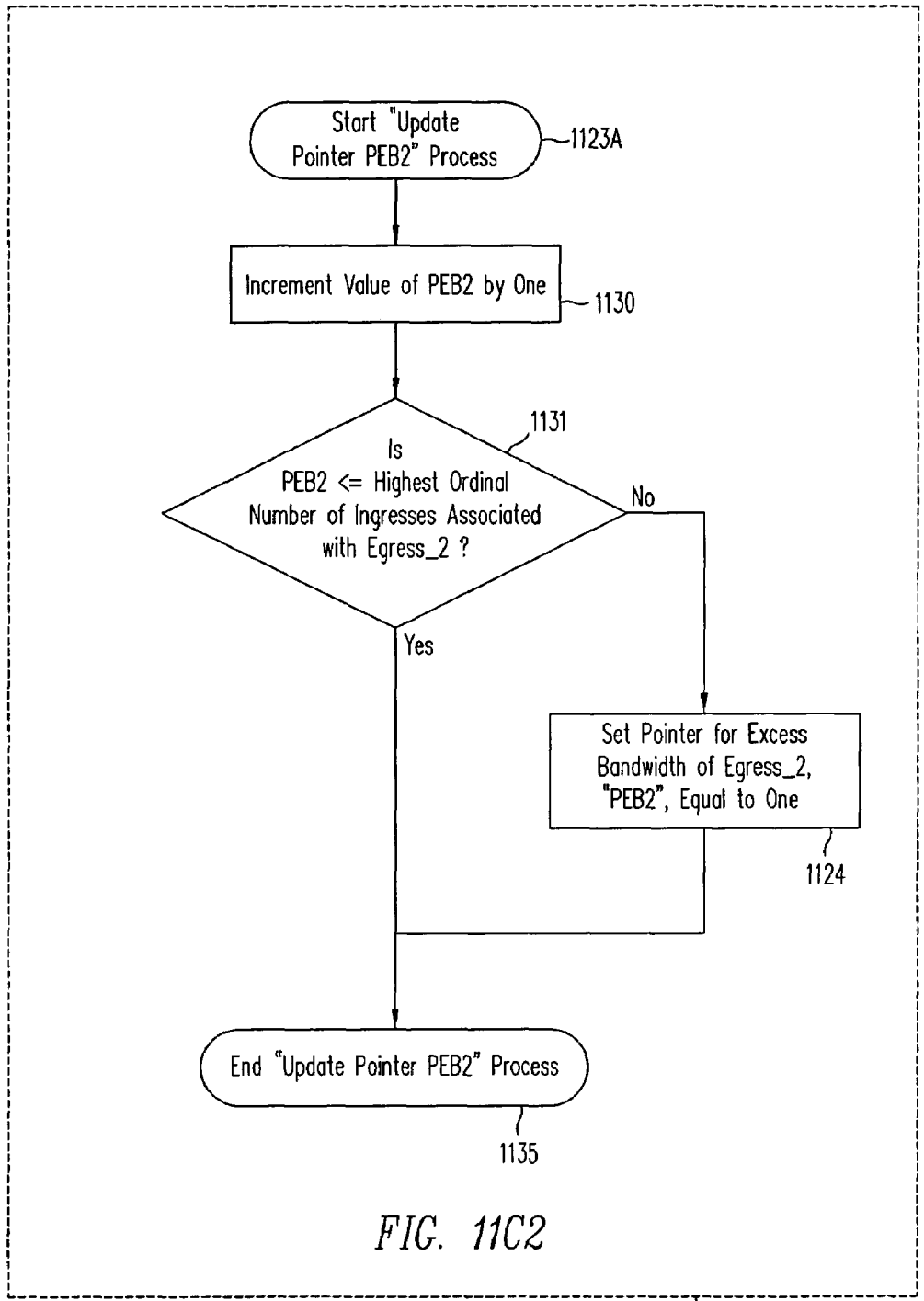
FIG. 11C2
Packet Transmit by Excess Bandwidth Scheduler

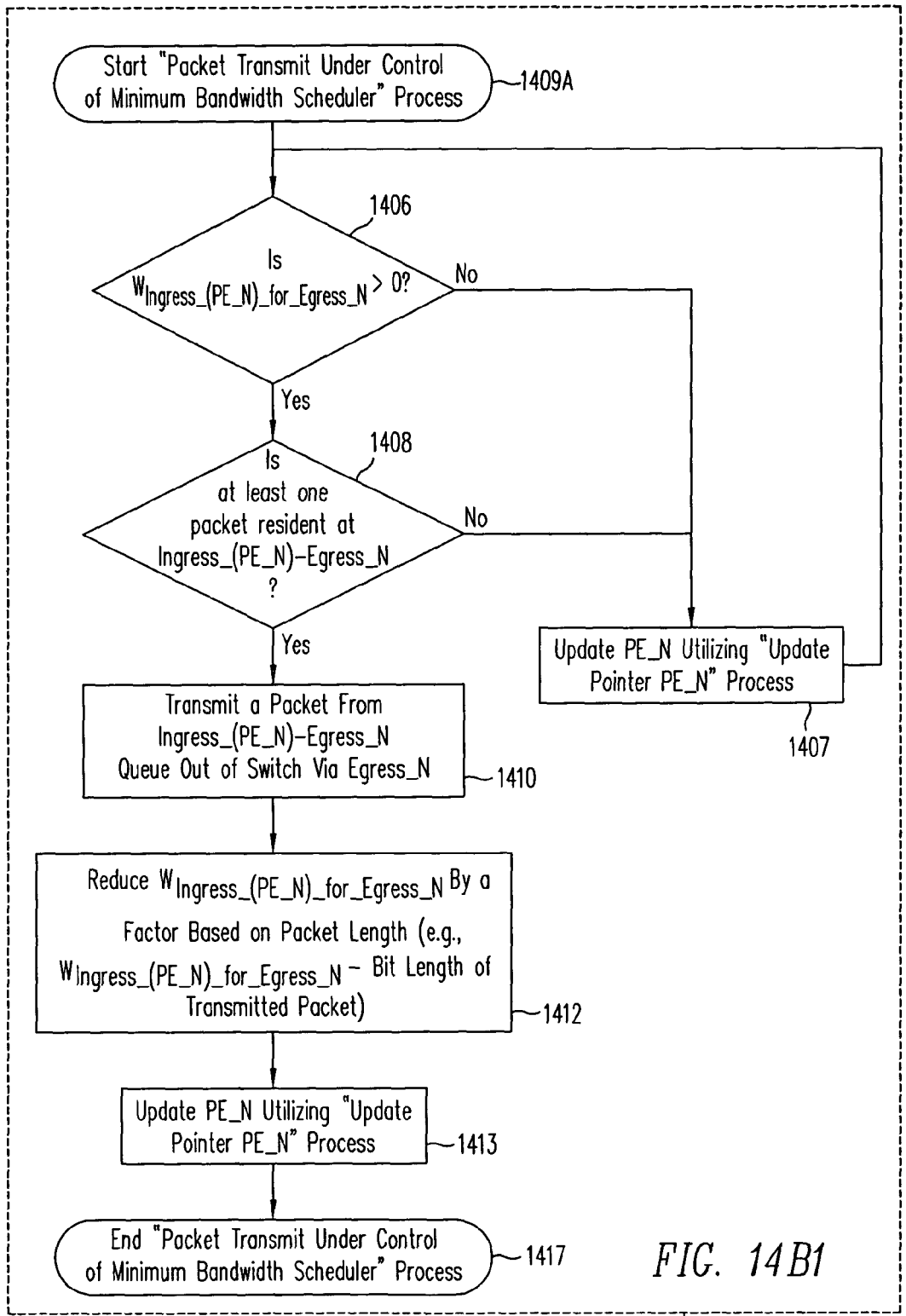
FIG. 14B1
Packet Transmit Under Control of Guaranteed Minimum Bandwidth Scheduler

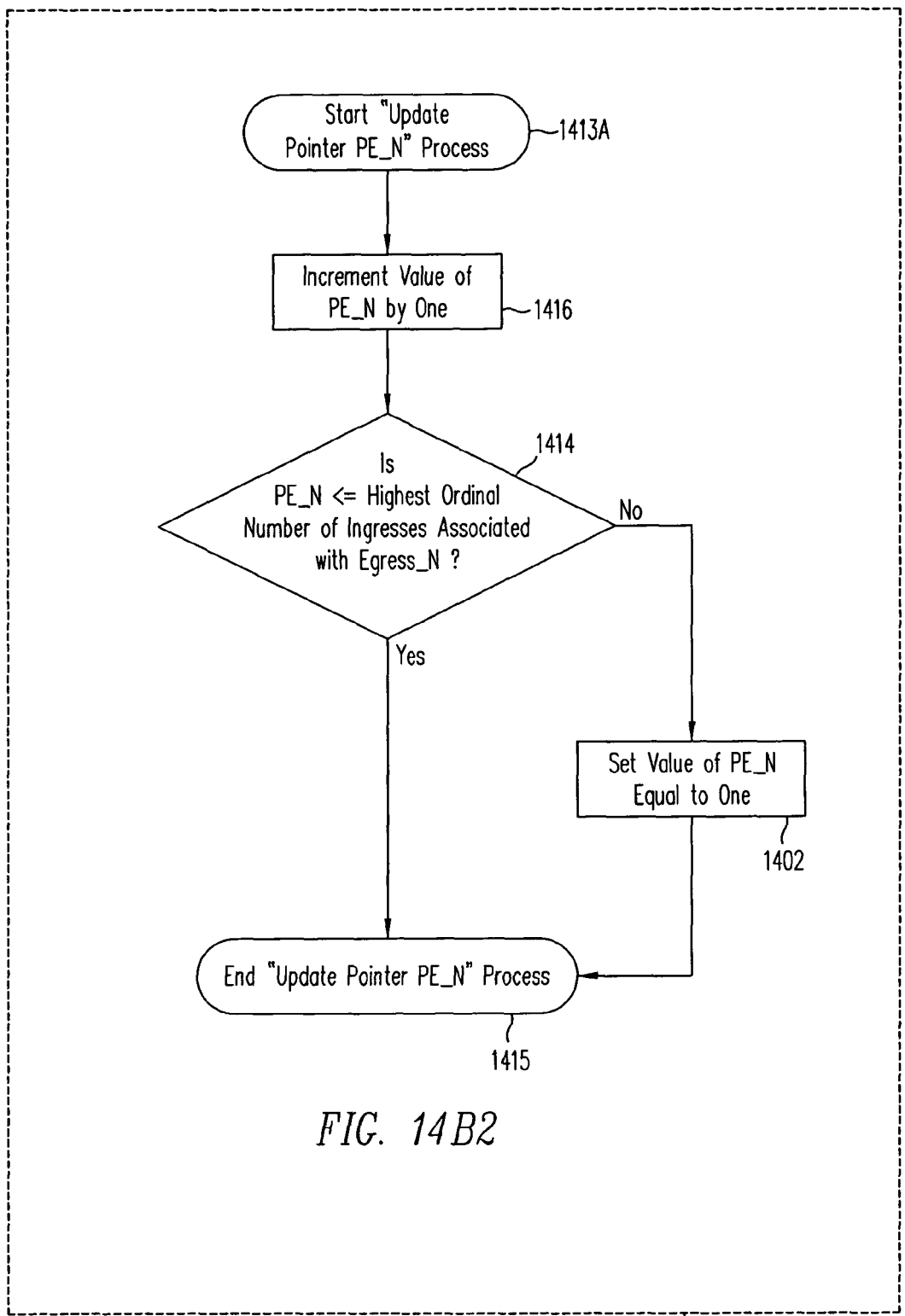
FIG. 14B2
Packet Transmit Under Control of
Guaranteed Minimum Bandwidth Scheduler

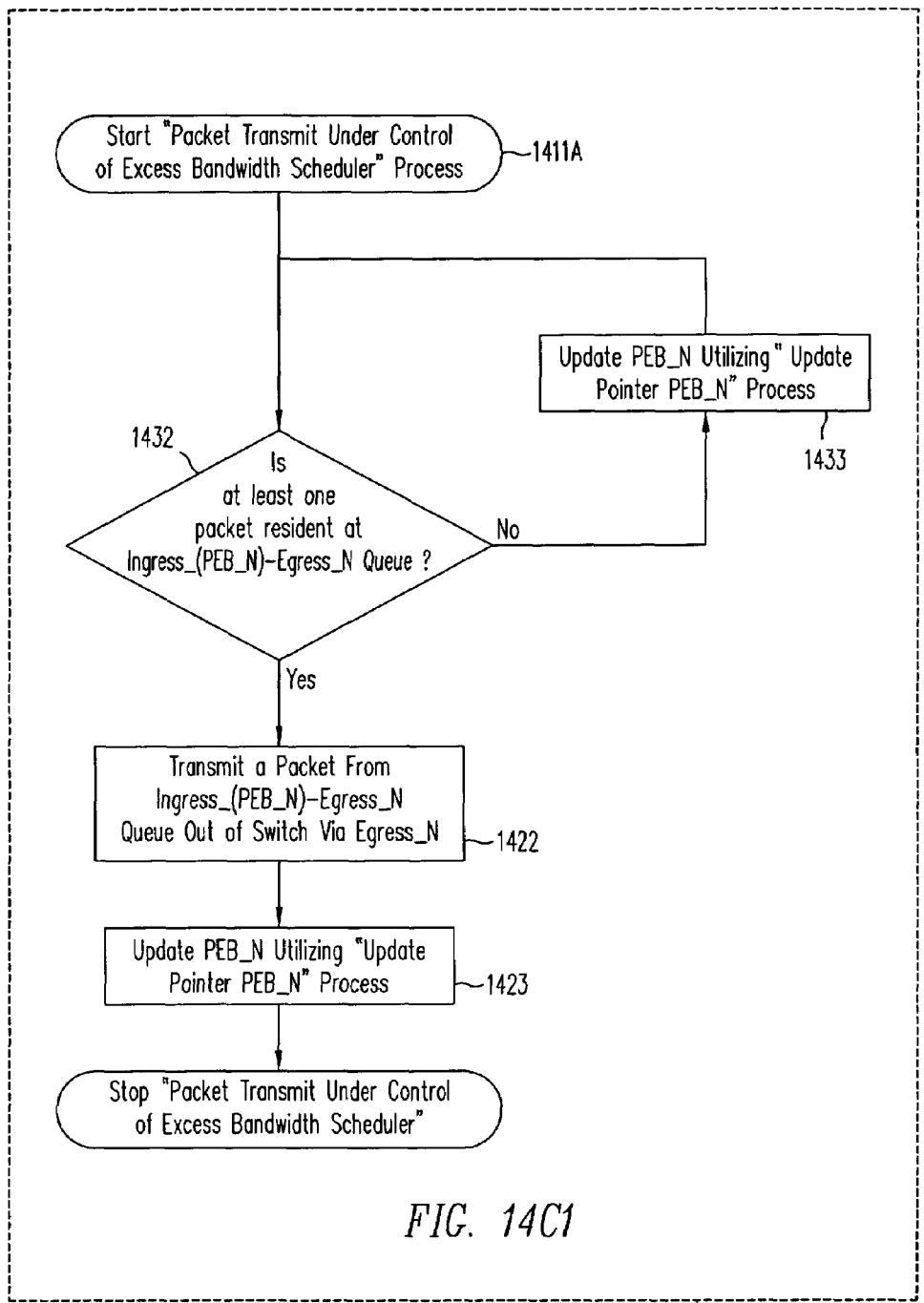
FIG. 14C1
Packet Transmit by Excess Bandwidth Scheduler

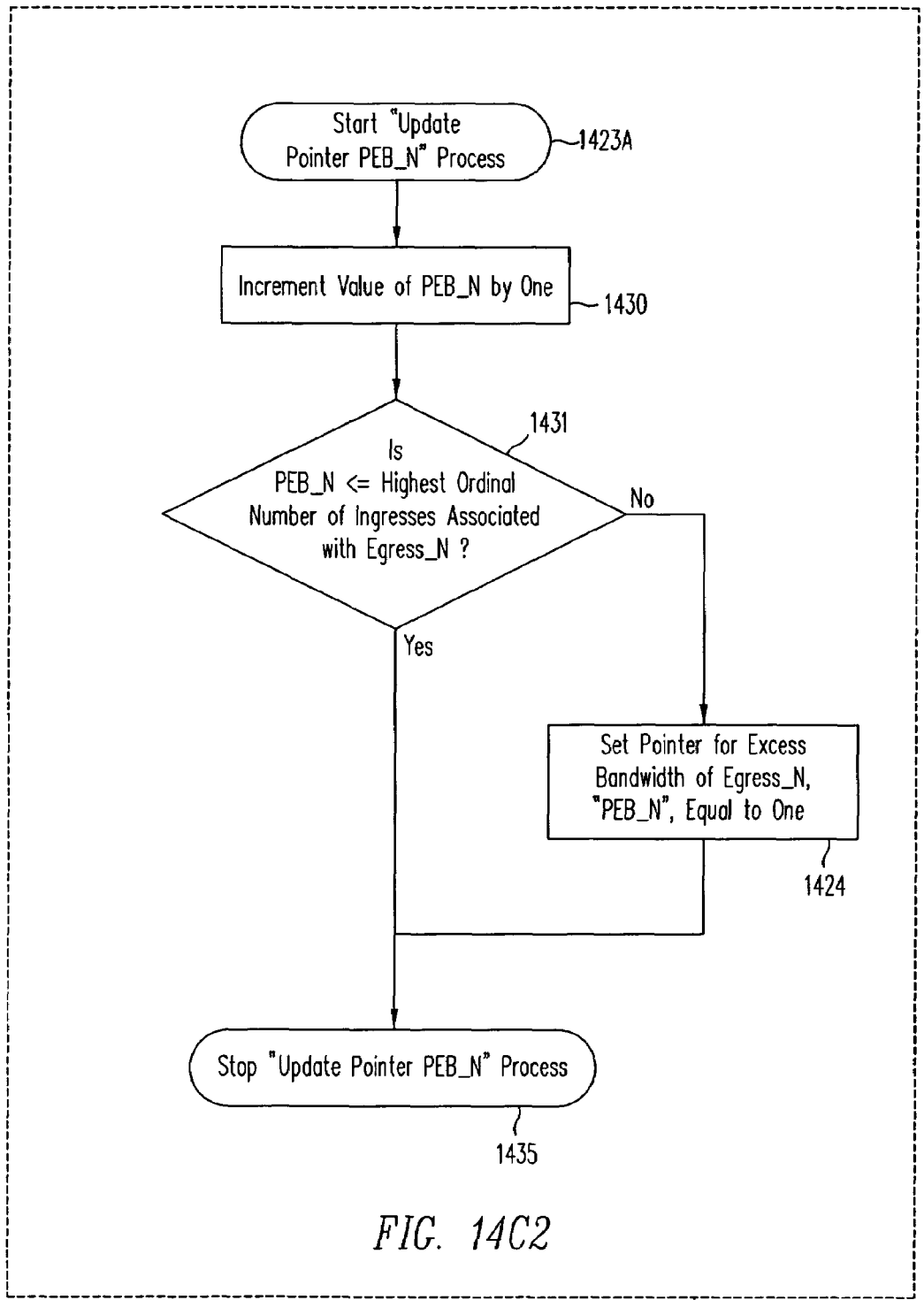
FIG. 14C2
Packet Transmit by Excess Bandwidth Scheduler

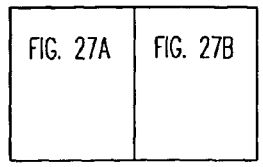

Key To
*FIG. 27*

Start "Ingress Queue-Egress Connection Schedulers (One at each Egress) Utilize Candidate Ingress Queue-Egress Physical Connections Matrix, Resolve any Contentions Arising from More Than One Egress Scheduled to Connect to the Same Ingress, and Build Granted Ingress Queue-Egress Physical Connections Matrix for Each Egress" Process

2002A

2706

Build Granted Ingress Queue-Egress Physical Connections Matrix: Set Granted Ingress Queue-Egress Physical Connections Matrix [row i; column e = 1 to E] Equal to zero (i.e., make row corresponding to Ingress_i all zeros since there are no candidates associated with Ingress_i)

2710

Update Value Held Within PI_i

Does i = I, where I is the Highest Ordinal Number of Ingresses?

No — 2716 — Yes

Stop "Ingress Queue-Egress Connection Schedulers (One at each Egress) Utilize Candidate Ingress Queue-Egress Physical Connections Matrix, Resolve any Contentions Arising from More Than One Egress Scheduled to Connect to the Same Ingress, and Build Granted Ingress Queue-Egress Physical Connections Matrix for Each Egress" Process

*FIG. 27B*        2002B

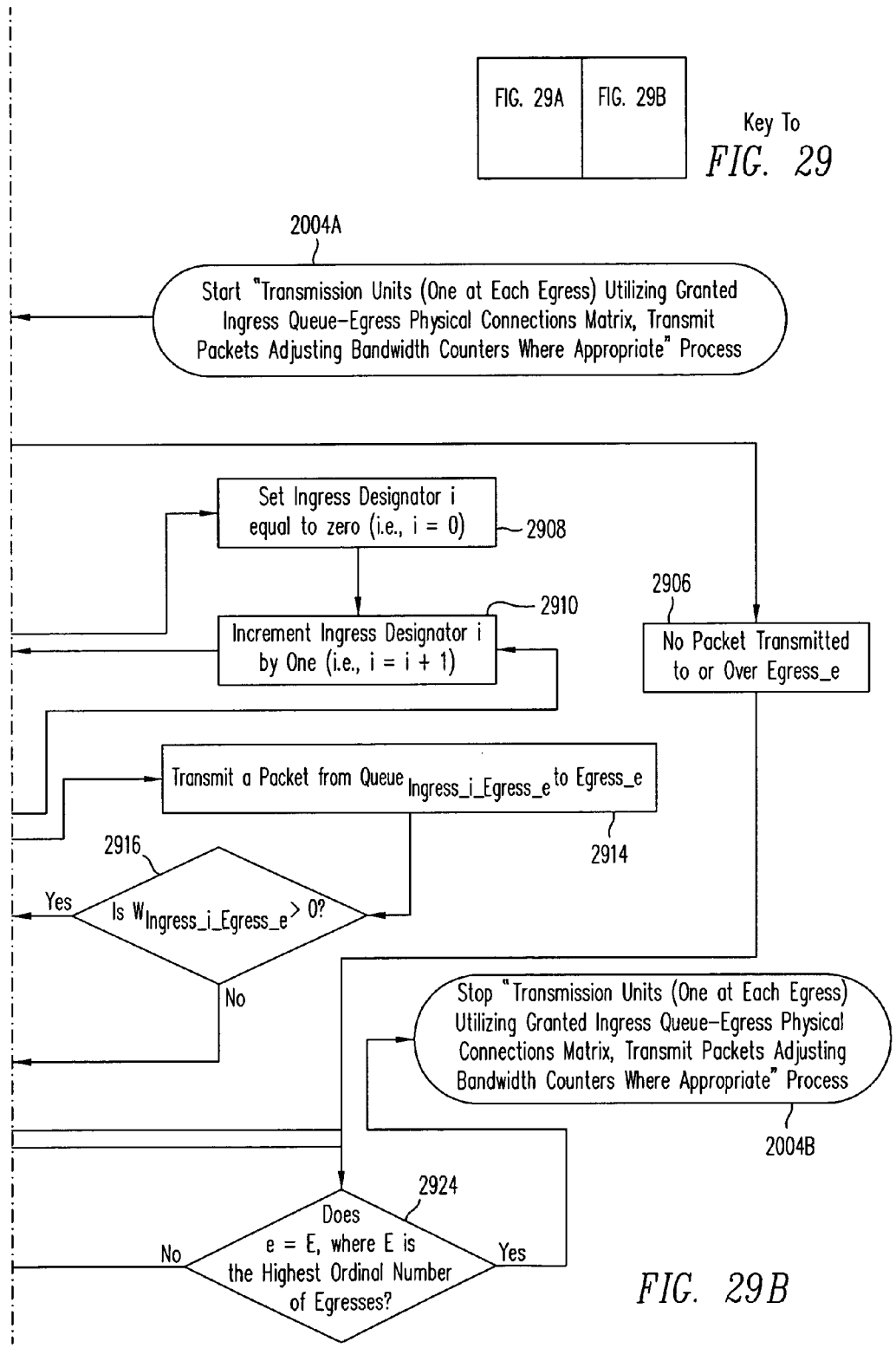

MINIMUM BANDWIDTH GUARANTEE FOR CROSS-POINT BUFFER SWITCH

This application is a continuation of, and claims the benefit of priority based on, U.S. patent application Ser. No. 09/348,133 entitled "Minimum Bandwidth Guarantee For Cross-Point Buffer Switch" filed Jul. 2, 1999, now U.S. Pat. No. 6,625,160, and naming Hiroshi Suzuki as the inventor. The above-referenced application is hereby incorporated by reference herein in its entirety.

CROSS-REFERENCE

The present invention is related to subject matter disclosed in the following application:
 1. United States patent application entitled, "Minimum Bandwidth Guarantee For Input-Buffered Packet Switch", Ser. No. 09/348,134, naming Hiroshi Suzuki as the inventor, filed Jul. 2, 1999, and incorporated by reference herein in its entirety.

BACKGROUND OF THE INVENTION

1. Field of the Invention

The present invention is related to a method and system to be utilized in data communications. In particular, the present invention is related to a method and system to be utilized in data communications involving at least one data communications network.

2. Description of the Related Art

Data communications is the transfer of data from one or more sources to one or more sinks that is accomplished (a) via one or more data links between the one more sources and the one or more sinks (b) according to a protocol. A data link is the means of connecting communications facilities or equipment at one location to communications facilities or equipment at another location for the purpose of transmitting and receiving data. A protocol, in communications, computer, data processing, and control systems, is a set of formal conventions that govern the format and control the interactions between at least two communicating functional elements in order to achieve efficient and understandable communications. Examples of protocols are Internet Protocol (IP) and Asynchronous Transfer Mode (ATM) protocol.

A data communications network is the interconnection of three or more communicating entities (i.e., data sources and/or sinks) over one or more data links. A data communications network connects and allows communication between multiple data sources and multiple data sinks over one or more data links. The concept of a data link includes the media connecting the one or more data sources to one or more data sinks, as well as the data communications equipment utilizing the media. The data communications networks utilize protocols to control the interactions between data sources and sinks communicating over the one or more data links. Thus, it follows that such protocols must take into account the data communications requirements of data sources and sinks desiring communication over the one or more data links.

Referring now to FIG. 1, shown is a partially-schematic diagram of a related art data communications network. Depicted are six data sources/sinks: data source/sink A 100, data source/sink B 102, data source/sink C 104, data source/sink D 106, data source/sink E 108, and data source/sink F 110. The depicted six data sources/sinks are connected by/through data communications network 112. Illustrated is that data communications network 112 is composed of numerous data communications links 150-184 and network nodes 116-128. Shown is that within each network node 116-128 resides crossbar switches 130-142, respectively.

Historically, each crossbar switch 130-142, was a switch that had a number of vertical paths, a number of horizontal paths, and electromagnetic-operated mechanical devices, i.e., electromechanical relays, for interconnecting any one of the vertical paths with any one of the horizontal paths. (While the foregoing is historically truth those skilled in the art will recognize that the logical functions of crossbar switches are generally performed using combinational circuits; however, the term "crossbar" switch has been retained for such combinational circuits even though such circuits typically no longer actually utilize a true physical "crossbar.") Thus, the electromagnetic-operated mechanical devices within each crossbar switch 130-142 can be utilized to interconnect at least one data communications link on one side of any particular crossbar switch to at least one data communications link on the other side of the particular crossbar switch. For example, crossbar switch 130 internal to network node 116 contains circuitry sufficient to connect any one of data communications links 150-154 with any one of data communications links 156-162. Likewise, crossbar switch 136 internal to network node 122 contains circuitry sufficient to connect any one of data communications link 163, 166, 170 with any one of data communications links 174-176. The same holds true for the other crossbar switches depicted in FIG. 1.

When data communications is desired between any two data sources/sinks (e.g., data source/sink A 100 with data source/sink D 106, data source/sink B 102 with data source/sink F 100, or data source/sink C 104 with data source/sink E 108) appropriate crossbar switches 130-142 can be utilized to establish hardwire paths between the data source/sink pair. At present, there are two basic ways in which crossbar switches 130-142 can be utilized to establish a communications path through data communications network 112: (1) by use of what is known in the art as "circuit switching"; and (2) by use of what is known in the art as "packet switching." The present invention is related to crossbar switches in packet-switched networks. However, before packet-switched networks are discussed, the functioning of crossbar switches in a circuit-switched network is discussed because discussing the functioning of crossbar switches in a circuit switched network serves as a good introduction to discussing the functioning of crossbar switches in packet-switched networks.

Referring now to FIG. 2, shown are three "circuit switched" paths which are used to introduce the functioning of crossbar switches. In what is known in the art as "circuit switching," an actual physical circuit is established between each data source/sink pair. Depicted in FIG. 2 is circuit switched path 1 connecting data source/sink A 100 with data source/sink D 106. Illustrated is that circuit switched path 1 is composed of data communications link 150-network node 116-data communications link 162-network node 126-data communications link 178-network node 124-data communications link 170-network node 122-data communications link 174. With respect to circuit switched path 1, shown is that crossbar switch 130 connects data communications link 150 with data communications link 162, crossbar switch 140 connects data communications link 162 with data communications link 178, crossbar switch 138 connects data communications link 178 with data communications link 170, crossbar switch 136 connects data communications link 170 with data communications link 174. Also depicted is circuit switched path 2 connecting data source/sink B 102 with data source/sink F 110. Circuit switched path 2, and each of the depicted components making up circuit switched path 2, functions in a manner similar to that described in relation circuit switched path 1. Further depicted is circuit switched path 3 connecting data source/sink C 104 with data source/sink E 108. Circuit switched path 3, and each of the depicted components making up circuit switched path 3, also functions in a manner similar to that described in relation circuit switched path 1.

Referring now to FIG. 3, shown is the use of "packet switching" to transmit data through data network 112, and how crossbar switches are utilized in a packet-switched network. In what is known in the art as "packet switching," data to be transmitted between each data source/sink pair is encapsulated in a "packet" which, in data communications, is a sequence of binary digits that (a) includes data, control signals, and possibly error control signals, and (b) is arranged in a specific format, such as a header part and data part, wherein the header part generally contains information indicative of the source and destination of the data part of the packet (thus, as used, the term "packet" includes all such unitized data, such as, for example IP packets or ATM cells. Whereas in circuit switching, crossbar switches 130-142 were keyed to and switched, or controlled, upon the basis of a circuit to be established throughout data communications network 112 throughout the duration of a call, in "packet switching" crossbar switches 130-142 are keyed to, and switched upon, the basis of header information (e.g., the source and destination information contained within the header). That is, each crossbar switch 130-142 typically has some intelligence sufficient to (1) "read" the source and destination information of a packet received into the crossbar switch from a data communications link serving as input to the crossbar switch, (2) on the basis of such read source and destination information determine the appropriate data communications link to serve as output from the crossbar switch, (3) establish a connection between the input data communications link and output data communications link, and (4) thereafter transmit the packet across a switch.

Depicted in FIG. 3 are packets 300-316. Illustrated is that packets 300-304 contain data originating at data source/sink A 100 and destined for data source/sink data source/sink D 106, a fact reflected in the headers of packets 300-304. In addition, shown is that the headers of packets 300-304 are also numbered relative to each other, so that the packets can be placed in their appropriate order upon receipt at data source/sink D 106. Illustrated is that packets 306-310 contain data originating at data source/sink B 102 and destined for data source/sink data source/sink E 108, a fact reflected in the headers of packets 306-310. In addition, shown is that the headers of packets 306-310 are also numbered relative to each other, so that the packets can be placed in their appropriate order upon receipt at data source/sink E 108. Illustrated is that packets 312-314 contain some data originating at data source/sink C 104 and destined for data source/sink D 106, some data originating at data source/sink C 104 and destined for data source/sink E 108, some data originating at data source/sink C 104 and destined for data source/sink F 110, a fact reflected in the headers of packets 312-316.

Inspection of data communications network 112 shows that there are multiple paths through data communications network 112 from any data source/sink A 100, data source/sink B 102, or data source/sink C 104, to any data source/sink D 106, data source/sink E 108, or data source/sink F 110. Since packet switching is being utilized, each crossbar switch 130-142 is rapidly switching between various inputs and outputs in response to the source and destination information in each packet received on each input of each such crossbar switch 130-142. This rapid switching is illustrated by the dashed lines connecting the data communications links on either side of the crossbar switches 130-142.

Those skilled in the art will recognize that there are two basic ways in which packets are transmitted through a packet switched network: the datagram method and the virtual circuit method. In the datagram method, each packet is treated independently. That is, each network node 116-128 makes an independent routing decision for each packet received, irrespective of similarly addressed packets previously received. Consequently, it is likely that packets, even if they have the same destination address, will not all follow the same route through data communications network 112, and thus it will be up to the destination data source/sink to reassemble the packets in the correct order upon receipt. In the virtual circuit approach, a fixed route from a particular data source/sink to a particular data source/sink, through designated network nodes of data communications network 112, is established prior to any packets being sent. Thereafter, all packets from the particular data source/sink to the particular data source/sink will follow the fixed route through data communications network 112 thereby ensuring that any packets so transmitted arrive at the destination data source/sink in the order in which such packets were transmitted.

In the early days of data communications networks, circuit switching was used for data communications requiring near continuous transmission and reception (e.g. full motion video and/or continuous audio), while packet switching which used for virtually all other types of data. However, in more recent times a move has been made in the industry to utilize packet switching, even for data communications traditionally thought to require near continuous transmission and reception. Examples of this are seemingly continuous voice and data over Internet Protocol (IP) or Asynchronous Transfer Mode (ATM) networks. This is achieved by a digitizing, segmenting, packetizing, transmitting, unpacketizing, re-assembling, and displaying the data at a speed sufficient such that human perception cannot detect discontinuity in the data.

As packets transit data communications network 112, it is possible and indeed likely that multiple packets will converge upon a particular network node substantially simultaneously and/or in rapid succession. An illustration of such an event is depicted in FIG. 4, wherein is shown network node 122 containing crossbar switch 136. Depicted is that nine packets which were illustrated in FIG. 3 as being generated by data sources/sinks A 100, B 102, and C 104 are converging upon network node 122. Notice that two of the first packets that will be received by network node 122, at what will be assumed to be substantially the same time, are both directed to data source/sink 106 (e.g., packet 304 and 312) which resides on data communications link 174. Packet 304 arrives at network node 122 via data communications link 166 while packet 312 arrives at network node 122 via data communications link 170 at substantially same time.

As those skilled in the art will appreciate, by its nature crossbar switch 136 can only connect one data communications link to data communications link 174 at any particular instant in time. Thus, one or the other of data packets 304 and 312 will have to wait, typically in a buffer, depending upon which of data packets 304 and 312 crossbar switch 136 decides to transmit first.

In the early days of packet switched networks, the fact that data packets might have to wait for transmission at a particular network node did not pose that great of a problem, and such delays were in the main tolerated. However, the use of packet switching for such data communications requiring near continuous transmission and reception has given rise to a need to be able to schedule which packets will have to wait, and which will be directly transmitted through a particular node by a particular crossbar switch, since it is critical that such traffic (network traffic consisting of data requiring near continuous transmission reception, such as full motion video and/or audio) experience substantially minimal delays at network nodes as such traffic transits data communications network 112.

The need for scheduling packets through a particular crossbar switch that is resident within a particular network node has been met by the creation of what are known in the art as "schedulers". These schedulers use a variety of different schemes to ensure that data packets designated as having "high" or "higher" priority, relative to other data packets waiting for transmission through a particular crossbar switch, are transmitted prior to data packets having relatively "low" or "lower" priority.

Schedulers in existence do a passable job of ensuring that the relatively "high" or "higher" data packets transit particular crossbar switches relatively efficiently. However, recall from the discussion above that other traffic exists on data communications network 112 which, although of a "low" or "lower" priority, still needs to transit data communications network 112. Unfortunately, virtually all schedulers in existence focus on assuring that the relatively "high" or "higher" priority data packets transit particular crossbar switches in an efficient manner, and then rely on network "slack," or a momentary decrease in data traffic loading at the particular crossbar switches to allow the transmission of the relatively a "low" or "lower" priority data packets through the particular crossbar switches.

The foregoing referenced scheduler schemes initially worked relatively well. However, increasing data communications network traffic has made it more and more likely that insufficient slack will manifest itself within the network sufficient to allow the transmission of the low or lower priority data packets through the particular crossbar switches. The result of this is typically buffer (temporary packet storage available within circuitry substantially proximate to the associated particular crossbar switch, such circuitry being known in the art as the crossbar "switch fabric") overloading and subsequent loss of data at the particular crossbar switches. The inability to transmit such low or lower priority data packets through one or more particular crossbar switches is known in the art as "starving" the low or lower priority data packets by denying them network bandwidth necessary for them to remain in existence.

Those skilled in the art will recognize that although certain data packets have been designated to be of a relatively low or lower priority in a data network communications sense, such data is still important to the persons from whom and to whom it is directed. Accordingly, it is apparent that a need exists in the art for a method and system which will substantially alleviate the starving of relatively low or lower priority data packets while substantially insuring that relatively high or higher priority data packets transit a particular crossbar switch with relatively low delay.

SUMMARY OF THE INVENTION

It has been discovered that a method and system can be achieved which will substantially alleviate the starving of relatively low or lower priority data packets at a particular crossbar switch within a data communications network while substantially ensuring that relatively high or higher priority data packets transit that same particular crossbar switch with relatively low delay. The method and system substantially ensure that actual data transmission per unit time from at least one cross-point buffer switch ingress to at least one cross-point buffer switch egress substantially satisfies a designated target amount of actual data transmission per unit time.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 8B1 depicts a high-level logic flowchart showing an embodiment of a process, referenced in method step 809 of FIG. 8A, whereby a packet is transmitted under the control of guaranteed minimum bandwidth scheduler for Egress_1 602.

FIG. 8B2 depicts a high-level logic flowchart illustrating an embodiment of a process, referenced in method step 813, utilized to update pointer PE1.

FIG. 8C1 depicts a high-level logic flowchart showing an embodiment of a process, referenced in method step 811 of FIG. 8A, whereby a packet is transmitted under the control of excess bandwidth scheduler for Egress_1 600.

FIG. 8C2 depicts a high-level logic flowchart illustrating an embodiment of a process, referenced in method step 823, utilized to update pointer PEB1.

FIG. 11B1 depicts a high-level logic flowchart showing an embodiment of a process, referenced in method step 1109 of FIG. 11A, whereby a packet is transmitted under the control of guaranteed minimum bandwidth scheduler for Egress_2 606.

FIG. 11B2 depicts a high-level logic flowchart illustrating an embodiment of a process, referenced in method step 1113, utilized to update pointer PE2.

FIG. 11C1 depicts a high-level logic flowchart showing an embodiment of a process, referenced in method step 1111 of FIG. 11A, whereby a packet is transmitted under the control of excess bandwidth scheduler for Egress_2 604.

FIG. 11C2 depicts a high-level logic flowchart illustrating an embodiment of a process, referenced in method step 1123, utilized to update pointer PEB2.

FIG. 14B1 depicts a high-level logic flowchart showing an embodiment of a process, referenced in method step 1409 of FIG. 14A, whereby a packet is transmitted under the control of guaranteed minimum bandwidth scheduler for Egress_N 1206.

FIG. 14B2 depicts a high-level logic flowchart illustrating an embodiment of a process, referenced in method step 1413, utilized to update pointer PE_N.

FIG. 14C1 depicts a high-level logic flowchart showing an embodiment of a process, referenced in method step 1411 of FIG. 14A, whereby a packet is transmitted under the control of excess bandwidth scheduler for Egress_N 1204.

FIG. 14C2 depicts a high-level logic flowchart illustrating an embodiment of a process, referenced in method step 1423, utilized to update pointer PEB_N.

The use of the same reference symbols in different drawings indicates similar or identical items.

The use of the same reference symbols in different drawings indicates similar or identical items.

DESCRIPTION OF THE PREFERRED EMBODIMENT(S)

The following sets forth a detailed description of the best contemplated mode for carrying out the invention as described in the claims. The detailed description is intended to be illustrative and should not be taken as limiting.

Figure 5:
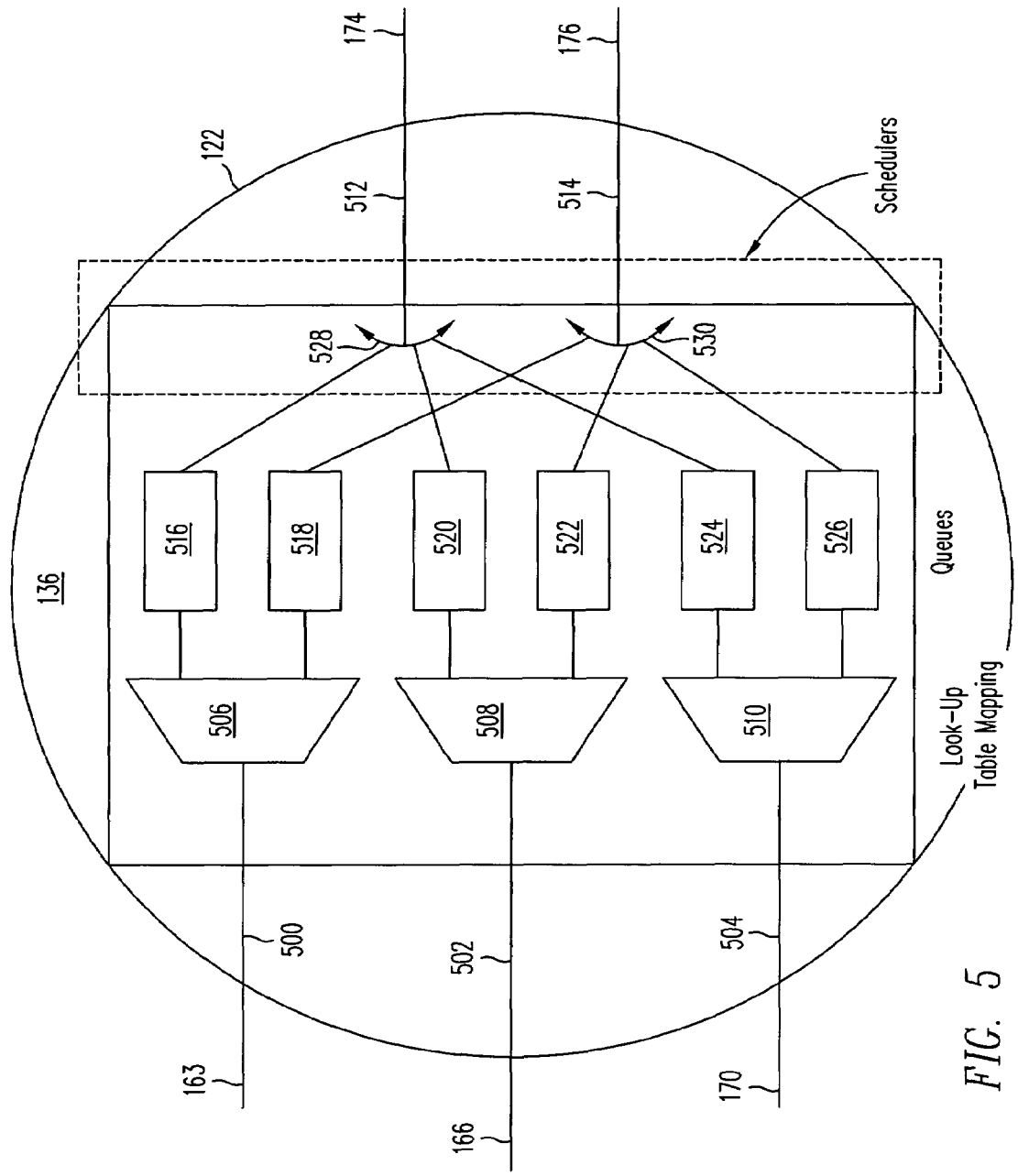
FIG. 5 shows an expanded view of crossbar switch 136 contained within network node 122.

With reference to the figures, and in particular with reference now to FIG. 5, shown is an expanded view of crossbar switch 136 contained within network node 122. Depicted is that respectively associated with switch ingresses 500-504 into crossbar switch 136 are lookup table mappers 506-510, which map each received data packet to its appropriate switch egress 512-514 dependent upon information contained within the header of each such received data packet in a fashion well-known to those having ordinary scale on the art.

Switch egresses 512-514 respectively connect with data communications links 174-176. As has been discussed, it is possible that multiple packets, destined for the same data communications link, will arrive at substantially the same time at network node 122. So that data is not lost while a preceding packet is transmitted over the desired data communications link, a queue is often associated with each ingress-egress pair within a particular crossbar switch such that one or more packets can be stored while waiting to be transmitted over the currently-in-use data communications link. Examples of queues are illustrated in FIG. 5 as ingress-egress queues 516-526, each of which is shown respectively connected between its associated particular ingress-egress pair.

Since it is possible that more than one ingress-egress queue 516-526 will have data waiting for transmission over the same egress, it is necessary to schedule the order in which ingress-egress queues 516-526 associated with a particular egress will be serviced. This function is typically handled by schedulers 528-530.

Most modern scheduler schemes in packet switched networks use some type of crossbar switch scheme which ensures that higher priority data packets get passed through the crossbar switch, and lets the lower priority data packets fend for themselves. With respect to those schemes which do try to ensure that some of the lower priority data packets get serviced, the basic idea of such schemes is that eventually a break in the higher priority traffic will allow the lower priority traffic to be serviced.

Although from a bandwidth conservation viewpoint, higher priority data is more "important," in human user terms, even lower priority data can be very important. The processes and devices described below both ensure that a substantial portion of the lower priority data gets through a crossbar switch and preserve the ability of the switch to service higher priority data.

The processes and devices described below go completely against the conventional wisdom and, at least initially, ignore the priority of the packets transiting a switch. Instead, the processes and devices ensure that each ingress is allowed an equal share of some defined target minimum actual data transmission per unit time between each particular ingress and each particular egress of a switch. Thus, the processes and devices insure that even ingresses having lower priority data will be serviced on a regular basis, thereby decreasing the amount of low-priority traffic dropped due to buffer overfill.

While the processes and devices described do take away some bandwidth from higher priority traffic, and thus seem counterintuitive, in most instances the benefits achieved from decreasing data loss (e.g., decreased requests for retransmission, decreased network traffic associated with the decreased requests for retransmission, decreased delay in supplying communications to lower priority users, etc.) outweigh the cost (a practicably negligible decrease in bandwidth available to the higher priority traffic). In addition, since the target can be adjusted, a system administrator can adjust the parameters associated with the processes and devices described below until the system administrator gets a good balance between serving lower priority traffic and serving higher priority traffic.

The processes and devices described below utilize a "minimum bandwidth guarantee for crossbar switches having input queues" scheme that does the foregoing by controlling access of all ingress queues to a particular egress by examining two quantities, $W_{ij}$ and $Q_{ij}$, in tandem. $W_{ij}$ is an invented quantity, which is termed a "bandwidth counter," and which represents the relationship between (a) actual data transmission per unit time from an Ingress i to an Egress j and (b) a target minimum amount of actual data transmission per unit time from the Ingress i to the Egress j. $Q_{ij}$ is the number of packets in a queue interposed between the Ingress i and the Egress j. The scheme is that if a particular ingress, represented by $Q_{ij}$, (a) has data waiting to be transmitted, and (b) also has a bandwidth counter which indicates that Ingress i has actual data transmission per unit time from Ingress i to Egress j less than Ingress i's target minimum amount of actual data transmission per unit time from Ingress i to Egress j, then Ingress i (or it's associated queue $Q_{ij}$) will be given access to Egress j before any other ingresses (or queues) which fail to meet such dual criteria.

In addition, the scheme will release control of access to an Egress j to other access control methods when either (a) all target minimum actual data transmissions per unit time for the ingresses feeding the Egress j have been met, or (b) queues having unmet targets have no data to transmit to Egress j.

Subsequent to data transmission from an Ingress i to an Egress j, a bandwidth counter $W_{ij}$, is adjusted by a factor dependent upon the amount of data transmitted.

Simultaneous with all the foregoing taking place, a clocked process runs in the background, which, upon the expiration of a defined unit of time, reinitializes all $W_{ij}$, or all bandwidth counters, so that the targets per unit time for all ingress-egress pairs are always current.

The "minimum bandwidth guarantee for crossbar switches having input queues" scheme as described works particularly well for an input queued crossbar switches where each ingress-egress pair has a queue which can be accessed independently of, and simultaneously with, other queues associated with other ingress-egress pairs. However, when an attempt is made to apply the "minimum bandwidth guarantee for crossbar switches having input queues" scheme to input queued crossbar switches where each ingress-egress pair has a queue which cannot be accessed independently of, and simultaneously with, other queues associated with other ingress-egress pairs several problems arise which should be overcome in order to allow the scheme to function with such switches in the most optimum fashion. Utilization of the scheme in these different types of switches is discussed in turn below.

I. Cross-Point Buffer Switch

Figure 6:
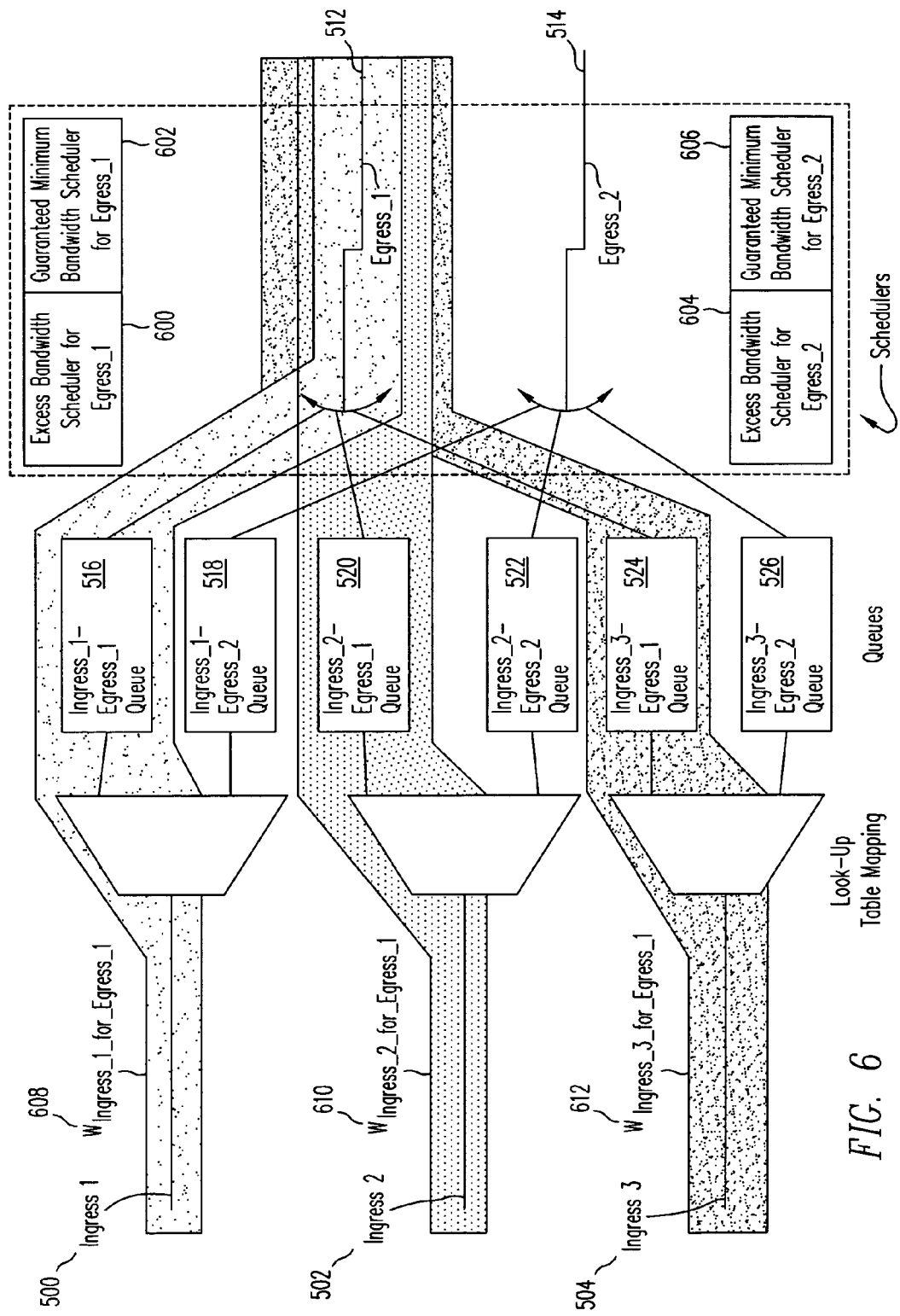
FIG. 6 shows a high-level partially schematic block diagram depicting an embodiment of the present invention in the context of an input queued switch where each ingress-egress pair has a queue which can be accessed independently of, and simultaneously with, other queues associated with other ingress-egress pairs.

Referring now to FIG. 6, shown is a high-level partially schematic block diagram depicting an embodiment of the present invention in the context of an input queued switch where each ingress-egress pair has a queue which can be accessed independently of, and simultaneously with, other queues associated with other ingress-egress pairs. As used herein, the defined term for such a switch is "cross-point buffer switch," a term which arises from viewing the switch as an old-style crossbar switch in which each ingress-egress connection is actually established by crossing two metallic bars at a particular point in space (the "crosspoint"); when the switch is so viewed, each buffer associated with a particular ingress-egress pair can likewise be viewed as being associated with the "cross-point" creating the ingress-egress connection. Hence the term, "cross-point buffer switch."

Illustrated is that both switch egress_1 512 and switch egress_2 514 have respectively associated with them (1) excess bandwidth schedulers 600, 604, and (2) guaranteed minimum bandwidth schedulers 602, 606. Each guaranteed minimum bandwidth scheduler for each egress assures that each queue, and consequently each ingress associated with each queue, is given some "guaranteed," or target, minimum data transmission per unit time (as used herein the term "guaranteed" means essentially a target which will be satisfied if the physical constraints of a switch allow) via the guaranteed minimum bandwidth scheduler's egress, irrespective of the priority of the packets that might be resident within each queue. This substantially ensures that no switch ingress is ever completely "starved" of bandwidth, even if the only packets resident within a particular queue associated with a switch ingress are packets of the lowest possible priority. In the event that no queue requesting data transmission has an unmet guaranteed minimum data transmission per unit time, the excess bandwidth scheduler for the egress assigns such bandwidth over and above that bandwidth constituting guaranteed minimum bandwidth to the queues associated with the egress in a fair manner. It is to be understood that, in at least one embodiment, when utilized with a cross-point buffer switch, the guaranteed minimum bandwidth scheduler and excess bandwidth scheduler at each egress functions substantially independent of guaranteed minimum bandwidth schedulers and excess bandwidth schedulers at resident at other egresses.

Depicted as associated with switch egress_1 512 is guaranteed minimum bandwidth scheduler for egress_1 602 and excess bandwidth scheduler for egress_1 600. As discussed, guaranteed minimum bandwidth scheduler for egress_1 602 is keyed to a guaranteed minimum bandwidth associated with each switch ingress 500-504. The guaranteed minimum bandwidth is represented by a bandwidth counter, associated with each particular switch ingress 500-504, which is indicative of a relationship between (a) an amount of actual data transmitted, during a prescribed unit of time T, from each particular switch ingress 500-504 to switch egress_1 512 and (b) a target minimum amount of actual data transmission from each particular switch ingress 500-504 to switch egress 512. These bandwidth counters are represented in FIG. 6 as $W_{Ingress\_1\_for\_Egress\_1}$ 608, $W_{Ingress\_2\_for\_Egress\_1}$ 610, and $W_{Ingress\_3\_for\_Egress\_1}$ 612.

Figure 7:
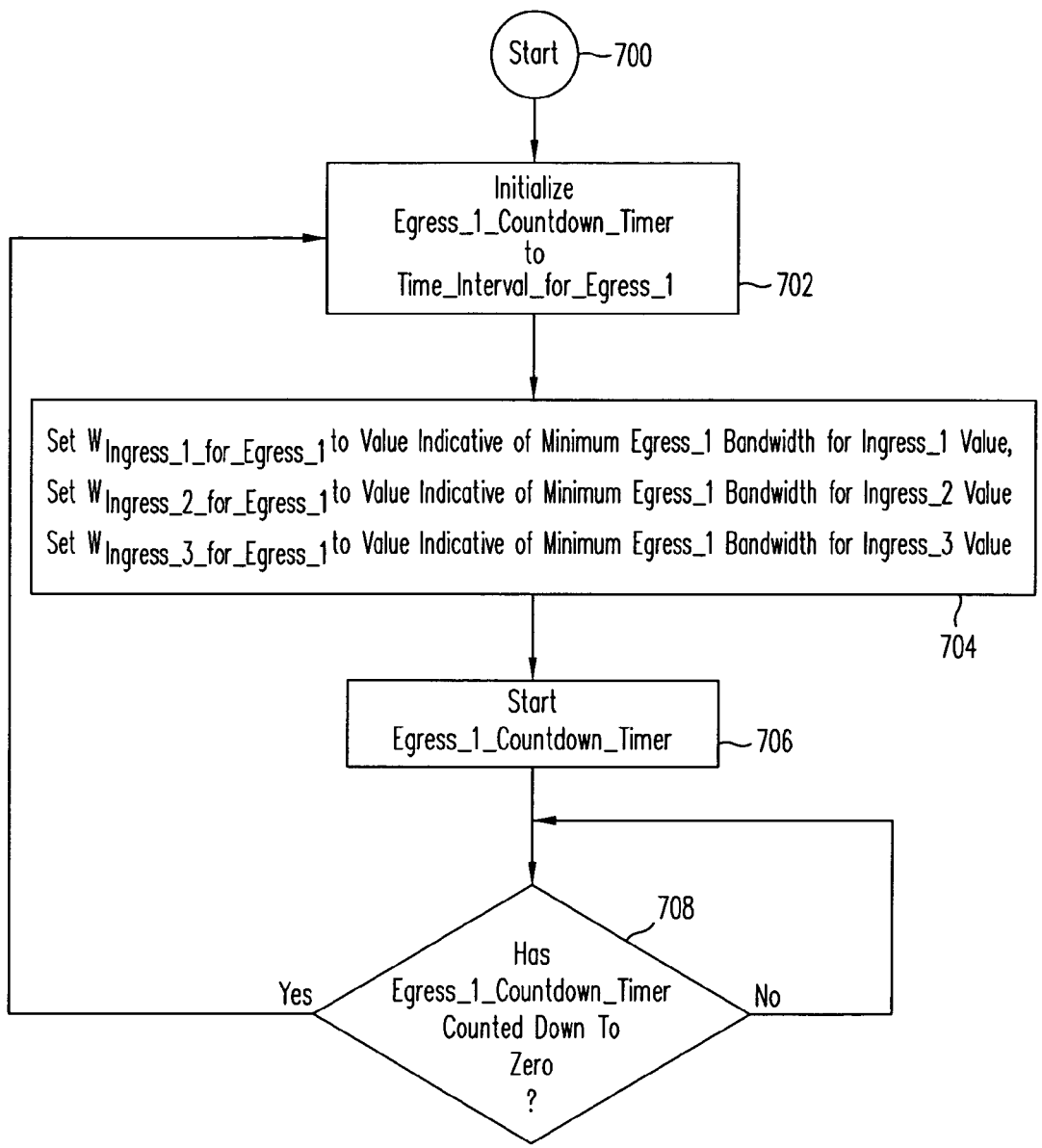
FIG. 7 depicts a high-level logic flowchart which illustrates the control of the values of bandwidth counters for Ingress_1 500, Ingress_2 502, and Ingress_3 504.

With reference now to FIG. 7, depicted is a high-level logic flowchart which illustrates the control of the values of bandwidth counters for Ingress_1 500, Ingress_2 502, and Ingress_3 504. Method step 700 shows the start of the process. Method step 702 depicts that Egress_1_Countdown_Timer is initialized to Time_Interval_for_Egress_1. Method step 704 illustrates that $W_{Ingress\_1\_for\_Egress\_1}$ 608, $W_{Ingress\_2\_for\_Egress\_1}$ 610, and $W_{Ingress\_3\_for\_Egress\_1}$ 612 are each set to values indicative of the minimum data transmission guaranteed to their respective ingresses during the Time_Interval_for_Egress_1. Method step 706 illustrates that Egress_1_Countdown_Timer is started and begins to countdown by some predetermined amount of time decrement (the actual amount of decrement is a design choice). Method step 708 shows the determination of whether Egress_1_Countdown_Timer has counted down to be equal to zero. In the event that Egress_1_Countdown_Timer is greater than zero, the process loops to method step 708. In the event that Egress_1_Countdown_Timer is less than or equal to zero, the process returns to method step 702 and executes from that point. Thus, as can be seen, the high-level logic flowchart of FIG. 7 ensures that $W_{Ingress\_1\_for\_Egress\_1}$ 608, $W_{Ingress\_2\_for\_Egress\_1}$ 610, and $W_{Ingress\_3\_for\_Egress\_1}$ 612 are each reset to values indicative of the minimum bandwidth guaranteed to their respective ingresses at the start of every successive Time_Interval_for_Egress_1.

It is to be understood that the process illustrated in FIG. 7 is to be running simultaneously with the process which will now be shown in FIGS. 8A, 8B1, 8B2, 8C1, and 8C2. The process illustrated in FIG. 7 ensures that $W_{Ingress\_1\_for\_Egress\_1}$ 608, $W_{Ingress\_2\_for\_Egress\_1}$ 610, and $W_{Ingress\_3\_for\_Egress\_1}$ 612 are reset to their predetermined values after the elapsing of every Time_Interval_for_Egress_1 period of time. The process shown in FIGS. 8A, 8B1, 8B2, 8C1, and 8C2 depicts how $W_{Ingress\_1\_for\_Egress\_1}$ 608, $W_{Ingress\_2\_for\_Egress\_1}$ 610, and $W_{Ingress\_3\_for\_Egress\_1}$ 612 can be utilized to substantially ensure that none of Ingress_1 500, Ingress_2 502, or Ingress_3 504 is being starved of Egress_1 512 bandwidth.

Figure 8A:
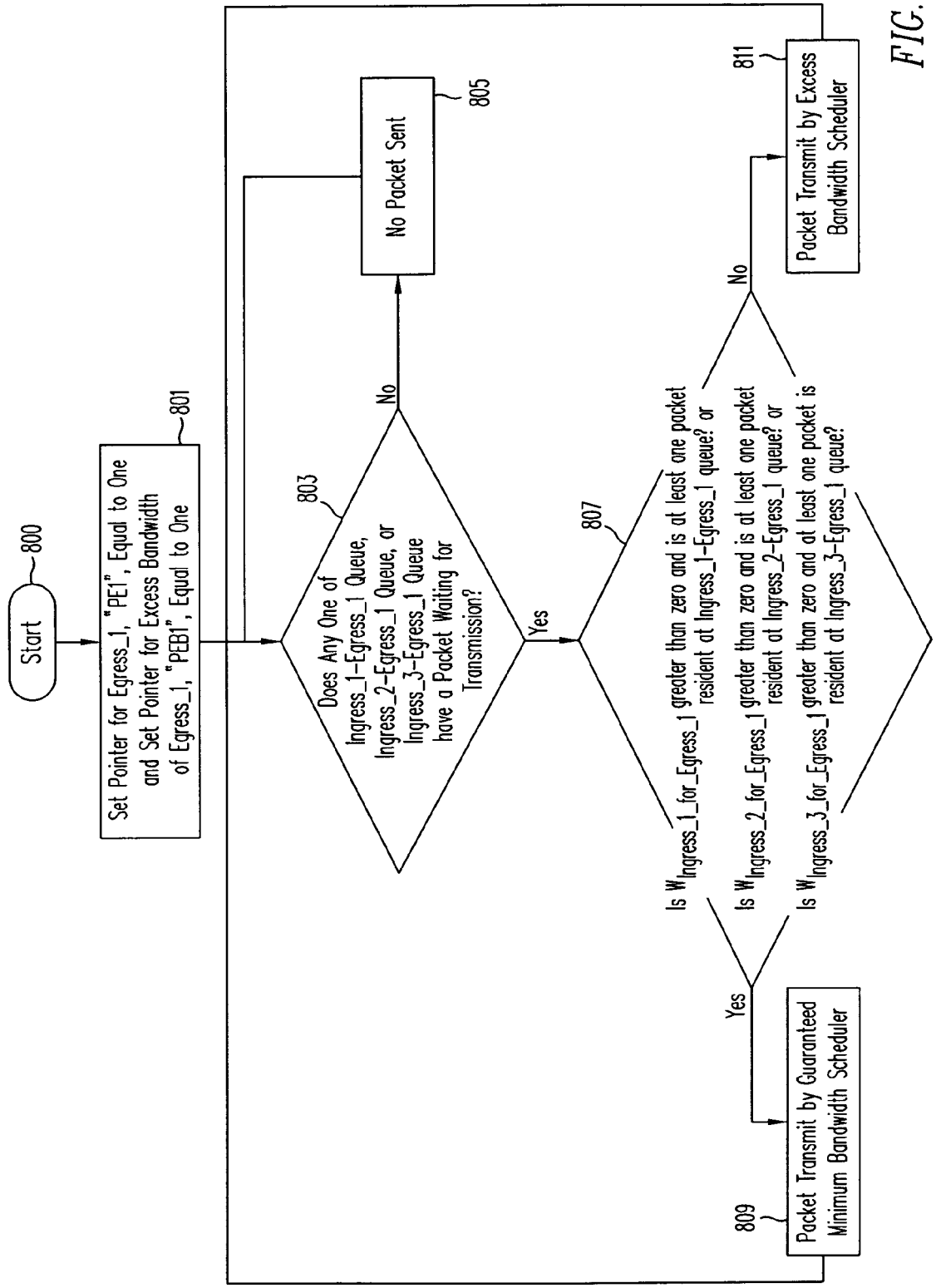
FIG. 8A shows a high-level logic flowchart illustrating a process which can be utilized by excess bandwidth scheduler for Egress_1 600 and guaranteed minimum bandwidth scheduler for Egress_1 602.

Referring now to FIG. 8A, shown is a high-level logic flowchart illustrating a process which can be utilized by excess bandwidth scheduler for Egress_1 600 and guaranteed minimum bandwidth scheduler for Egress_1 602. Method step 800 shows the start of the process. Method step 801 depicts that (1) a pointer, "PE1", used by guaranteed minimum bandwidth scheduler for Egress_1 602 in the manner set forth below, is initialized to be equal to one; and (2) a pointer, "PEB1", used by excess bandwidth scheduler for Egress_1 600 in the manner set forth below, is initialized to be equal to one.

Method step 803 illustrates the inquiry as to whether at least one of Ingress_1-Egress_1 queue 516, or Ingress_2-Egress_1 queue 520, or Ingress_3-Egress_1 queue 524 feeding Egress_1 512 has a packet waiting for transmission. In the event that the inquiry shown in method step 803 finds that none of Ingress_1-Egress_1 queue 516, or Ingress_2-Egress_1 queue 520, or Ingress_3-Egress_1 queue 524 feeding Egress_1 512 has a packet waiting for transmission, the process proceeds to method step 805 which depicts that no packet is sent. Thereafter, the process proceeds to method step 803 and executes from that point.

In the event that the inquiry shown in method step 803 finds that at least one of Ingress_1-Egress_1 queue 516, or Ingress_2-Egress_1 queue 520, or Ingress_3-Egress_1 queue 524 feeding Egress_1 512 has a packet waiting for transmission, the process proceeds to method step 807 which depicts an embodiment of an inquiry as to whether any one or more queues which have a packet waiting for transmission also have a non-zero bandwidth counter; method step 807 shows that in one embodiment the inquiry is accomplished by checking whether any one of the following conditions is met:

- Is $W_{Ingress\_1\_for\_Egress\_1}$ 608 greater than zero and is at least one packet resident at Ingress_1-Egress_1 queue 516? or
- Is $W_{Ingress\_2\_for\_Egress\_1}$ 610 greater than zero and is at least one packet resident at Ingress_2-Egress_1 queue 520? or
- Is $W_{Ingress\_3\_for\_Egress\_1}$ 612 greater than zero and at least one packet is resident at Ingress_3-Egress_1 queue 524?

In the event that any one of the foregoing conditions is true, the process proceeds to method step 809 which depicts the transmission of a packet under the control of guaranteed minimum bandwidth scheduler for Egress_1 602 utilizing a process, an embodiment of which is described in FIGS. 8B1 and 8B2, below. In the event that none of the foregoing conditions of method step 807 is true, the process proceeds to method step 811 which depicts the transmission of a packet under the control of excess bandwidth scheduler for Egress_1 600, an embodiment of which is described in FIGS. 8C1 and 8C2, below. Subsequent to the performance of either method step 809 or 811 the process loops back to method step 803 and continues from that point.

Figure 1:
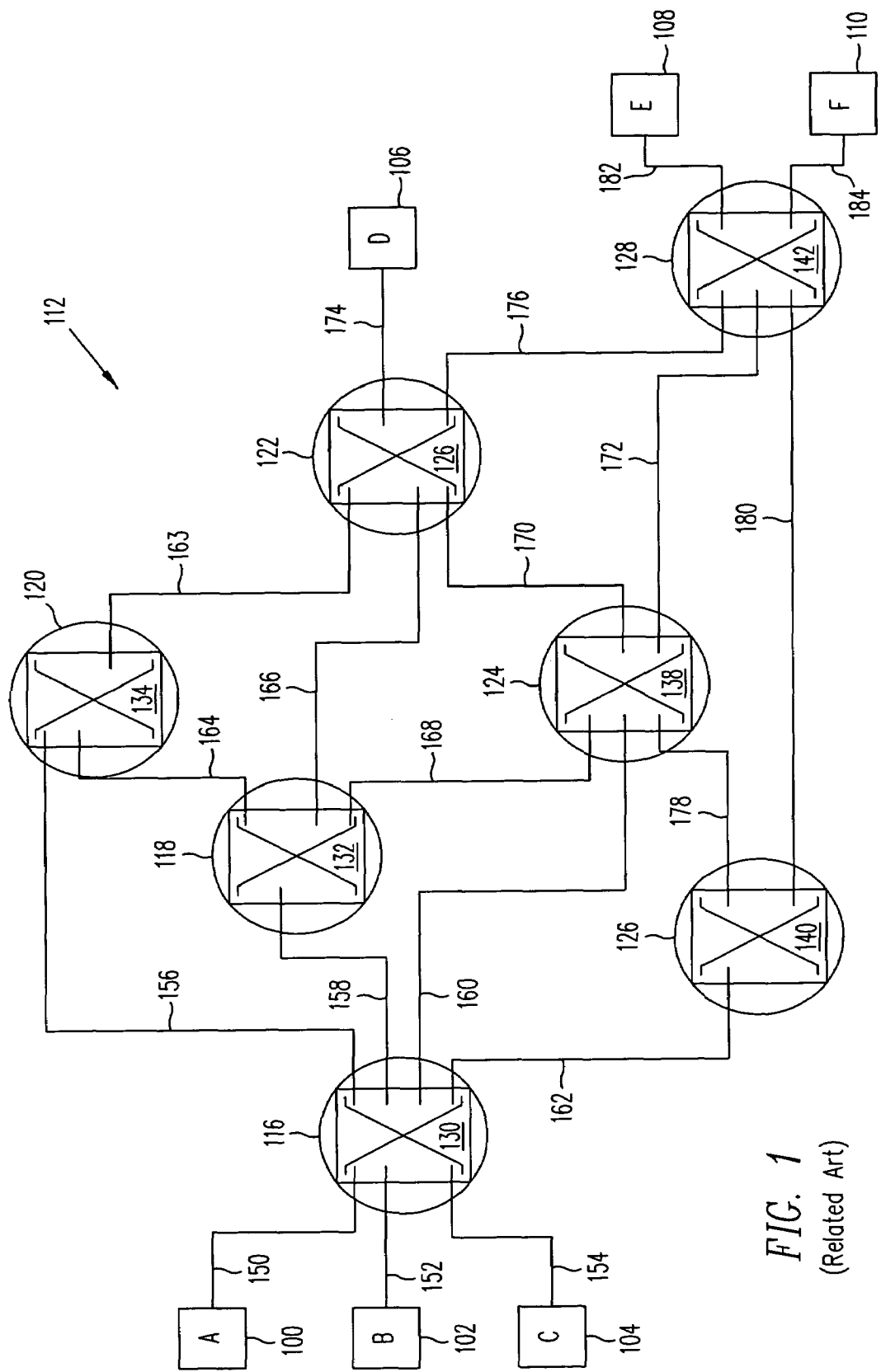
FIG. 1 shows a partially-schematic diagram of a related art data communications network.

With reference now to FIG. 8B1, depicted is a high-level logic flowchart showing an embodiment of a process, referenced in method step 809 of FIG. 8A, whereby a packet is transmitted under the control of guaranteed minimum bandwidth scheduler for Egress_1 602. Method step 809A depicts the start of the "packet transmit under the control of minimum bandwidth scheduler" process. Method step 806 depicts the inquiry of whether $W_{Ingress\_(PE1)\_for\_Egress\_1}$ (e.g., $W_{Ingress\_(PE1)\_for\_Egress\_1}$ would equate to $W_{Ingress\_for\_Egress\_1}$ if PE1 was equal to one, $W_{Ingress\_2\_for\_Egress\_1}$ if PE1 was equal to two, etc.) is greater than zero.

In the event that the inquiry depicted in method step 806 indicates that $W_{Ingress\_(PE1)\_for\_Egress\_1}$ is greater than zero, the process proceeds to method step 808 wherein is illustrated determination of whether at least one packet is resident at the Ingress_(PE1)-Egress_1 queue (e.g., Ingress_(PE1)-Egress_1 queue would equate to Ingress_1-Egress_1 queue 516 if PE1 was equal to one, Ingress_2-Egress_1 queue 520 if PE1 was equal to two, etc.). In the event that a packet is resident at the Ingress_(PE1)-Egress_1 queue, the process proceeds to method step 810 wherein is shown that a packet from the Ingress_(PE1)-Egress_1 queue is transmitted out of crossbar switch 136 via Egress_1 512. Thereafter, the process proceeds to method step 812 wherein it is shown that $W_{Ingress\_(PE1)\_for\_Egress\_1}$ is reduced by an amount representative of the packet length that was transmitted from the Ingress_(PE1)-Egress_1 queue out of crossbar switch 136 over Egress_1 512 (the example just described is for variable length packets; alternatively, if fixed length packets are used, the reduction in the bandwidth counter can be achieved by use of a "shortcut," which is that the minimum bandwidth is specified by certain number of packets to be transmitted during time interval T (Time_Interval_for_Egress_1), and thus the reduction in bandwidth can be accomplished merely by subtracting the number one from the bandwidth counter). Thereafter, the process proceeds to method step 813 which shows that pointer PE1 is updated utilizing an "update point PE1 process," an embodiment of which is described in FIG. 8B2, below. Thereafter, the process proceeds to method step 817 which shows the end of the embodiment of the "packet transmit under the control of minimum bandwidth scheduler" process, as such embodiment is illustrated in FIG. 8B1.

In the event that the inquiry depicted in method step 808 yields the determination that there is not at least one packet resident at the Ingress_(PE1)-Egress_1 queue (i.e., the queue is empty), the process proceeds to method step 807, which shows that pointer PE1 is updated utilizing an "update pointer PE1" process, an embodiment of which is described in FIG. 8B2, below.

In the event that the inquiry of method step 806 indicates that $W_{Ingress\_(PE1)\_for\_}Egress\_1$ is zero or less, the process proceeds to method step 807, which shows that pointer PE1 is updated utilizing an "update pointer PE1" process, an embodiment of which is described in FIG. 8B2, below.

Figure 2:
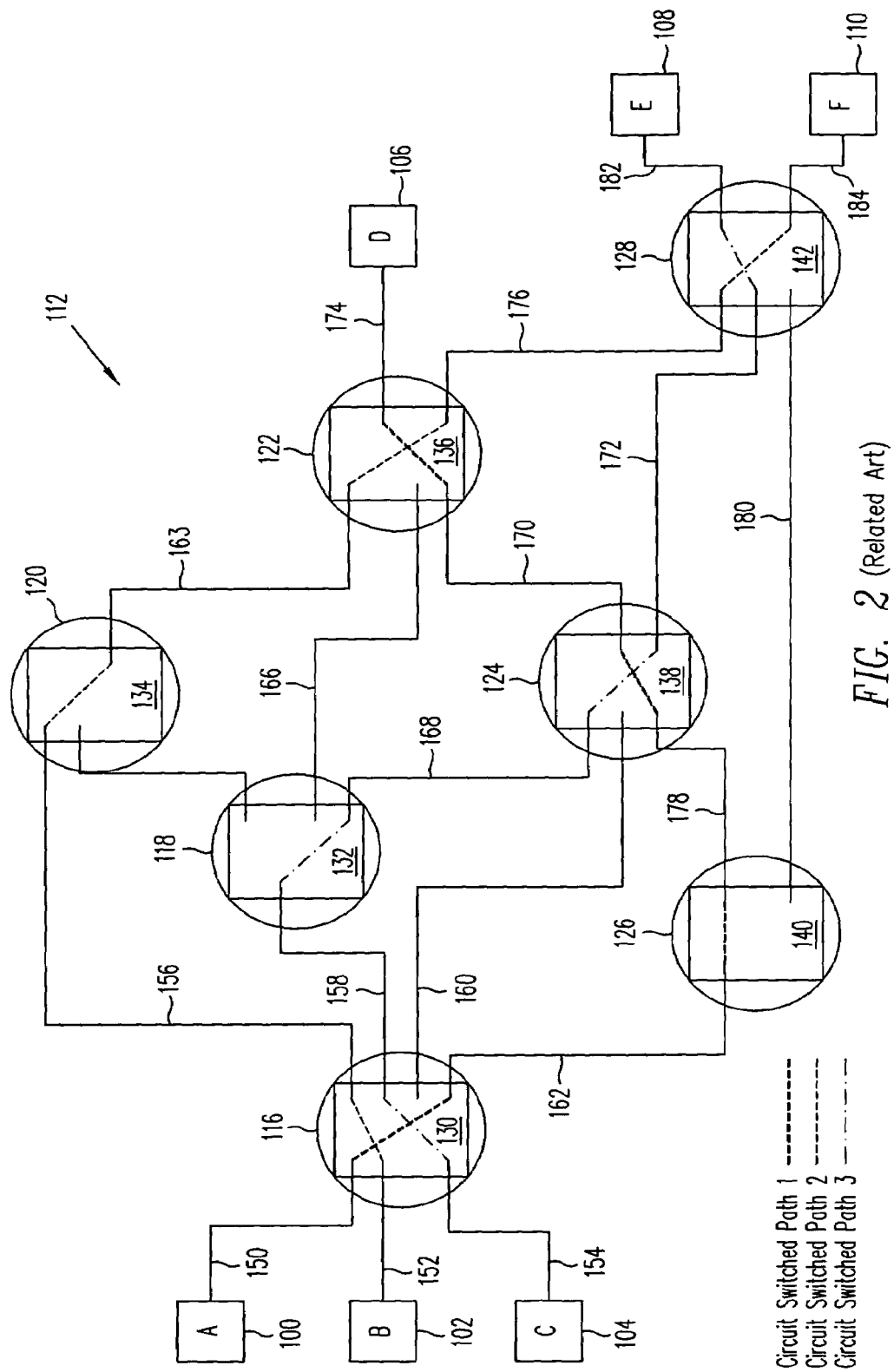
FIG. 2 shows three "circuit switched" paths which are used to introduce the functioning of crossbar switches.
Figure 3:
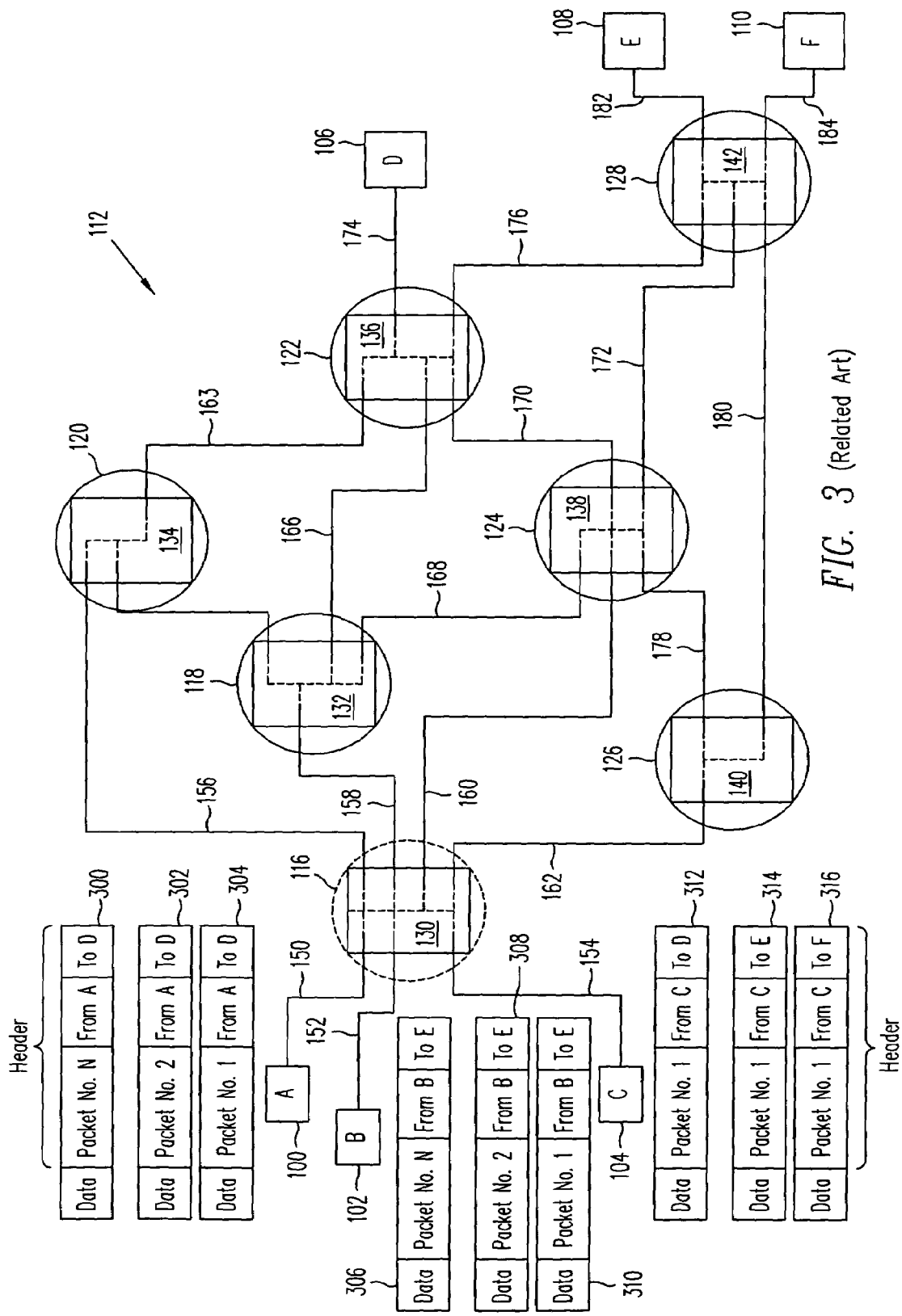
FIG. 3 shows the use of "packet switching" to transmit data through data network 112, and how crossbar switches are utilized in a packet-switched network.
Figure 4:
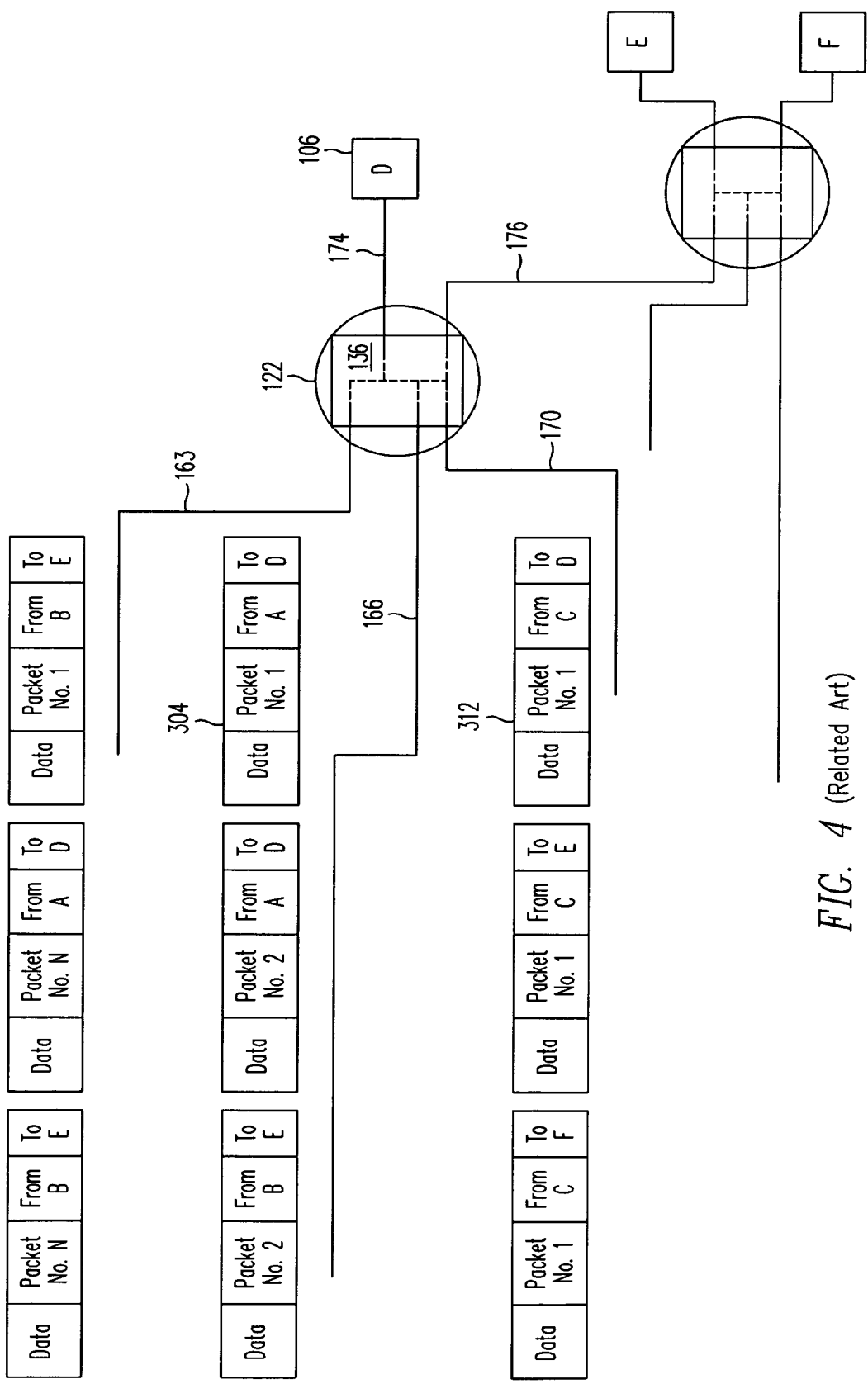
FIG. 4 shows network node 122 containing crossbar switch 136.

Referring now to FIG. 8B2 depicted is a high-level logic flowchart illustrating an embodiment of a process, referenced in method step 813, utilized to update pointer PE1. Method step 813A shows the start of the "update pointer PE" process. Method step 816 depicts that the value of pointer PE1 is incremented by one. Thereafter, the process proceeds to method step 814 wherein is depicted the inquiry as to whether the value of pointer PE1 is less than or equal to the highest ordinal number of ingresses associated with Egress_1 512 (e.g., there are three ingresses—Ingress_1 500, Ingress_2 502, and Ingress_3 504—associated with Egress_1 512 in FIG. 6). In the event that the value of pointer PE1 is less than or equal to the highest ordinal number of ingresses associated with Egress_1 512, the process proceeds to method step 815 wherein it is shown that the "update pointer PE1" process ends and the flow resumes subsequent to the step which called upon the process shown in FIG. 8B2 (e.g., flow will resume subsequent to method step 813 in one instance, and subsequent to method step 807 in another instance).

In the event that the inquiry shown in method step 814 yields a determination that the value of pointer PE1 is greater than the highest ordinal number of ingresses, the process proceeds to method step 802 which depicts that the value of pointer PE1 is re-initialized to be equal to one. Thereafter, the process proceeds to method step 815 wherein it is shown that the "update pointer PE1" process ends. Thereafter, the flow resumes subsequent to the step which called upon the "update pointer PE1" process shown in FIG. 8B2 (e.g., flow will resume subsequent to method step 813 in one instance, and subsequent to method stop 807 in another instance).

With reference now to FIG. 8C1, depicted is a high-level logic flowchart showing an embodiment of a process, referenced in method step 811 of FIG. 8A, whereby a packet is transmitted under the control of excess bandwidth scheduler for Egress_1 600. Method step 811A depicts the start of the "packet transmit under the control of excess bandwidth scheduler" process. Method step 832 depicts the inquiry of whether at least one packet is resident at Ingress_(PEB1)_Egress_1 queue (e.g., Ingress_(PEB1)_Egress_1 queue would equate to Ingress_1-Egress_1 queue 516 if PEB1 was equal to one, Ingress_2-Egress_1 queue 520 if PEB1 was equal to two, etc.). In the event that at least one packet is resident at Ingress_(PEB1)_Egress_1 queue, the process proceeds to method step 822 and executes from that point. Otherwise, the process proceeds to method step 833 which shows that pointer PEB1 is updated utilizing an "update pointer PEB1" process, an embodiment of which is described in FIG. 8C2, below. Thereafter, the process proceeds to method step 832 and executes from that point.

Method step 822 shows the transmission of a packet from Ingress_(PEB1)-Egress_1 queue (the notation used indicates that Ingress_(PEB1)_Egress_1 queue equates to Ingress_1-Egress_1 queue 516 if the value of PEB1 is equal to one, or equates to Ingress_2-Egress_1 queue 520 if the value of PEB1 is equal to two, etc.). Subsequent to method step 822, process proceeds to method step 823 which shows that pointer PEB1 is updated using an "update pointer PEB1" process, an embodiment of which is described in FIG. 8C2, below. Thereafter, the process proceeds to method step 825, which shows the end of the embodiment of the "packet transmit under the control of excess bandwidth scheduler" process, as such embodiment is illustrated in FIG. 8C1.

Referring now to FIG. 8C2, depicted is a high-level logic flowchart illustrating an embodiment of a process, referenced in method step 823, utilized to update pointer PEB1. Method step 823A shows the start of "update pointer PEB1" the process. Method step 830 depicts that the value of pointer PEB1 is incremented by one. Thereafter, the process proceeds to method step 831 wherein is depicted the inquiry as to whether the value of pointer PEB1 is less than or equal to the highest ordinal number of ingresses associated with Egress_1 512 (e.g., there are three ingresses—Ingress_1 500, Ingress_2 502, and Ingress_3 504—associated with Egress_1 512 in FIG. 6). In the event that the value of pointer PEB1 is less than or equal to the highest ordinal number of ingresses associated with Egress_1 512, the process proceeds to method step 835 wherein it is shown that the "update pointer PEB1" process ends. Thereafter, the flow resumes subsequent to the step which called upon the "update pointer PEB1" process shown in FIG. 8C2 (e.g., flow will resume subsequent to method step 823 in one instance, and subsequent to method step 833 in another instance).

In the event that the inquiry shown in method step 831 yields a determination that the value of pointer PEB1 is greater than the highest ordinal number of ingresses, the process proceeds to method step 824 which depicts that the value of pointer PEB1 is re-initialized to be equal to one. Thereafter, the process proceeds to method step 835 wherein it is shown that the "update pointer PEB1" process ends. Thereafter, the flow resumes subsequent to the step which called upon the process shown in FIG. 8C2 (e.g., flow will resume subsequent to method step 813 in one instance, and subsequent to method step 823 in another instance).

Figure 9:
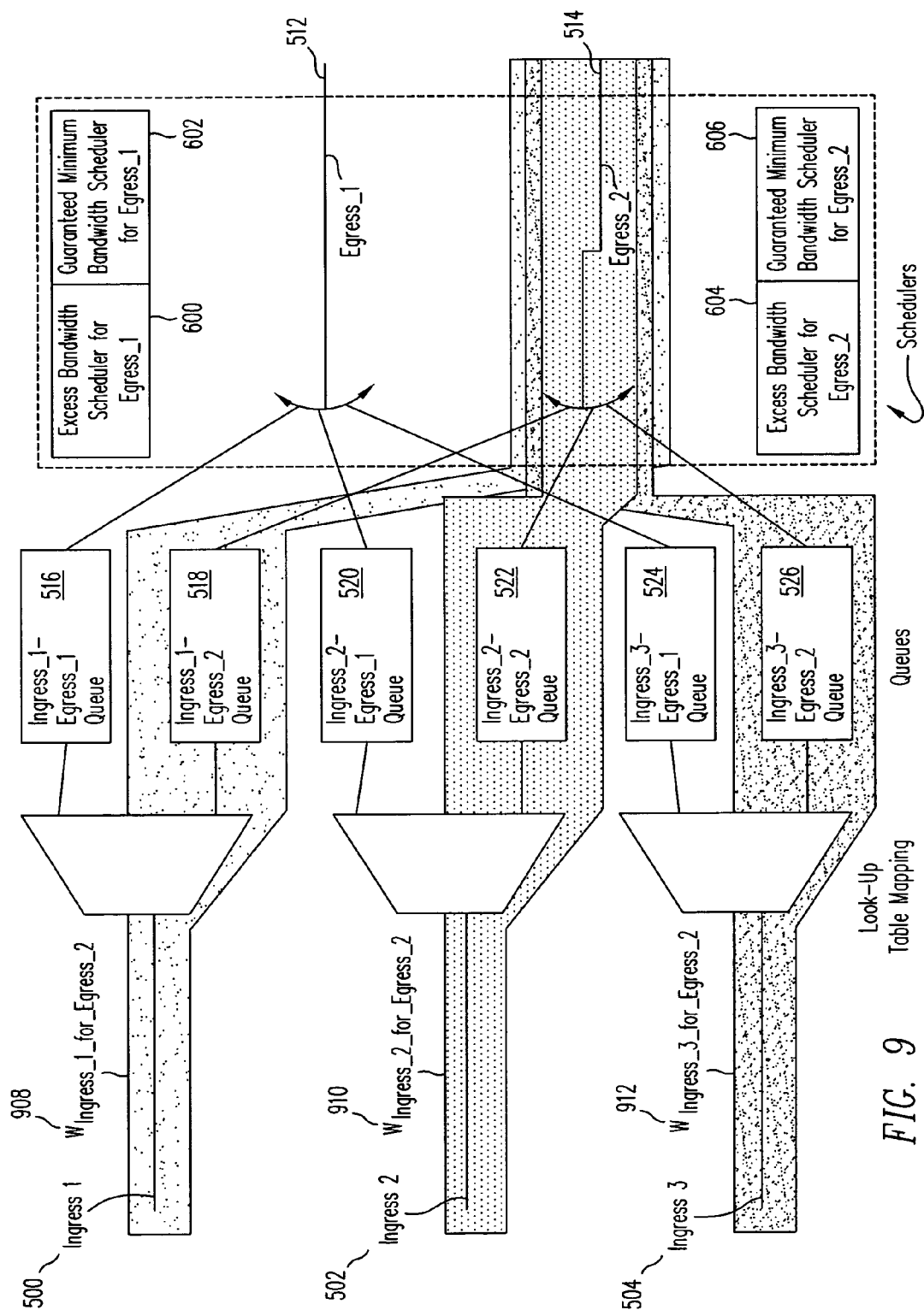
FIG. 9 shows a high-level partially schematic block diagram depicting an embodiment of the present invention in the context of an input queued switch where each ingress-egress pair has a queue which can be accessed independently of, and simultaneously with, other queues associated with other ingress-egress pairs.

Referring now to FIG. 9, shown is a high-level partially schematic block diagram depicting an embodiment of the present invention in the context of an input queued switch where each ingress-egress pair has a queue which can be accessed independently of, and simultaneously with, other queues associated with other ingress-egress pairs.

Illustrated is that both switch egress_1 512 and switch egress_2 514 have respectively associated with them (1) excess bandwidth schedulers 600, 604, and (2) guaranteed minimum bandwidth schedulers 602, 606. Each guaranteed minimum bandwidth scheduler for each egress assures that each queue, and consequently each ingress associated with each queue, is given some "guaranteed," or target, minimum data transmission per unit time (as used herein the term "guaranteed" means essentially a target which will be satisfied if the physical constraints of a switch allow) via the guaranteed minimum bandwidth scheduler's egress, irrespective of the priority of the packets that might be resident within each queue. This substantially ensures that no switch ingress is ever completely "starved" of bandwidth, even if the only packets resident within a particular queue associated with a switch ingress are packets of the lowest possible priority. In the event that no queue requesting data transmission has an unmet guaranteed minimum data transmission per unit time, the excess bandwidth scheduler for the egress assigns such bandwidth over and above that bandwidth constituting guaranteed minimum bandwidth to the queues associated with the egress in a fair manner. It is to be understood that, in at least one embodiment, when utilized with a cross-point buffer switch, the guaranteed minimum bandwidth scheduler and excess bandwidth scheduler at each egress functions substantially independent of guaranteed minimum bandwidth schedulers and excess bandwidth schedulers at resident at other egresses.

Depicted as associated with switch egress_2 514 is guaranteed minimum bandwidth scheduler for egress_2 606 and excess bandwidth scheduler for egress_2 604. As discussed, guaranteed minimum bandwidth scheduler for egress_2 606 is keyed to a guaranteed minimum bandwidth associated with each switch ingress 500-504. The guaranteed minimum bandwidth is represented by a bandwidth counter, associated with each particular switch ingress 500-504, which is indicative of a relationship between (a) an amount of actual data transmitted, during a prescribed unit of time T, from each particular switch ingress 500-504 to switch egress_2 514 and (b) a target minimum amount of actual data transmission from each particular switch ingress 500-504 to switch egress_2 514. These bandwidth counters are represented in FIG. 9 as $W_{Ingress\_1\_for\_Egress\_2}$ 908, $W_{Ingress\_2\_for\_Egress\_2}$ 910, and $W_{Ingress\_3\_for\_Egress\_2}$ 912.

Figure 10:
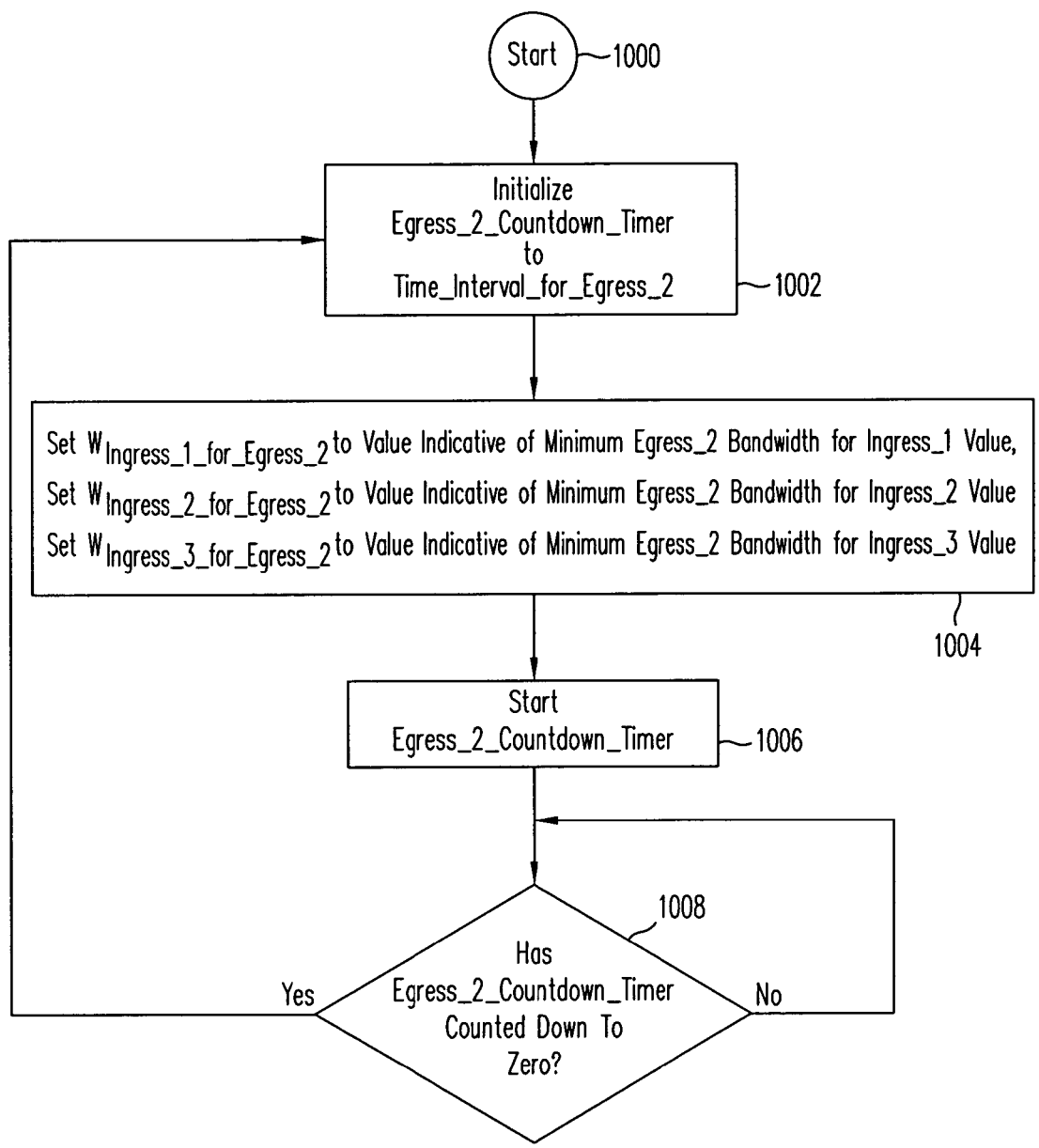
FIG. 10 depicts a high-level logic flowchart which illustrates the control of the values of bandwidth counters for Ingress_1 500, Ingress_2 502, and Ingress_3 504.

With reference now to FIG. 10, depicted is a high-level logic flowchart which illustrates the control of the values of bandwidth counters for Ingress_1 500, Ingress_2 502, and Ingress_3 504. Method step 1000 shows the start of the process. Method step 1002 depicts that Egress_2_Countdown_Timer is initialized to Time_Interval_for_Egress_2. Method step 1004 illustrates that $W_{Ingress\_1\_for\_Egress\_2}$ 908, $W_{Ingress\_2\_for\_Egress\_2}$ 910, and $W_{Ingress\_3\_for\_Egress\_2}$ 912 are each set to values indicative of the minimum data transmission guaranteed to their respective ingresses during the Time_Interval_for_Egress_2. Method step 1006 illustrates that Egress_2_Countdown_Timer is started and begins to countdown by some predetermined amount of time decrement (the actual amount of decrement is a design choice). Method step 1008 shows the determination of whether Egress_2_Countdown_Timer has counted down to be equal to zero. In the event that Egress_2_Countdown_Timer is greater than zero, the process loops to method step 1008. In the event that Egress_2_Countdown_Timer is less than or equal to zero, the process returns to method step 1002 and executes from that point. Thus, as can be seen, the high-level logic flowchart of FIG. 10 ensures that $W_{Ingress\_1\_for\_Egress\_2}$ 908, $W_{Ingress\_2\_for\_Egress\_2}$ 910, and $W_{Ingress\_3\_for\_Egress\_2}$ 912 are each reset to values indicative of the minimum bandwidth guaranteed to their respective ingresses at the start of every successive Time_Interval_for_Egress_2.

It is to be understood that the process illustrated in FIG. 10 is to be running simultaneously with the process which will now be shown in FIGS. 11A, 11B1, 11B2, 11C1, and 11C2. The process illustrated in FIG. 10 ensures that $W_{Ingress\_1\_for\_Egress\_2}$ 908, $W_{Ingress\_2\_for\_Egress\_2}$ 910, and $W_{Ingress\_3\_for\_Egress\_2}$ 912 are reset to their predetermined values after the elapsing of every Time_Interval_for_Egress_2 period of time. The process shown in FIGS. 11A, 11B1, 11B2, 11C1, and 11C2 depicts how $W_{Ingress\_1\_for\_Egress\_2}$ 908, $W_{Ingress\_2\_for\_Egress\_2}$ 910, and $W_{Ingress\_3\_for\_Egress\_2}$ 912 can be utilized to substantially ensure that none of Ingress_1 500, Ingress_2 502, or Ingress_3 504 is being starved of Egress_2 514 bandwidth.

Figure 11A:
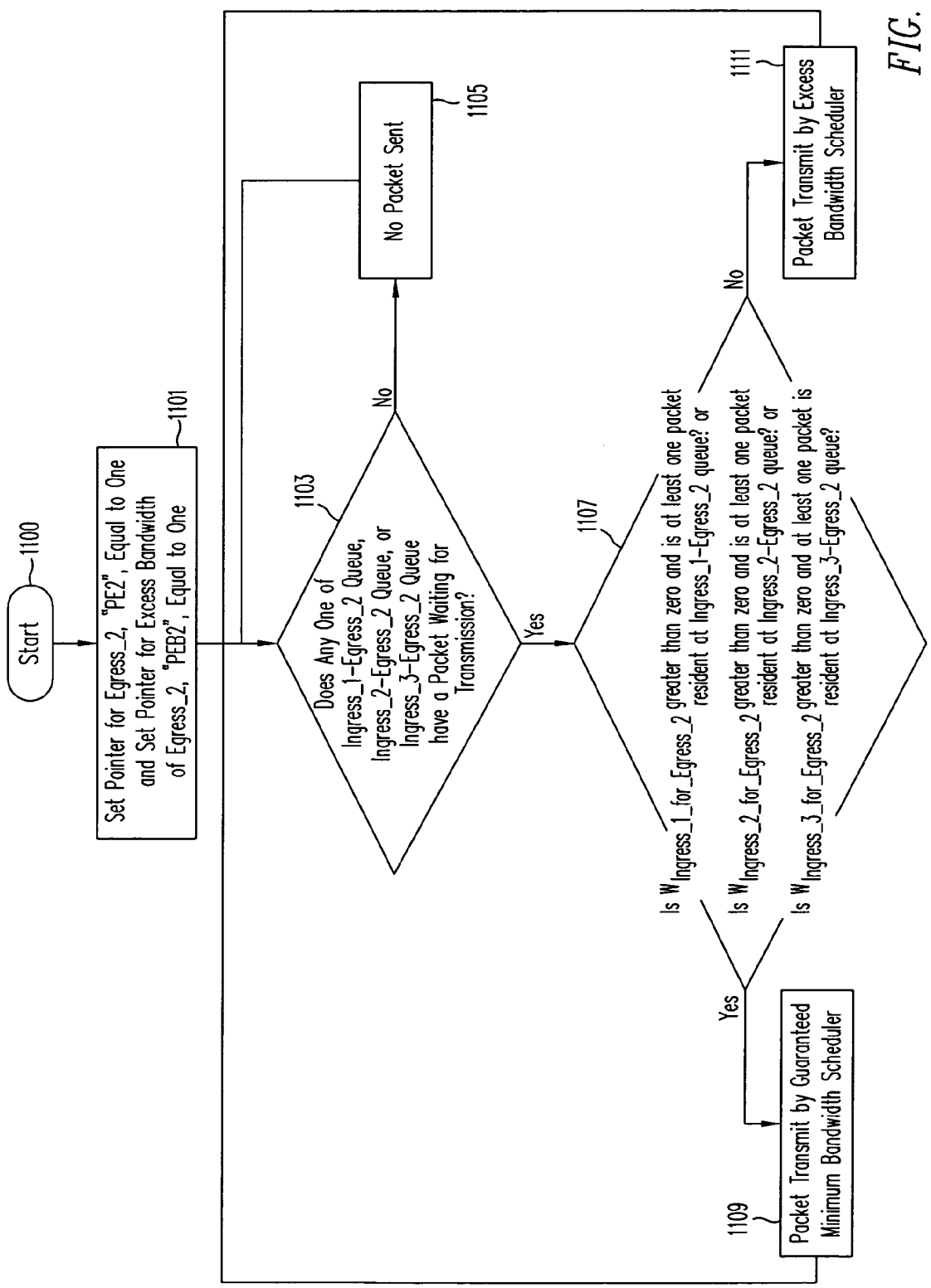
FIG. 11A shows a high-level logic flowchart illustrating a process which can be utilized by excess bandwidth scheduler for Egress_2 604 and guaranteed minimum bandwidth scheduler for Egress_2 606.

Referring now to FIG. 11A, shown is a high-level logic flowchart illustrating a process which can be utilized by excess bandwidth scheduler for Egress_2 604 and guaranteed minimum bandwidth scheduler for Egress_2 606. Method step 1100 shows the start of the process. Method step 1101 depicts that (1) a pointer, "PE2", used by guaranteed minimum bandwidth scheduler for Egress_2 606 in the manner set forth below, is initialized to be equal to one; and (2) a pointer, "PEB2", used by excess bandwidth scheduler for Egress_2 604 in the manner set forth below, is initialized to be equal to one.

Method step 1103 illustrates the inquiry as to whether at least one of Ingress_1-Egress_2 queue 518, or Ingress_2-Egress_2 queue 522, or Ingress_3-Egress_2 queue 526 feeding Egress_2 514 has a packet waiting for transmission. In the event that the inquiry shown in method step 1103 finds that none of Ingress_1-Egress_2 queue 518, or Ingress_2-Egress_2 queue 522, or Ingress_3-Egress_2 queue 526 feeding Egress_2 514 has a packet waiting for transmission, the process proceeds to method step 1105 which depicts that no packet is sent. Thereafter, the process proceeds to method step 1103 and executes from that point.

In the event that the inquiry shown in method step 1103 finds that at least one of Ingress_1-Egress_2 queue 518, or Ingress_2-Egress_2 queue 522, or Ingress_3-Egress_2 queue 526 feeding Egress_2 514 has a packet waiting for transmission, the process proceeds to method step 1107 which depicts an embodiment of an inquiry as to whether any one or more queues which have a packet waiting for transmission also have a non-zero bandwidth counter; method step 1107 shows that in one embodiment the inquiry is accomplished by checking whether any one of the following conditions is met:

Is $W_{Ingress\_1\_for\_Egress\_2}$ 908 greater than zero and is at least one packet resident at Ingress_1-Egress_2 queue 518? or Is $W_{Ingress\_2\_for\_Egress\_2}$ 910 greater than zero and is at least one packet resident at Ingress_2-Egress_2 queue 522? or Is $W_{Ingress\_3\_for\_Egress\_2}$ 912 greater than zero and at least one packet is resident at Ingress_3-Egress_2_queue 526?

In the event that any one of the foregoing conditions is true, the process proceeds to method step 1109 which depicts the transmission of a packet under the control of guaranteed minimum bandwidth scheduler for Egress_2 606 utilizing a process, an embodiment of which is described in FIGS. 11B1 and 11B2, below. In the event that none of the foregoing conditions of method step 1107 is true, the process proceeds to method step 1111 which depicts the transmission of a packet under the control of excess bandwidth scheduler for Egress_2 604, an embodiment of which is described in FIGS. 1C1 and 11C2, below. Subsequent to the performance of either method step 1109 or 1111 the process loops back to method step 1103 and continues from that point.

With reference now to FIG. 11B1, depicted is a high-level logic flowchart showing an embodiment of a process, referenced in method step 1109 of FIG. 11A, whereby a packet is transmitted under the control of guaranteed minimum bandwidth scheduler for Egress_2 606. Method step 1109A depicts the start of the "packet transmit under the control of minimum bandwidth scheduler" process. Method step 1106 depicts the inquiry of whether $W_{Ingress\_(PE2)\_for\_Egress\_2}$ (e.g., $W_{Ingress\_(PE2)\_for\_Egress\_2}$ would equate to $W_{Ingress\_1\_for\_Egress\_2}$ if PE2 was equal to one, $W_{Ingress\_2\_for\_Egress\_2}$ if PE2 was equal to two, etc.) is greater than zero.

In the event that the inquiry depicted in method step 1106 indicates that $W_{Ingress\_(PE2)\_for\_Egress\_2}$ is greater than zero, the process proceeds to method step 1108 wherein is illustrated determination of whether at least one packet is resident at the Ingress_(PE2)-Egress_2 queue (e.g., Ingress_(PE2)-Egress_2 queue would equate to Ingress_1-Egress_2 queue 518 if PE2 was equal to one, Ingress_2-Egress_2 queue 522 if PE2 was equal to two, etc.). In the event that a packet is resident at the Ingress_(PE2)-Egress_2 queue, the process proceeds to method step 1110 wherein is shown that a packet from the Ingress_(PE2)-Egress_2 queue is transmitted out of crossbar switch 136 via Egress_2 514. Thereafter, the process proceeds to method step 1112 wherein it is shown that $W_{Ingress\_(PE2)\_for\_Egress\_2}$ is reduced by an amount representative of the packet length that was transmitted from the Ingress_(PE2)-Egress_2 queue out of crossbar switch 136 over Egress_2 514 (the example just described is for variable length packets; alternatively, if fixed length packets are used, the reduction in the bandwidth counter can be achieved by use of a "shortcut," which is that the minimum bandwidth is specified by certain number of packets to be transmitted during time interval T (Time_Interval_for_Egress_2), and thus the reduction in bandwidth can be accomplished merely by subtracting the number one from the bandwidth counter). Thereafter, the process proceeds to method step 1113 which shows that pointer PE2 is updated utilizing an "update point PE2 process," an embodiment of which is described in FIG. 11B2, below. Thereafter, the process proceeds to method step 1117 which shows the end of the embodiment of the "packet transmit under the control of minimum bandwidth scheduler" process, as such embodiment is illustrated in FIG. 11B1.

In the event that the inquiry depicted in method step 1108 yields the determination that there is not at least one packet resident at the Ingress_(PE2)-Egress_2 queue (i.e., the queue is empty), the process proceeds to method step 1107, which shows that pointer PE2 is updated utilizing an "update pointer PE2" process, an embodiment of which is described in FIG. 11B2, below.

In the event that the inquiry of method step 1106 indicates that $W_{Ingress\_(PE2)}$ for $_{Egress\_2}$ is zero or less, the process proceeds to method step 1107, which shows that pointer PE2 is updated utilizing an "update pointer PE2" process, an embodiment of which is described in FIG. 11B2, below.

Referring now to FIG. 11B2 depicted is a high-level logic flowchart illustrating an embodiment of a process, referenced in method step 1113, utilized to update pointer PE2. Method step 1113A shows the start of the "update pointer PE2" process. Method step 1116 depicts that the value of pointer PE2 is incremented by one. Thereafter, the process proceeds to method step 1114 wherein is depicted the inquiry as to whether the value of pointer PE2 is less than or equal to the highest ordinal number of ingresses associated with Egress_2 514 (e.g., there are three ingresses—Ingress_1 500, Ingress_2 502, and Ingress_3 504—associated with Egress_2 514 in FIG. 9). In the event that the value of pointer PE2 is less than or equal to the highest ordinal number of ingresses associated with Egress_2 514, the process proceeds to method step 1115 wherein it is shown that the "update pointer PE2" process ends and the flow resumes subsequent to the step which called upon the process shown in FIG. 11B2 (e.g., flow will resume subsequent to method step 1113 in one instance, and subsequent to method step 1107 in another instance).

In the event that the inquiry shown in method step 1114 yields a determination that the value of pointer PE2 is greater than the highest ordinal number of ingresses, the process proceeds to method step 1102 which depicts that the value of pointer PE2 is re-initialized to be equal to one. Thereafter, the process proceeds to method step 1115 wherein it is shown that the "update pointer PE2" process ends. Thereafter, the flow resumes subsequent to the step which called upon the "update pointer PE2" process shown in FIG. 11B2 (e.g., flow will resume subsequent to method step 1113 in one instance, and subsequent to method stop 1107 in another instance).

With reference now to FIG. 11C1, depicted is a high-level logic flowchart showing an embodiment of a process, referenced in method step 1111 of FIG. 11A, whereby a packet is transmitted under the control of excess bandwidth scheduler for Egress_2 604. Method step 1111A depicts the start of the "packet transmit under the control of excess bandwidth scheduler" process. Method step 1132 depicts the inquiry of whether at least one packet is resident at Ingress_(PEB2)_Egress_2 queue (e.g., Ingress_(PEB2)-Egress_2 queue would equate to Ingress_1-Egress_2 queue 518 if PEB2 was equal to one, Ingress_2-Egress_2 queue 522 if PEB2 was equal to two, etc.). In the event that at least one packet is resident at Ingress_(PEB2)_Egress_2 queue, the process proceeds to method step 1122 and executes from that point. Otherwise, the process proceeds to method step 1133 which shows that pointer PEB2 is updated utilizing an "update pointer PEB2" process, an embodiment of which is described in FIG. 11C2, below. Thereafter, the process proceeds to method step 1132 and executes from that point.

Method step 1122 shows the transmission of a packet from Ingress_(PEB2)-Egress_2 queue (the notation used indicates that Ingress_(PEB2)-Egress_2 queue equates to Ingress_1-Egress_2 queue 518 if the value of PEB2 is equal to one, or equates to Ingress_2-Egress_2 queue 522 if the value of PEB2 is equal to two, etc.). Subsequent to the method step 1122, process proceeds to method step 1123 which shows that pointer PEB2 is updated using an "update pointer PEB2" process, an embodiment of which is described in FIG. 11C2, below. Thereafter, the process proceeds to method step 1125, which shows the end of the embodiment of the "packet transmit under the control of excess bandwidth scheduler" process, as such embodiment is illustrated in FIG. 11C1.

Referring now to FIG. 11C2, depicted is a high-level logic flowchart illustrating an embodiment of a process, referenced in method step 1123, utilized to update pointer PEB2. Method step 1123A shows the start of "update pointer PEB2" the process. Method step 1130 depicts that the value of pointer PEB2 is incremented by one. Thereafter, the process proceeds to method step 1131 wherein is depicted the inquiry as to whether the value of pointer PEB2 is less than or equal to the highest ordinal number of ingresses associated with Egress_2

514 (e.g., there are three ingresses—Ingress_1 500, Ingress_2 502, and Ingress_3 504—associated with Egress_2 514 in FIG. 9). In the event that the value of pointer PEB2 is less than or equal to the highest ordinal number of ingresses associated with Egress_2 514, the process proceeds to method step 1135 wherein it is shown that the "update pointer PEB2" process ends. Thereafter, the flow resumes subsequent to the step which called upon the "update pointer PEB2" process shown in FIG. 11C2 (e.g., flow will resume subsequent to method step 1123 in one instance, and subsequent to method step 1133 in another instance).

In the event that the inquiry shown in method step 1131 yields a determination that the value of pointer PEB2 is greater than the highest ordinal number of ingresses, the process proceeds to method step 1124 which depicts that the value of pointer PEB2 is re-initialized to be equal to one. Thereafter, the process proceeds to method step 1135 wherein it is shown that the "update pointer PEB2" process ends. Thereafter, the flow resumes subsequent to the step which called upon the process shown in FIG. 11C2 (e.g., flow will resume subsequent to method step 1113 in one instance, and subsequent to method step 1123 in another instance).

The foregoing has set forth specific examples of embodiments of the invention in the context of a 3×2 crosspoint switch (i.e., three ingress two egress switch). The first example showed the functioning of an embodiment with respect Egress_1 512. The second example showed the functioning of an embodiment with respect Egress_2 514. Those skilled in the art will recognize that the principles shown in the specific example can be generalized to any M×N crosspoint switch.

Figure 12:
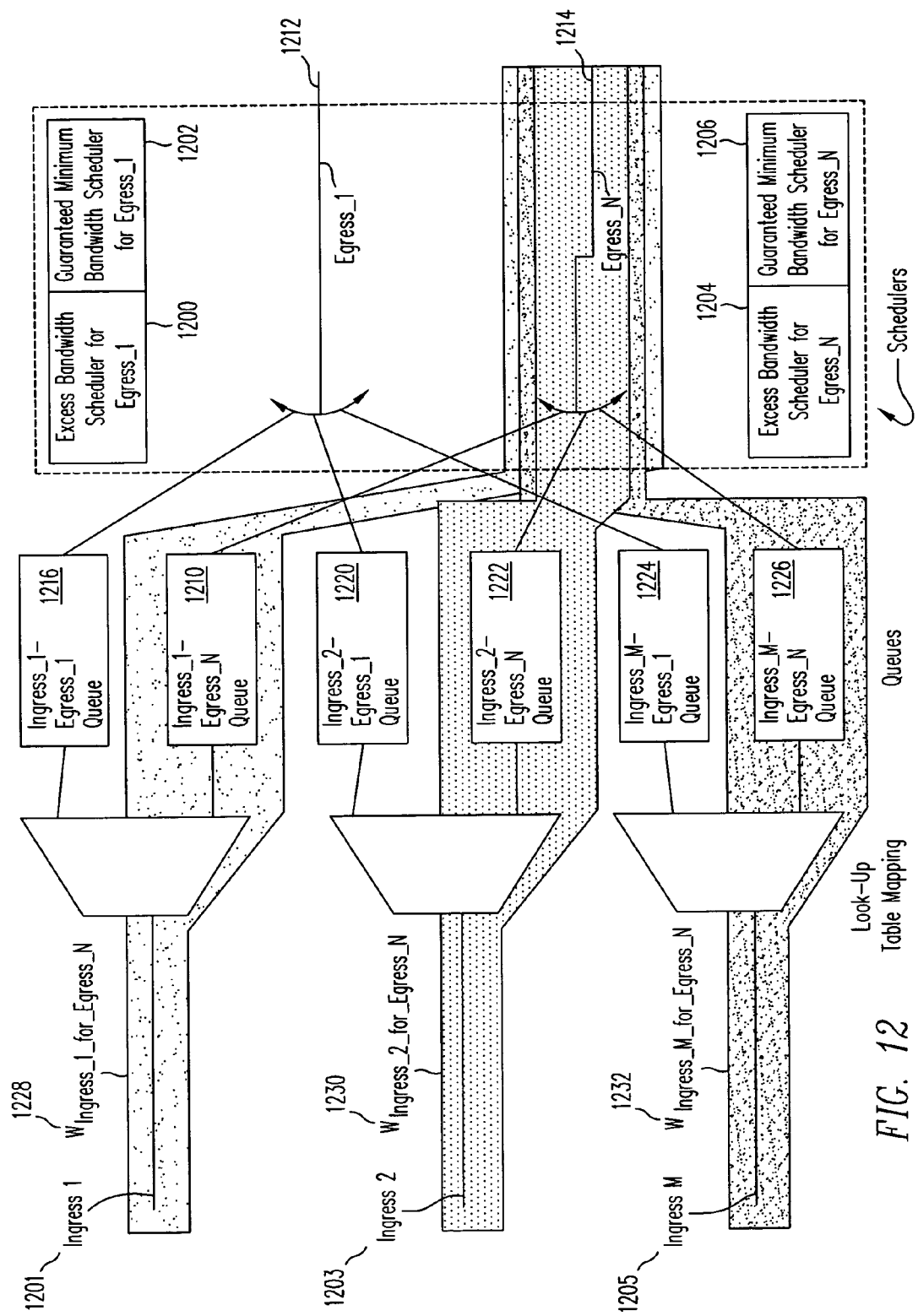
FIG. 12 shows a high-level partially schematic block diagram depicting an embodiment of the present invention in the context of an input queued switch where each ingress-egress pair has a queue which can be accessed independently of, and simultaneously with, other queues associated with other ingress-egress pairs.

Referring now to FIG. 12, shown is a high-level partially schematic block diagram depicting an embodiment of the present invention in the context of an input queued switch where each ingress-egress pair has a queue which can be accessed independently of, and simultaneously with, other queues associated with other ingress-egress pairs. Examples of queues are illustrated in FIG. 12 as ingress-egress queues 1216-1226, each of which is shown respectively connected between its associated particular ingress-egress pair.

Illustrated is that both switch egress_1 1212 and switch egress_N 1214 have respectively associated with them (1) excess bandwidth schedulers 1200, 1204, and (2) guaranteed minimum bandwidth schedulers 1202, 1206. Each guaranteed minimum bandwidth scheduler for each egress assures that each queue, and consequently each ingress associated with each queue, is given some "guaranteed," or target, minimum data transmission per unit time (as used herein the term "guaranteed" means essentially a target which will be satisfied if the physical constraints of a switch allow) via the guaranteed minimum bandwidth scheduler's egress, irrespective of the priority of the packets that might be resident within each queue. This substantially ensures that no switch ingress is ever completely "starved" of bandwidth, even if the only packets resident within a particular queue associated with a switch ingress are packets of the lowest possible priority. In the event that no queue requesting data transmission has an unmet guaranteed minimum data transmission per unit time, the excess bandwidth scheduler for the egress assigns such bandwidth over and above that bandwidth constituting guaranteed minimum bandwidth to the queues associated with the egress in a fair manner. It is to be understood that, in at least one embodiment, when utilized with a cross-point buffer switch, the guaranteed minimum bandwidth scheduler and excess bandwidth scheduler at each egress functions substantially independent of guaranteed minimum bandwidth schedulers and excess bandwidth schedulers at resident at other egresses.

Depicted as associated with switch egress_N 1214 is guaranteed minimum bandwidth scheduler for egress_N 1206 and excess bandwidth scheduler for egress_N 1204. As discussed, guaranteed minimum bandwidth scheduler for egress_N 1206 is keyed to a guaranteed minimum bandwidth associated with each switch ingress 1201, 1203, 1205. The guaranteed minimum bandwidth is represented by a bandwidth counter, associated with each particular switch ingress 1201, 1203, 1205, which is indicative of a relationship between (a) an amount of actual data transmitted, during a prescribed unit of time T, from each particular switch ingress 1201, 1203, 1205 to switch egress_N 1214 and (b) a target minimum amount of actual data transmission from each particular switch ingress 1201, 1203, 1205 to switch egress_N 1214. These bandwidth counters are represented in FIG. 12 as $W_{Ingress\_1\_for\_Egress\_N}$ 1228, $W_{Ingress\_2\_for\_Egress\_N}$ 1230, and $W_{Ingress\_1\_for\_Egress\_N}$ 1232.

Figure 13:
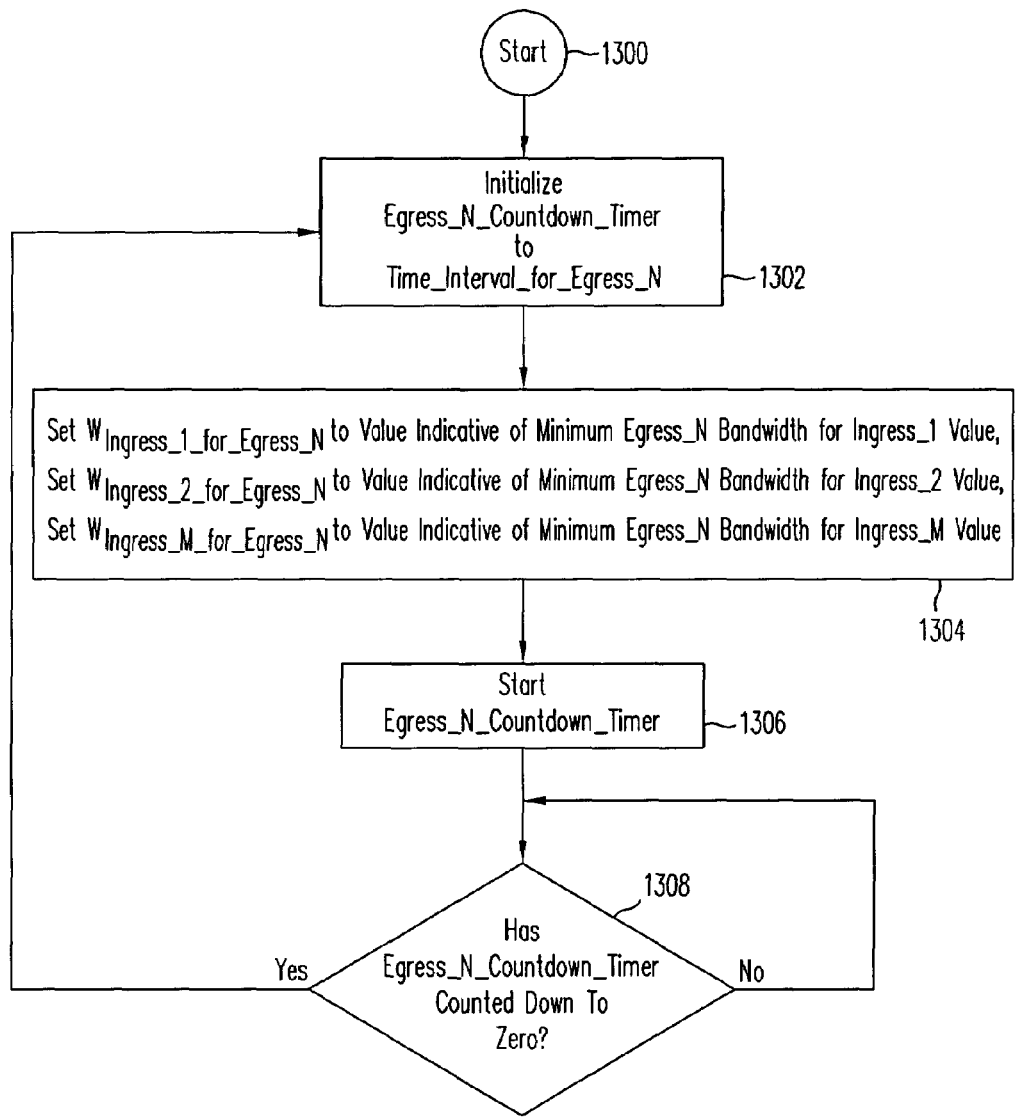
FIG. 13 depicts a high-level logic flowchart which illustrates the control of the values of bandwidth counters for Ingress_1 1201, Ingress_2 1203, and Ingress_M 1205. Method step 1300 shows the start of the process.

With reference now to FIG. 13, depicted is a high-level logic flowchart which illustrates the control of the values of bandwidth counters for Ingress_1 1201, Ingress_2 1203, and Ingress_M 1205. Method step 1300 shows the start of the process. Method step 1302 depicts that Egress_N_Countdown_Timer is initialized to Time_Interval_for_Egress_N. Method step 1304 illustrates that $W_{Ingress\_1\_for\_Egress\_N}$ 1228, $W_{Ingress\_2\_for\_Egress\_N}$ 1230, and $W_{Ingress\_M\_for\_Egress\_N}$ 1232 are each set to values indicative of the minimum data transmission guaranteed to their respective ingresses during the Time_Interval_for_Egress_N. Method step 1306 illustrates that Egress_N_Countdown_Timer is started and begins to countdown by some predetermined amount of time decrement (the actual amount of decrement is a design choice). Method step 1308 shows the determination of whether Egress_N_Countdown_Timer has counted down to be equal to zero. In the event that Egress_N_Countdown_Timer is greater than zero, the process loops to method step 1308. In the event that Egress_N_Countdown_Timer is less than or equal to zero, the process returns to method step 1302 and executes from that point. Thus, as can be seen, the high-level logic flowchart of FIG. 13 ensures that $W_{Ingress\_1\_for\_Egress\_N}$ 1228, $W_{Ingress\_2\_for\_Egress\_N}$ 1230, and $W_{Ingress\_M\_for\_Egress\_N}$ 1232 are each reset to values indicative of the minimum bandwidth guaranteed to their respective ingresses at the start of every successive Time_Interval_for_Egress_N.

It is to be understood that the process illustrated in FIG. 13 is to be running simultaneous with the process which will now be shown in FIGS. 14A, 14B1, 14B2, 14C1, and 14C2. The process illustrated in FIG. 13 ensures that $W_{Ingress\_1\_for\_Egress\_N}$ 1228, $W_{Ingress\_2\_for\_Egress\_N}$ 1230, and $W_{Ingress\_M\_for\_Egress\_N}$ 1232 are reset to their predetermined values after the elapsing of every Time_Interval_for_Egress_N period of time. The process shown in FIGS. 14A, 14B1, 14B2, 14C1, and 14C2 depicts how $W_{Ingress\_1\_for\_Egress\_N}$ 1228, $W_{Ingress\_2\_for\_Egress\_N}$ 1230, and $W_{Ingress\_M\_for\_Egress\_N}$ 1232 can be utilized to substantially ensure that none of Ingress_1 1201, Ingress_2 1203, or Ingress_M 1205 is being starved of Egress_N 1214 bandwidth.

Figure 14A:
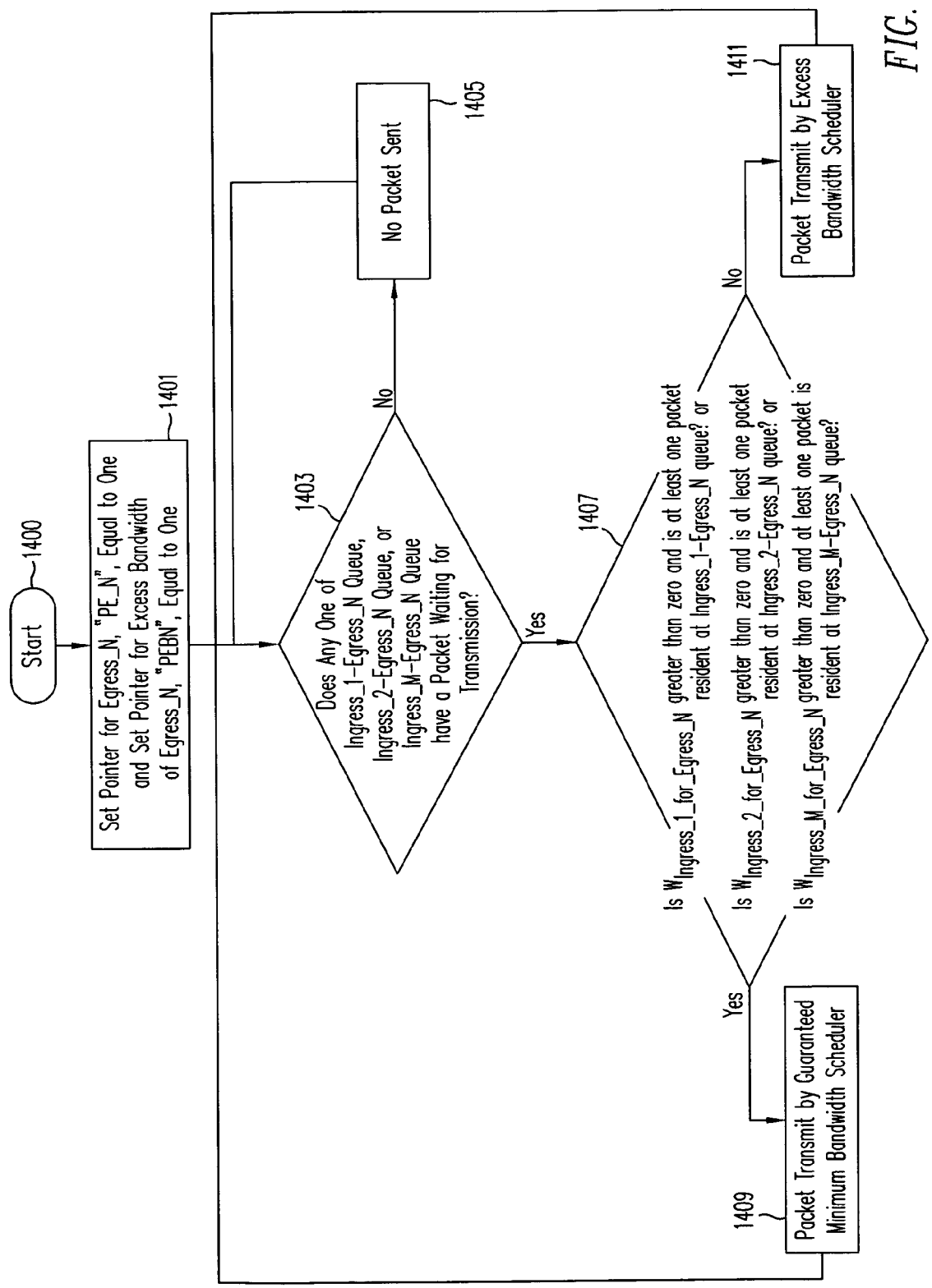
FIG. 14A shows a high-level logic flowchart illustrating a process which can be utilized by excess bandwidth scheduler for Egress_N 1204 and guaranteed minimum bandwidth scheduler for Egress_N 1206.

Referring now to FIG. 14A, shown is a high-level logic flowchart illustrating a process which can be utilized by excess bandwidth scheduler for Egress_N 1204 and guaranteed minimum bandwidth scheduler for Egress_N 1206. Method step 1400 shows the start of the process. Method step 1401 depicts that (1) a pointer, "PE_N", used by guaranteed minimum bandwidth scheduler for Egress_N 1202 in the manner set forth below, is initialized to be equal to one; and (2) a pointer, "PEB_N", used by excess bandwidth scheduler for Egress_N 1204 in the manner set forth below, is initialized to be equal to one.

Method step 1403 illustrates the inquiry as to whether at least one of Ingress_1-Egress_N queue 1218, or Ingress_2-Egress_N queue 1222, or Ingress_M-Egress_N queue 1226 feeding Egress_N 1214 has a packet waiting for transmission. In the event that the inquiry shown in method step 1403 finds that none of Ingress_1-Egress_N queue 1218, or Ingress_2-Egress_N queue 1222, or Ingress_M-Egress_N queue 1226 feeding Egress_N 1214 has a packet waiting for transmission, the process proceeds to method step 1405 which depicts that no packet is sent. Thereafter, the process proceeds to method step 1403 and executes from that point.

In the event that the inquiry shown in method step 1403 finds that at least one of Ingress_1-Egress_N queue 1218, or Ingress_2-Egress_N queue 1222, or Ingress_M-Egress_N queue 1226 feeding Egress_N 1214 has a packet waiting for transmission, the process proceeds to method step 1407 which depicts an embodiment of an inquiry as to whether any one or more queues which have a packet waiting for transmission also have a non-zero bandwidth counter; that is, method step 1407 shows that in one embodiment the inquiry is accomplished by checking whether any one of the following conditions is met:

Is $W_{Ingress\_1\_for\_Egress\_N}$ 1228 greater than zero and is at least one packet resident at Ingress_1-Egress_N queue 1218? or Is $W_{Ingress\_2\_for\_Egress\_N}$ 1230 greater than zero and is at least one packet resident at Ingress_2-Egress_N queue 1222? or Is $W_{Ingress\_M\_for\_Egress\_N}$ 1232 greater than zero and at least one packet is resident at Ingress_M-Egress_N queue 1228?

In the event that any one of the foregoing conditions is true, the process proceeds to method step 1409 which depicts the transmission of a packet under the control of guaranteed minimum bandwidth scheduler for Egress_N 1206 utilizing a process, an embodiment of which is described in FIGS. 14B1 and 14B2, below. In the event that none of the foregoing conditions of method step 1407 is true, the process proceeds to method step 1411 which depicts the transmission of a packet under the control of excess bandwidth scheduler for Egress_N 1204, an embodiment of which is described in FIGS. 14C1 and 14C2, below. Subsequent to the performance of either method step 1409 or 1411 the process loops back to method step 1403 and continues from that point.

With reference now to FIG. 14B1, depicted is a high-level logic flowchart showing an embodiment of a process, referenced in method step 1409 of FIG. 14A, whereby a packet is transmitted under the control of guaranteed minimum bandwidth scheduler for Egress_N 1206. Method step 1409A depicts the start of the "packet transmit under the control of minimum bandwidth scheduler" process. Method step 1406 depicts the inquiry of whether $W_{Ingress\_(PE\_N)\_for\_Egress\_N}$ (e.g., $W_{Ingress\_(PE\_N)\_for\_Egress\_N}$ would equate to $W_{Ingress\_1\_for\_Egress\_N}$ if PE_N was equal to one, $W_{Ingress\_2\_for\_Egress\_N}$ if PE_N was equal to two, etc.) is greater than zero.

In the event that the inquiry depicted in method step 1406 indicates that $W_{Ingress\_(PE\_N)\_for\_Egress\_N}$ is greater than zero, the process proceeds to method step 1408 wherein is illustrated determination of whether at least one packet is resident at the Ingress_(PE_N)-Egress_N queue (e.g., Ingress_(PE_N)-Egress_N queue would equate to Ingress_1-Egress_N queue 1218 if PE_N was equal to one, Ingress_2-Egress_N queue 1222 if PE_N was equal to two, etc.). In the event that a packet is resident at the Ingress_(PE_N)-Egress_N queue, the process proceeds to method step 1410 wherein is shown that a packet from the Ingress_(PE_N)-Egress_N queue is transmitted out of crossbar switch 136 via Egress_N 1214. Thereafter, the process proceeds to method step 1412 wherein it is shown that $W_{Ingress\_(PE\_N)\_for\_Egress\_N}$ is reduced by an amount representative of the packet length that was transmitted from the Ingress_(PE_N)-Egress_N queue out of crossbar switch 136 over Egress_N 1214 (the example just described is for variable length packets; alternatively, if fixed length packets are used, the reduction in the bandwidth counter can be achieved by use of a "shortcut," which is that the minimum bandwidth is specified by certain number of packets to be transmitted during time interval T, and thus the reduction in bandwidth can be accomplished merely by subtracting the number one from the bandwidth counter). Thereafter, the process proceeds to method step 1413 which shows that pointer PE_N is updated utilizing an "update point PE_N process," an embodiment of which is described in FIG. 14B2, below. Thereafter, the process proceeds to method step 1417 which shows the end of the embodiment of the "packet transmit under the control of minimum bandwidth scheduler" process, as such embodiment is illustrated in FIG. 14B1.

In the event that the inquiry depicted in method step 1408 yields the determination that there is not at least one packet resident at the Ingress_(PE_N)-Egress_N queue (i.e., the queue is empty), the process proceeds to method step 1407, which shows that pointer PE_N is updated utilizing an "update pointer PE_N" process, an embodiment of which is described in FIG. 14B2, below.

In the event that the inquiry of method step 1406 indicates that $W_{Ingress\_(PE\_N)\_for\_Egress\_N}$ is zero or less, the process proceeds to method step 1407, which shows that pointer PE_N is updated utilizing an "update pointer PE_N" process, an embodiment of which is described in FIG. 14B2, below.

Referring now to FIG. 14B2 depicted is a high-level logic flowchart illustrating an embodiment of a process, referenced in method step 1413, utilized to update pointer PE_N. Method step 1413A shows the start of the "update pointer PE_N" process. Method step 1416 depicts that the value of pointer PE_N is incremented by one. Thereafter, the process proceeds to method step 1414 wherein is depicted the inquiry as to whether the value of pointer PE_N is less than or equal to the highest ordinal number of ingresses associated with Egress_N 1214 (e.g., there are three ingresses—Ingress_1 1201, Ingress_2 1203, and Ingress_M 1205—associated with Egress_N 1214 in FIG. 12). In the event that the value of pointer PE_N is less than or equal to the highest ordinal number of ingresses associated with Egress_N 1214, the process proceeds to method step 1415 wherein it is shown that the "update pointer PE_N" process ends and the flow resumes subsequent to the step which called upon the process shown in FIG. 14B2 (e.g., flow will resume subsequent to method step 1413 in one instance, and subsequent to method step 1407 in another instance).

In the event that the inquiry shown in method step 1414 yields a determination that the value of pointer PE_N is greater than the highest ordinal number of ingresses, the process proceeds to method step 1402 which depicts that the value of pointer PE_N is re-initialized to be equal to one. Thereafter, the process proceeds to method step 1415 wherein it is shown that the "update pointer PE_N" process ends. Thereafter, the flow resumes subsequent to the step which called upon the "update pointer PE_N" process shown in FIG.

14B2 (e.g., flow will resume subsequent to method step 1413 in one instance, and subsequent to method stop 1407 in another instance).

With reference now to FIG. 14C1, depicted is a high-level logic flowchart showing an embodiment of a process, referenced in method step 1411 of FIG. 14A, whereby a packet is transmitted under the control of excess bandwidth scheduler for Egress_N 1204. Method step 1411A depicts the start of the "packet transmit under the control of excess bandwidth scheduler" process. Method step 1432 depicts the inquiry of whether at least one packet is resident at Ingress_(PEB_N)_Egress_N queue (e.g., Ingress_(PEB_N)-Egress_N queue would equate to Ingress_1-Egress_N queue 1218 if PEB_N was equal to one, Ingress_2-Egress_N queue 1222 if PEB_N was equal to two, etc.). In the event that at least one packet is resident at Ingress_(PEB_N)_Egress_N queue, the process proceeds to method step 1422 and executes from that point. Otherwise, the process proceeds to method step 1433 which shows that pointer PEB_N is updated utilizing an "update pointer PEB_N" process, an embodiment of which is described in FIG. 14C2, below. Thereafter, the process proceeds to method step 1432 and executes from that point.

Method step 1422 shows the transmission of a packet from Ingress_(PEB_N)-Egress_N queue (the notation used indicates that Ingress_(PEB_N)-Egress_N queue equates to Ingress_1-Egress_N queue 1218 if the value of PEB_N is equal to one, or equates to Ingress_2-Egress_N queue 1222 if the value of PEB_N is equal to two, etc.). Subsequent to method step 1422, process proceeds to method step 1423 which shows that pointer PEB_N is updated using an "update pointer PEB_N" process, an embodiment of which is described in FIG. 14C2, below. Thereafter, the process proceeds to method step 1425, which shows the end of the embodiment of the "packet transmit under the control of excess bandwidth scheduler" process, as such embodiment is illustrated in FIG. 14C1.

Referring now to FIG. 14C2, depicted is a high-level logic flowchart illustrating an embodiment of a process, referenced in method step 1423, utilized to update pointer PEB_N. Method step 1423A shows the start of "update pointer PEB_N" the process. Method step 1430 depicts that the value of pointer PEB_N is incremented by one. Thereafter, the process proceeds to method step 1431 wherein is depicted the inquiry as to whether the value of pointer PEB_N is less than or equal to the highest ordinal number of ingresses associated with Egress_N 1214 (e.g., there are three ingresses—Ingress_1 1201, Ingress_2 1203, and Ingress_M 1205—associated with Egress_N 1214 in FIG. 12). In the event that the value of pointer PEB_N is less than or equal to the highest ordinal number of ingresses associated with Egress_N 1214, the process proceeds to method step 1435 wherein it is shown that the "update pointer PEB_N" process ends. Thereafter, the flow resumes subsequent to the step which called upon the "update pointer PEB_N" process shown in FIG. 14C2 (e.g., flow will resume subsequent to method step 1423 in one instance, and subsequent to method step 1433 in another instance).

In the event that the inquiry shown in method step 1431 yields a determination that the value of pointer PEB_N is greater than the highest ordinal number of ingresses, the process proceeds to method step 1424 which depicts that the value of pointer PEB_N is re-initialized to be equal to one. Thereafter, the process proceeds to method step 1435 wherein it is shown that the "update pointer PEB_N" process ends. Thereafter, the flow resumes subsequent to the step which called upon the process shown in FIG. 14C2 (e.g., flow will resume subsequent to method step 1413 in one instance, and subsequent to method step 1423 in another instance).

II. Crossbar Switch Having Input Buffers

The foregoing discussion examined the application of the "minimum bandwidth guarantee for crossbar switches having input queues" scheme in the context of a cross-point buffer switch. The following discussion examines application of the "minimum bandwidth guarantee for crossbar switches having input queues" scheme in the context of a crossbar switch having queues wherein each queue at a particular ingress is not accessible independently of other queues at that particular ingress.

Figure 15:
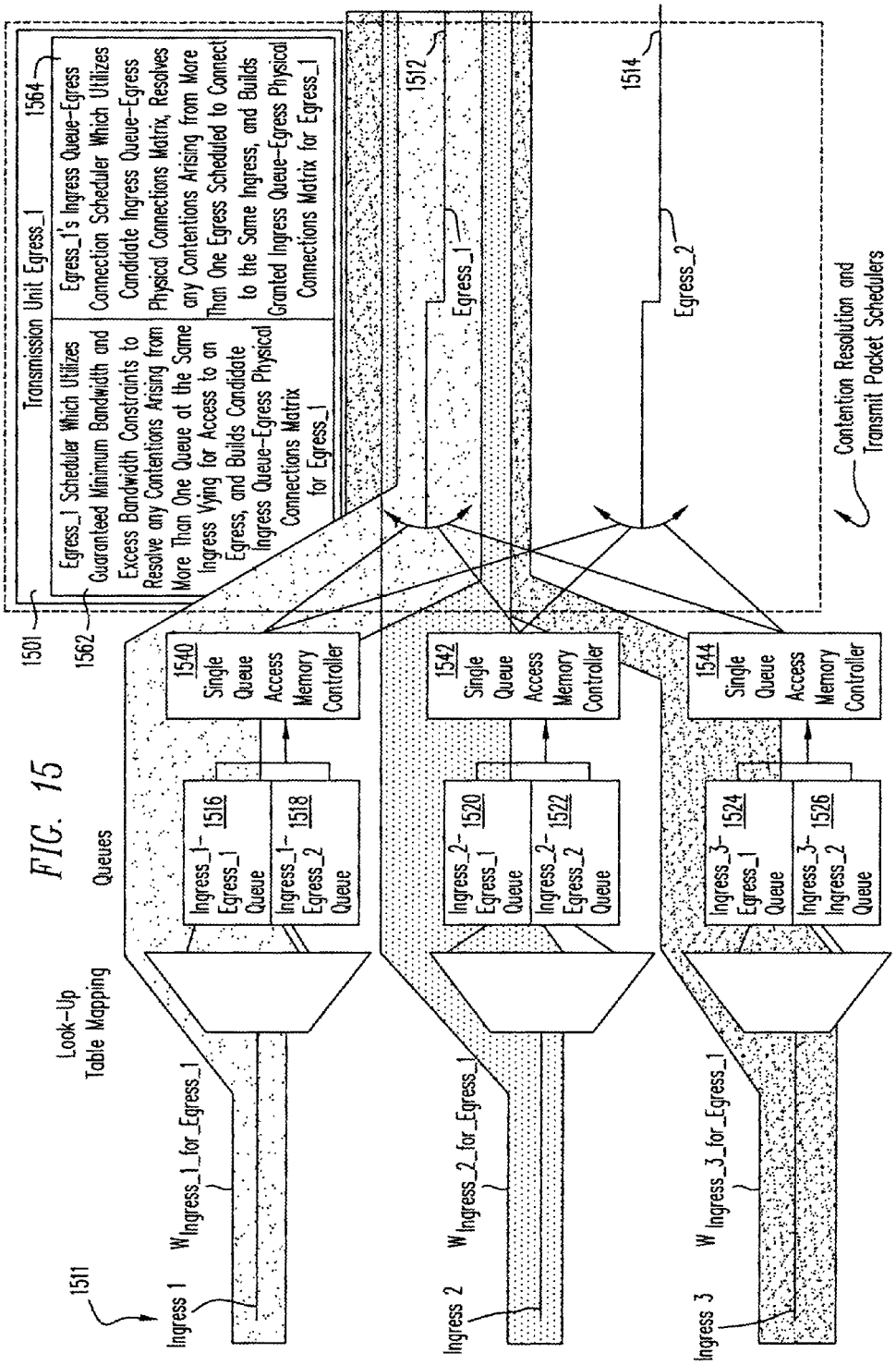
FIGS. 15 and 16 show a pictographic representations of the "minimum bandwidth guarantee for crossbar switches having input queues" scheme employed within a crossbar switch having non-independently accessible input buffers environment (hereinafter, for sake of brevity, a crossbar switch having non-independently accessible input buffers will be referred to as an "input-buffered crossbar switch").
Figure 16:
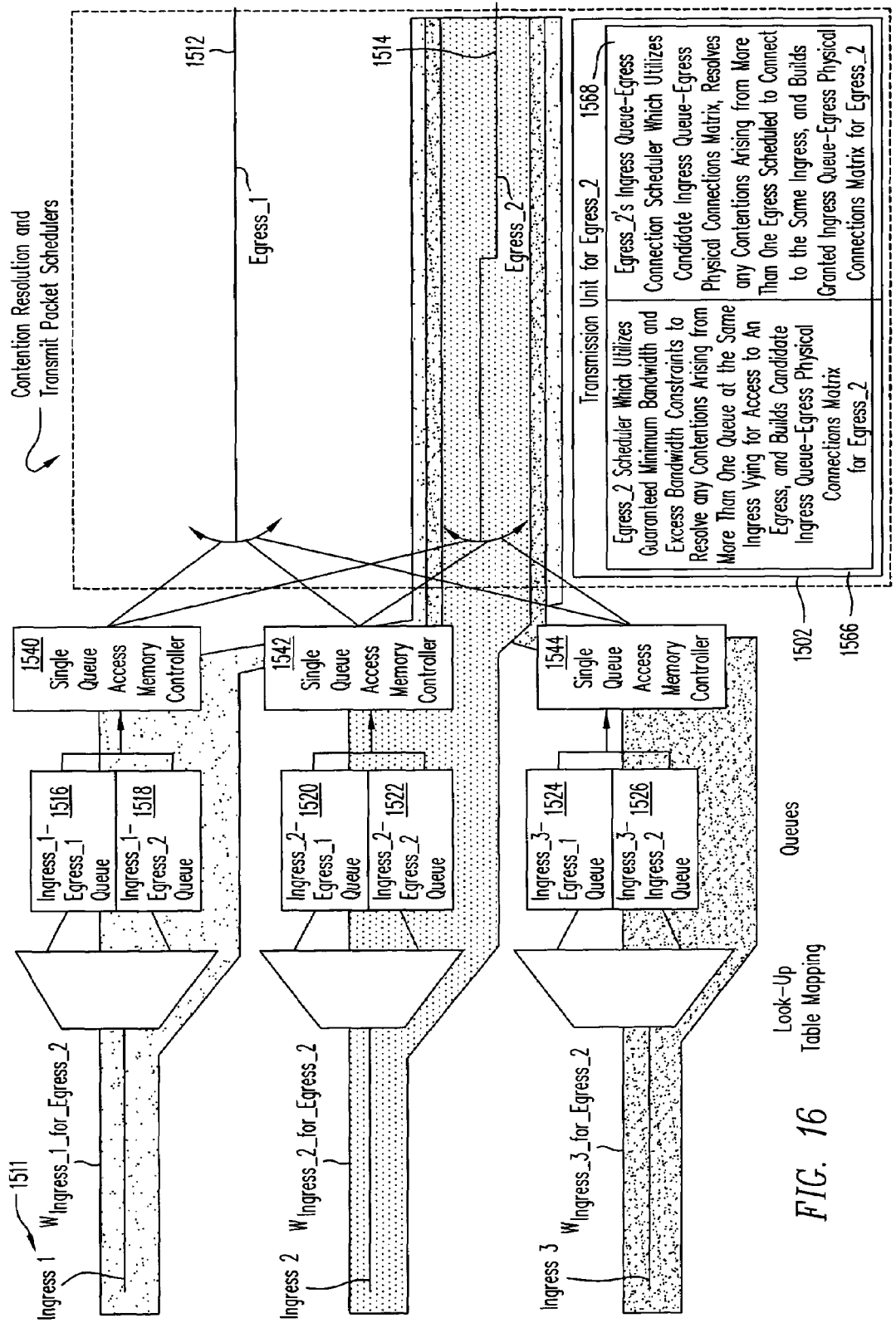

With reference now to FIGS. 15 and 16, shown are a pictographic representations of the "minimum bandwidth guarantee for crossbar switches having input queues" scheme employed within a crossbar switch having non-independently accessible input buffers (hereinafter, for sake of brevity, a crossbar switch having non-independently accessible input buffers will be referred to as an "input-buffered crossbar switch"). As can be seen, the crossbar switch is similar to the cross-point buffer switch shown in FIG. 6, except that "queues" 1516-1526 are shown as contiguous areas of input buffers and that the schedulers must access the "queues" 1516-1526 through memory controllers 1540-1544.

As shown, bandwidth counters are still associated with ingress-egress pairs in substantially the same fashion as was described in relation to FIG. 6. However, the fact that only one "queue" at an ingress can be accessed at a particular time significantly complicates the way in which bandwidth counters can be utilized by the devices shown in FIGS. 15 and 16 to apply the "minimum bandwidth guarantee for crossbar switches having input queues" to input-buffered crossbar switches. That is, when an attempt is made to directly employ the "minimum bandwidth guarantee for crossbar switches having input queues" scheme in an input-buffered crossbar switch, several problems arise which must be overcome to allow substantially the optimum functioning of the scheme.

As discussed above, because each egress queue at each ingress in a cross-point buffer switch is independently accessible, the egress schedulers at each egress run autonomously (in relation to other egress schedulers), because, in a cross-point buffer switch, an egress connected to a queue at an ingress does not prevent a different egress from connecting with another queue at the same ingress. As has been demonstrated, the foregoing is not true for an input-buffered crossbar switch. Each "queue" at an input-buffered crossbar switch ingress (e.g., Ingess_1-Egress_1 queue 1516 and Ingress_1-Egress_2 queue 1518) is actually a region of memory to which access is controlled by a memory controller (e.g., single access memory controller 1540). Consequently, only one "queue" (e.g., Ingess_1-Egress_1 queue 1516, or Ingress_1-Egress_2 queue 1518) at each input-buffered crossbar switch ingress (e.g., switch ingress_1 1511) can connect with any one input-buffered crossbar switch egress (Egress_1 1512) at any particular time.

Thus, at any one input-buffered crossbar switch ingress at which two or more queues are vying, or contending, for access to one or more input-buffered crossbar switch egresses, the contention between the two or more vying queues must be resolved so that a proper connection can be established for the input-buffered crossbar switch ingress, because a connection between one queue at a particular input-buffered crossbar switch ingress and an input-buffered crossbar switch egress forestalls any other connection to any other queue at that input-buffered crossbar switch ingress.

One way to solve the foregoing noted problem is to allow the queues at each input-buffered crossbar switch ingress to resolve their contentions amongst themselves. Unfortunately, this way is sub-optimum because one or more queues at another input-buffered crossbar switch ingress might be vying for access to the same input-buffered crossbar switch egress. Since queues at each input-buffered crossbar switch ingress do not "talk to each other," it was found that having the ingresses resolve their own internal contentions was sub-optimum in that even though contentions are resolved internal to, say, two different input-buffered crossbar switch ingresses, those two different input-buffered crossbar switch ingresses might still schedule themselves to connect with the same input-buffered crossbar switch egress, which would mean one of the ingresses would have to wait for connection.

The solution, described in detail below, is to move the contention resolution decisions from the input-buffered crossbar switch ingresses to each input-buffered crossbar switch egress. Thus, each input-buffered crossbar switch egress can examine all input-buffered crossbar switch ingresses that are needing to connect with it, and resolve any input-buffered crossbar switch ingress contentions so that only one of several input-buffered crossbar switch ingresses feeding a particular input-buffered crossbar switch egress will be scheduled to connect with the particular input-buffered crossbar switch egress. This solution is illustrated pictographically in FIGS. 15 and 16 by Egress_1 Scheduler 1562, which utilizes guaranteed minimum bandwidth and excess bandwidth constraints to resolve any contentions arising from more than one queue at the same ingress vying for access to an egress, and builds Candidate Ingress Queue-Egress Physical Connections Column Matrix for Egress_1—which is viewed below, for sake of illustration, as a column of a Candidate Ingress Queue-Egress Physical Connections Matrix, and Egress_2 Scheduler 1566, which utilizes guaranteed minimum bandwidth and excess bandwidth constraints to resolve any contentions arising from more than one queue at the same ingress vying for access to an egress, and builds candidate Ingress Queue-Egress Physical Connections Column Matrix for Egress_2—which is viewed below, for sake of illustration, as a column of a Candidate Ingress Queue-Egress Physical Connections Matrix.

The noted solution to the first sub-problem is a conceptual shift where the problem of contention resolution at each ingress is moved to and viewed from to the global viewpoint of each egress. This eliminates the first sub-problem, but gives rise to a second sub-problem, which arises from the fact that each egress needs to be aware of the fact that a connection between a fellow egress and a particular ingress forestalls any other egress from connecting with the so-connected ingress. That is, since the solution for the first problem allows each egress to schedule connections for itself independent of other egresses, the possibility arises that two egresses may schedule connections for themselves to the same ingress.

The solution to the second sub-problem is to systematically examine each egress scheduler's scheduled candidate connections, and eliminate scheduling conflicts between two or more egresses scheduled to access the same ingress. Thereafter, data is transmitted and bandwidth counters are adjusted as is appropriate. This solution is illustrated pictographically in FIGS. 15 and 16 by Egress_1's Ingress Queue-Egress Connection Scheduler 1564 which utilizes the Candidate Ingress Queue-Egress Physical Connections Matrix, resolves any contentions arising from more than one egress scheduled to connect to the same ingress, and builds Granted Ingress Queue-Egress Physical Connections Row Matrix for Egress_1—which is viewed below, for sake of illustration, as a row of a Granted Ingress Queue-Egress Physical Connections Matrix, and Egress_2's Ingress Queue-Egress Connection Scheduler 1568 which utilizes the Candidate Ingress Queue-Egress Physical Connections Matrix, resolves any contentions arising from more than one egress scheduled to connect to the same ingress, and builds Granted Ingress Queue-Egress Physical Connections Row Matrix for Egress_2—which is viewed below, for sake of illustration, as a row of a Granted Ingress Queue-Egress Physical Connections Matrix.

Transmission unit for Egress_1 1501 utilizes Granted Ingress Queue-Egress Physical Connections Matrix for Egress_1—which is viewed below, for sake of illustration, as a row of a Granted Ingress Queue-Egress Physical Connections Matrix—to establish an appropriate Egress_1 1512 connection with a particular ingress and, if appropriate, subsequent to data transmission decreases the bandwidth counter associated with the queue from which the data was transmitted (e.g., if the queue from which data was transmitted had a non-zero bandwidth counter, the bandwidth counter is decremented; otherwise, the bandwidth counter is left undisturbed). Transmission unit for Egress_2 1502 utilizes Granted Ingress Queue-Egress Physical Connections Matrix for Egress_2—which is viewed below, for sake of illustration, as a row of a Granted Ingress Queue-Egress Physical Connections Matrix—to establish an appropriate Egress_2 1514 connection with a particular ingress and, if appropriate, subsequent to data transmission decreases the bandwidth counter associated with the queue from which the data was transmitted (e.g., if the queue from which data was transmitted had a non-zero bandwidth counter, the bandwidth counter is decremented; otherwise, the bandwidth counter is left undisturbed).

As has been mentioned, various column and row vectors, or matrices (e.g., Candidate Ingress Queue-Egress Physical Connections Column Matrix for Egress_1; Granted Ingress Queue-Egress Physical Connections Row Matrix for Egress_1) will be viewed, or treated, in the discussion below as columns or rows of other matrices (e.g., as a column of a Candidate Ingress Queue-Egress Physical Connections Matrix, or as a row of a Granted Ingress Queue-Egress Physical Connections Matrix). The reason for this is that the overall operation of the application of the "minimum bandwidth guarantee for crossbar switches having input queues" scheme to input-buffered crossbar switches is easier to understand if the scheme is described as a sequential fashion, with operations to be performed in parallel at each egress being described via the description of such operations as being executed at each egress in sequence. However, it should be noted that although the application will be described in a sequential fashion, in one embodiment the operations described as executing in sequence at each egress are actually implemented via such processes operating in parallel at each egress with the coordinating effects arising from the sequential processes, described below, being achieved by communications between the processes executing at the respective egresses. Such a transition from sequential to parallel operation is well within the ambit of one of ordinary skill in the art, and requires only minimal experimentation.

Figure 17:
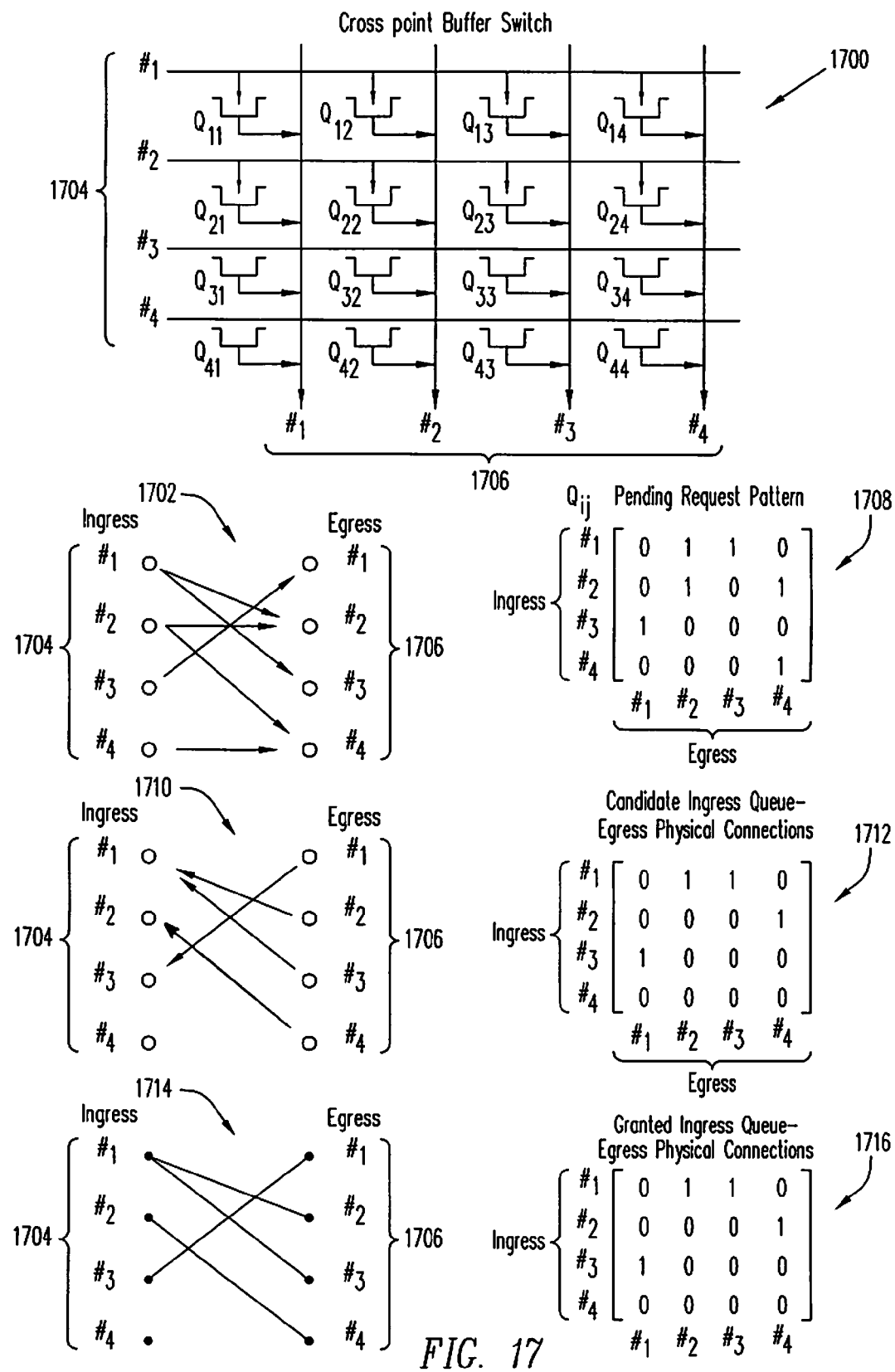
FIG. 17 shows an example of cross-point buffer switch 1700 responding to a particular state of events illustrated in pending packets requesting transmission diagram 1702.
Figure 18:
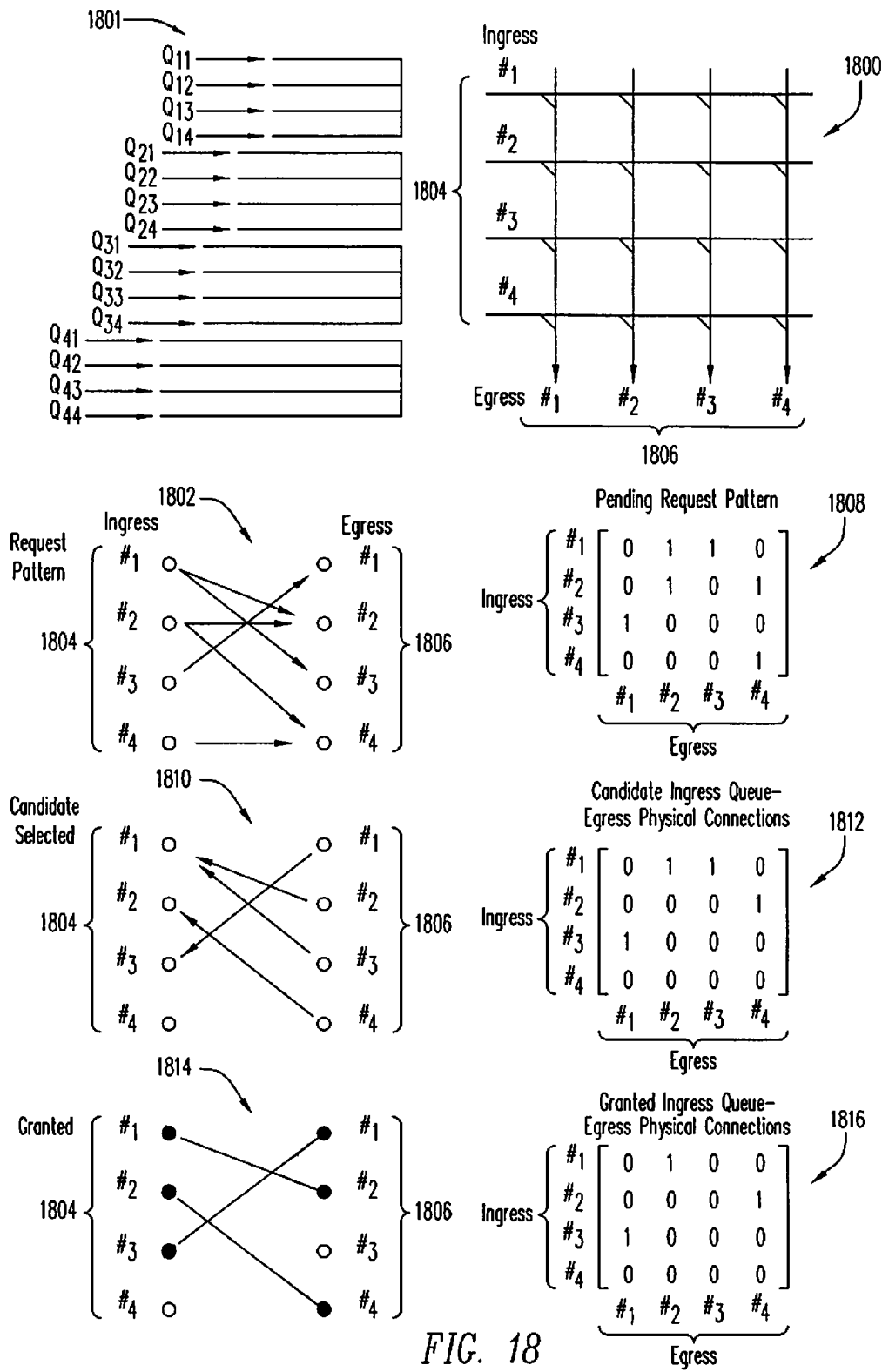
FIG. 18 depicts an example of a crossbar switch 1800, having one input buffer 1801 per each ingress of crossbar switch 1800, where each switch ingress has associated with it a number of "queues".

In order to understand the operation of processes and devices described below, it is necessary to introduce some new concepts and terminology. FIGS. 17 and 18 introduce these new concepts and terminology via the use of a first example (shown in FIG. 17) which explains the concepts and terminology in the context of a cross-point buffer switch environment (with such example constituting yet another embodiment of the present invention being practiced in a cross-point buffer switch environment), and a second example which modifies the concepts and terminology introduced in FIG. 17 in a manner appropriate to input-buffered crossbar switch environment.

Referring now to FIG. 17, shown is an example of cross-point buffer switch 1700 responding to a particular state of events illustrated in pending packets requesting transmission diagram 1702. (Cross-point buffer switch 1700 is depicted in a slightly different format than that previously used to depict a cross-point buffer switch). Cross-point buffer switch 1700 is depicted as a 4×4 switch, having four ingresses 1704 and four egresses 1706, with each ingress-egress pair having associated with it a queue, denoted in FIG. 17 as Q first subscript, second subscript where "first subscript" equates to the queue's ingress number and where "second subscript" equates to the queue's egress number.

Shown in pending packets requesting transmission diagram 1702 is that there are two packets at ingress #1 requesting transmission. Depicted is that a first packet at ingress #1 is requesting transmission from the switch via egress #2, and that a second packet at ingress #1 is requesting transmission from the switch via egress #3. Illustrated is that there are two packets at ingress #2 requesting transmission. Shown is that a first packet at ingress #2 is requesting transmission from the switch via egress #2 and that a second packet at ingress #2 is requesting transmission from the switch via egress #4. Depicted is that there is one packet at ingress #3 requesting transmission from the switch via egress #1. Illustrated is that there is one packet at ingress #4 requesting transmission from the switch via egress #4.

Shown in Pending Request Pattern Matrix 1708 is that the fact that there are one or more pending packets requesting transmission, as illustrated in pending packets requesting transmission diagram 1702, can be illustrated in matrix form. In Pending Request Pattern Matrix 1708 the rows of the matrix represent ingress #1 through #4, while the columns of the matrix represent egress #1 through egress #4. The presence of a "1" within a particular row and column of Pending Request Pattern Matrix 1708 indicates that at least one packet is pending transmission (i.e. is queued) from the ingress to the egress denoted by the matrix entry. The presence of a "0" within a particular row and column of pending request matrix 1708 indicates that no packet is pending transmission (i.e. is queued) from the ingress to the egress denoted by the matrix entry. Consequently, shown in Pending Request Pattern Matrix 1708 is that column 4 has an entry of "1" in row #2—corresponding to the fact that at least one pending packet requesting transmission via egress #4 is queued at ingress #2, an entry of "1" in row #4—corresponding to the fact that at least one pending packet requesting transmission via egress #4 is queued at ingress #2, an entry of "0" in row #1—corresponding to the fact that no pending packets requesting transmission via egress #4 are queued at ingress #1, and an entry of "0" in row #3—corresponding to the fact that no pending packets requesting transmission via egress #4 are queued at ingress #3.

Likewise, illustrated in Pending Request Pattern Matrix 1708 is that column 3 has an entry of "1" in row #1—corresponding to the fact that it least one pending packet requesting transmission via egress #3 is queued at ingress #1, and has entries of "0" in the remaining rows (e.g., row #2, #3, and #4) of column 3—corresponding to the fact that no pending packets requesting transmission via egress #3 are queued at either ingress #2, #3, or #4. Further shown in Pending Request Pattern Matrix 1708 is that column 2 has an entry of "1" in row #1—corresponding to the fact that it least one pending packet requesting transmission via egress #2 is queued at ingress #1, an entry of "1" in row #2—corresponding to the fact that at least one pending packet requesting transmission via egress #2 is queued at ingress #2, and has entries of "0" in the remaining rows (e.g., row #2, and row #3)—corresponding to the fact that no pending packets requesting transmission die egress #2 are queued at either ingress #3, or #4.

Shown in near optimum candidates selected by schedulers diagram 1710, for sake of illustration, is a hypothetical illustration of a situation in which a first scheduler (not shown) running at egress #1 has determined that its near optimum candidate for transmission is queued at ingress #3, a second scheduler (not shown) running at egress #2 has determined that its near optimum candidate for transmission is queued at ingress #1, a third scheduler (not shown) running at egress #3 has determined that its near optimum candidate for transmission is queued at ingress # 1, and that a fourth scheduler (not shown) running at egress #4 has determined that its near optimum candidate for transmission is queued at ingress #2. The ingress locations of the hypothetical near optimal candidates for transmission associated with respective egresses are illustrated in near optimum candidates selected by schedulers diagram 1710 by arrows running from egresses to ingresses.

Candidate Ingress Queue-Egress Physical Connections Matrix 1712 illustrates in matrix form the desired ingress queue-egress physical connections necessary to affect the determined near optimum candidates for transmission shown pictographically in near optimum candidates selected by schedulers diagram 1710. The convention utilized in Candidate Ingress Queue-Egress Physical Connections Matrix 1712 is the similar to that utilized in Pending Request Pattern Matrix 1708. That is, columns 1 through 4 correspond to egresses #1 through #4, respectively, and rows 1 through 4 correspond to ingresses #1 through #4, respectively. A "1" entered in a row and column of Candidate Ingress Queue-Egress Physical Connections Matrix 1712 indicates that a candidate physical connection exists between the egress associated with the column and a queue at the ingress associated with the row in which the "1" appears. Notice that Candidate Ingress Queue-Egress Physical Connections Matrix 1712 shows a candidate ingress #1 queue-egress #2 physical connection, and a candidate ingress #1 queue-egress #3 physical connection.

Physical connection diagram 1714 illustrates pictographically hypothetical granted physical connections established prior to transmission of pending packets requesting transmission illustrated in near optimum candidates selected by schedulers diagram 1712. Shown in physical connection diagram 1714 is that a connection has been established between a queue at ingress #1 and egress #2, which indicates that the candidate ingress #1 queue-egress #2 physical connection shown in Candidate Ingress Queue-Egress Physical Connections Matrix 1712 has been granted. Depicted in physical connection diagram 1714 is that a connection has been established between a queue at ingress #1 and egress #3, which indicates that the candidate ingress #1 queue-egress #3 physical connection shown in Candidate Ingress Queue-Egress Physical Connections Matrix 1712 has been granted. Illustrated in physical connection diagram 1714 is that a connection has been established between a queue at ingress #2 and egress #4, which indicates that the candidate ingress #2 queue-egress #4 physical connection shown in Candidate Ingress Queue-Egress Physical Connections Matrix 1712 has been granted. Lastly, shown in physical connection diagram 1714 is that a connection has been established between a queue at ingress #3 and egress #1, which indicates that the candidate ingress #3 queue-egress #1 physical connection shown in Candidate Ingress Queue-Egress Physical Connections Matrix 1712 has been granted. It is to be understood that schedulers are running substantially independently and parallel at egress #1, #2, #3, and #4 such that all connections shown in physical connection diagram 1714 are established substantially simultaneously.

The physical connection pattern is illustrated in matrix form via Granted Ingress Queue-Egress Physical Connections Matrix 1716. The convention utilized in Granted Ingress Queue-Egress Physical Connections Matrix 1716 is the same utilized in Pending Request Pattern Matrix 1708. That is, columns 1 through 4 correspond to egresses #1 through #4, respectively, and rows 1 through 4 correspond to ingresses #1 through #4, respectively. A "1" entered in a row and column of Granted Ingress Queue-Egress Physical Connections Matrix 1716 indicates that a physical connection has been established between the respective ingress queue-egress pair indicated by the row and column of Granted Ingress Queue-Egress Physical Connections Matrix 1716.

Notice from the foregoing that the pattern composed of "1" and "0" shown in Candidate Ingress Queue-Egress Physical Connections Matrix 1712 is substantially the same as the pattern composed of "1" and "0" shown in Granted Ingress Queue-Egress Physical Connections Matrix 1716. This similarity between the two patterns arises from the fact that crosspoint buffer switch 1700 has a separate physical queue for each ingress queue-egress pair. The fact that each ingress queue-egress pair has an independently accessible separate physical queue allows the simultaneous physical connection of egress #2 with egress #2's respective physical queue associated with ingress #1, and egress #3 with egress #3's respective physical queue associated with ingress #1. This is not possible with a input-buffered crossbar switch, which gives rise to complications, as will now be shown.

Referring now to FIG. 18, depicted is an example of a crossbar switch 1800, having one input buffer 1801 per each ingress of crossbar switch 1800, where each switch ingress has associated with it a number of "queues". Crossbar switch 1800 is depicted as a 4×4 switch, having four ingresses 1804 and four egresses 1806, with each ingress-egress pair having associated with it a "queue" ("queue" is in quotes since the "queues" shown are not physically separate and independently accessible queues as denoted in cross-point switch 1700, but are rather logical partitions in a physical memory associated with each ingress—which means that only one "queue" per ingress can be physically accessed at any one time). The "queues" shown in FIG. 18 follow the same notation as that used in FIG. 17; that is, each queue is denoted as $Q_{first\ subscript,\ second\ subscript}$ where "first subscript" equates to the queue's ingress number and where "second subscript" equates to the queue's egress number.

In FIG. 18, input buffers 1801 are shown a distance apart from crossbar switch 1800 to make clear that only one "queue" implemented within such buffer can be accessed at any one time by an egress. However, it is to be understood that crossbar switch 1800 having input buffers 1801 accepts and buffers packets received over their respective ingresses 1804.

Depicted in FIG. 18 is that crossbar switch 1800 having input buffers 1801 is reacting to the same state of events as that shown in FIG. 17. That is, pending packets requesting transmission diagram 1802 is illustrated substantially identical to pending packets requesting transmission diagram 1702, except for the fact that ingresses 1804 and egresses 1806 shown are for crossbar switch 1800. Consequently, Pending Request Pattern Matrix 1808 is illustrated substantially identical to Pending Request Pattern Matrix 1708, except for the fact that ingresses 1804 and egresses 1806 referenced are for crossbar switch 1800. For the sake of illustration, shown also is that near optimum candidates selected by schedulers diagram 1810 is substantially identical to near optimum candidates selected by schedulers diagram 1710, except for the fact that the ingresses 1804 and egresses 1806 referenced are for crossbar switch 1800. Consequently, Candidate Ingress Queue-Egress Physical Connections Matrix 1812 is illustrated substantially identical to candidate ingress-egress physical connections matrix 1712, except for the fact that ingresses 1804 and egresses 1806 referenced are for crossbar switch 1800.

Note that even though near optimum candidates selected by schedulers diagram 1810 is depicted substantially identical to near optimum candidates selected by schedulers diagram 1710, and Candidate Ingress Queue-Egress Physical Connections Matrix 1812 is illustrated substantially identical to Candidate Ingress Queue-Egress Physical Connections Matrix 1712, the physical constraints of crossbar switch 1800 having input buffers 1801 make it physically impossible to have physical connections such as those illustrated in physical connection diagram 1714, and Granted Ingress Queue-Egress Physical Connections Matrix 1716, of FIG. 17. However, also note that the near optimum situation is that such simultaneous connection would be the near optimum situation. Thus, there is a contention between equally important requests for an egress port. It is necessary to resolve this contention.

Physical connection diagram 1814 illustrates pictographically a substantially different hypothetical physical connection than that shown in physical connection diagram 1714 of FIG. 17. In physical connection diagram 1814 the just-discussed contention has been resolved. Physical connection diagram 1814 shows physical connections established prior to granting and transmission of pending packets requesting transmission illustrated in pending packets requesting transmission diagram 1802. Shown in physical connection diagram 1814 is that a connection has been established between a queue at ingress #1 and egress #2, which indicates that the candidate ingress #1 queue-egress #2 physical connection shown in Candidate Ingress Queue-Egress Physical Connections Matrix 1812 has been granted. Depicted in physical connection diagram 1814 is that a connection has been between a queue at ingress #2 and egress #4, which indicates that the candidate ingress #2 queue-egress #4 physical connection shown in Candidate Ingress Queue-Egress Physical Connections Matrix 1812 has been granted. Lastly, shown in physical connection diagram 1814 is that a connection has been established between a queue at ingress #3 and egress #1, which indicates that the candidate ingress #3 queue-egress #1 physical connection shown in Candidate Ingress Queue-Egress Physical Connections Matrix 1812 has been granted. (It is to be understood that schedulers are running substantially independently and parallel at egress #1, #2, #3, and #4 such that all connections shown in physical connection diagram 1814 are established substantially simultaneously.)

The physical connection diagram 1814 is illustrated in matrix form via Granted Ingress Queue-Egress Physical Connections Matrix 1816. The convention utilized in Granted Ingress Queue-Egress Physical Connections Matrix 1816 is the same utilized in Granted Ingress Queue-Egress Physical Connections Matrix 1716. That is, columns 1 through 4 correspond to egresses #1 through #4, respectively, and rows 1 through 4 correspond to ingresses #1 through #4, respectively. A "1" entered in a row and column of Granted Ingress Queue-Egress Physical Connections Matrix 1816 indicates that a physical connection has been established between the respective ingress queue-egress pair indicated by the row and column and thus that the corresponding candidate physical connection between the corresponding ingress queue-egress pair illustrated in Candidate Ingress Queue-Egress Physical Connections Matrix 1812 has been granted.

Notice that unlike in the physical connection diagram of FIG. 17, illustrated in Granted Ingress Queue-Egress Physical Connections Matrix 1816 is that no connection has been granted between egress #3 and ingress #1—the contention with respect to ingress #1 having been resolved. Deciding how to resolve the contention between the two-equally valuable pending requests, while taking account of guaranteed minimum bandwidth and excess bandwidth constraints, requires a substantially different process than that described previously in relation to the cross-point switch. This substantially different process will now be discussed. In addition to the foregoing, the following described processes and devices make use of bandwidth counters, denoted $W_{ingress\_i,\_egress\_e}$, where the bandwidth counter is associated with an ingress i and an egress e. For substantially the same reasons as those discussed in relation to the cross-point buffer switch, above, it is important that the bandwidth counters associated with each ingress and egress be kept current. Accordingly, it is to be understood that substantially simultaneous with the following described processes and devices, processes are running at, or associated with, each egress which reset, or reinitialize, the bandwidth counters associated with each egress upon the expiration of a specified time interval associated with each egress. For example, a process analogous to that shown in FIG. 7 is to be understood to be running at and associated with a first egress of an input-buffered crossbar switch (e.g., egress #1 of input-buffered crossbar switch 1800), which updates the bandwidth counters associated with that first egress of the input-buffered crossbar switch and which are utilized by the processes and devices described below. Likewise, a process analogous to that shown in FIG. 10 is to be understood to be running at and associated with a second egress of an input buffered crossbar switch (e.g., egress #2 of input-buffered crossbar switch 1800), which updates the bandwidth counters associated with that second egress of the input-buffered crossbar switch and which are utilized by the processes and devices described below. It is to be understood that like processes are running at all egresses described below such that the bandwidth counters associated with each such egress are reinitialized, or kept current, upon the expiration of respective time intervals designated for each such egress.

Figure 19:
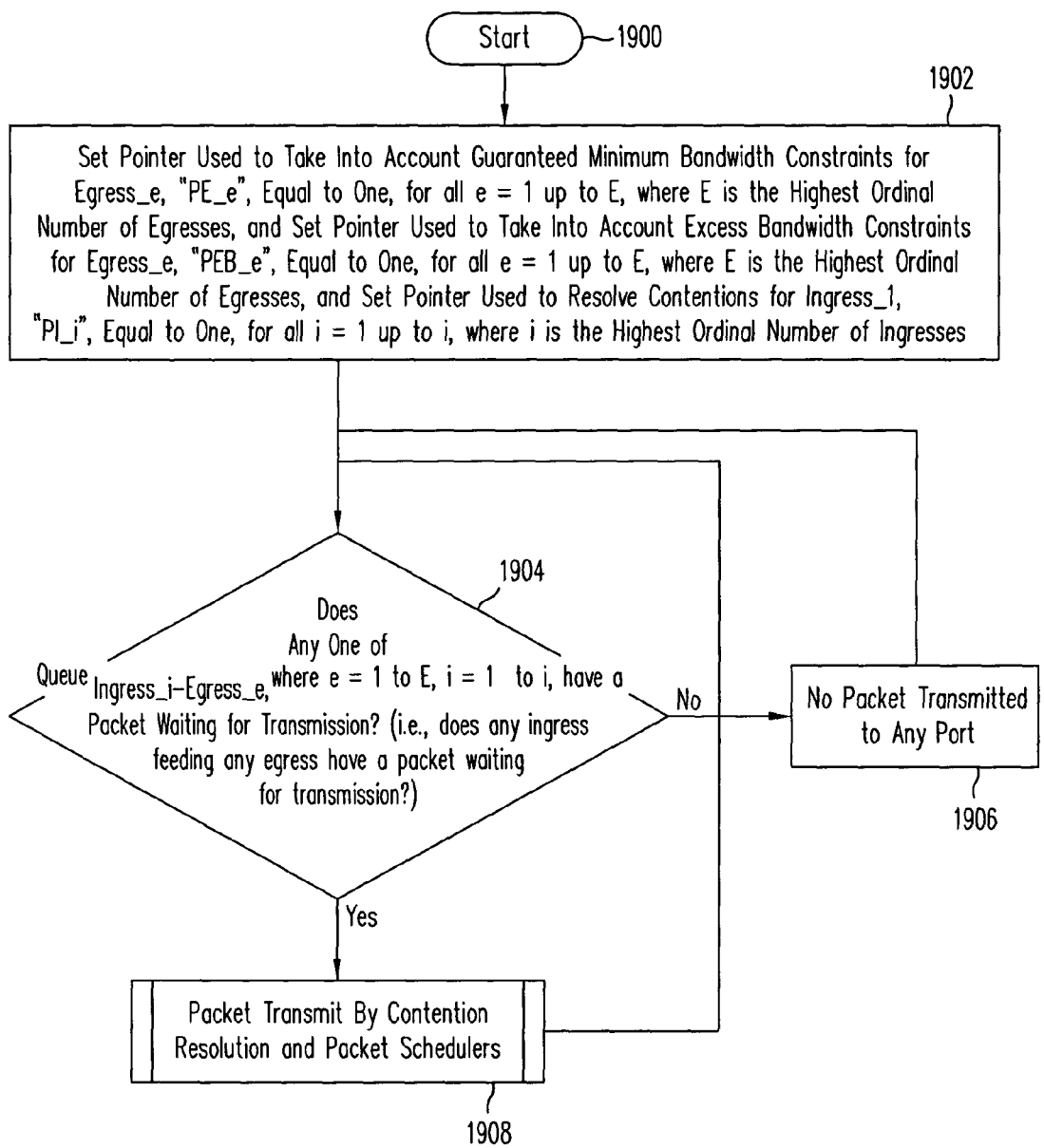
FIG. 19 shows a high-level logic flowchart illustrating a process which can be utilized with cross bar switches having input buffers.

With reference now to FIG. 19, shown is a high-level logic flowchart illustrating a process which can be utilized with cross bar switches having input buffers. Method step 1900 illustrates the start of the process. Method step 1902 shows the initialization of three different pointers: a pointer utilized to take into account guaranteed minimum bandwidth scheduler constraints for egress_e, "PE_e", is set equal to one for all e=1 up to E, where E has the value of the highest ordinal number of egresses from a particular crossbar switch (e.g., E would have value of four for crossbar switch 1800); a pointer utilized to take into account excess bandwidth scheduler constraints for Egress_e, "PEB_e", is set equal to one for all e=1 up to E, where E has the value of the highest ordinal number of egresses from a particular crossbar switch; and, a pointer utilized to resolve ingress contentions for ingress_i, "PI_i", is set equal to one for all i=1 up to I, where I has a value of the highest ordinal number of ingresses to a particular crossbar switch (e.g., I would have value of four for crossbar switch 1800). Thereafter, method step 1904 depicts that a determination is made as to whether any queue associated with any switch egress has a packet waiting for transmission; method step 1904 shows that this is achieved by checking whether any Queue$_{Ingress\_(i)-Egress\_(e)}$, where i can take on any value from 1 to I (i.e., highest ordinal number of ingresses into switch) and where e can take on any value from 1 to E (i.e., highest ordinal number of the egresses from switch). In the event that no queue has a packet waiting for transmission, the process proceeds to method step 1906 which shows that no packet is transmitted to any port. However, in the event that at least one queue has a packet waiting for transmission, the process proceeds to method step 1908 which shows the execution of a "packet transmit by contention resolution and transmit packet schedulers" process.

Figure 20:
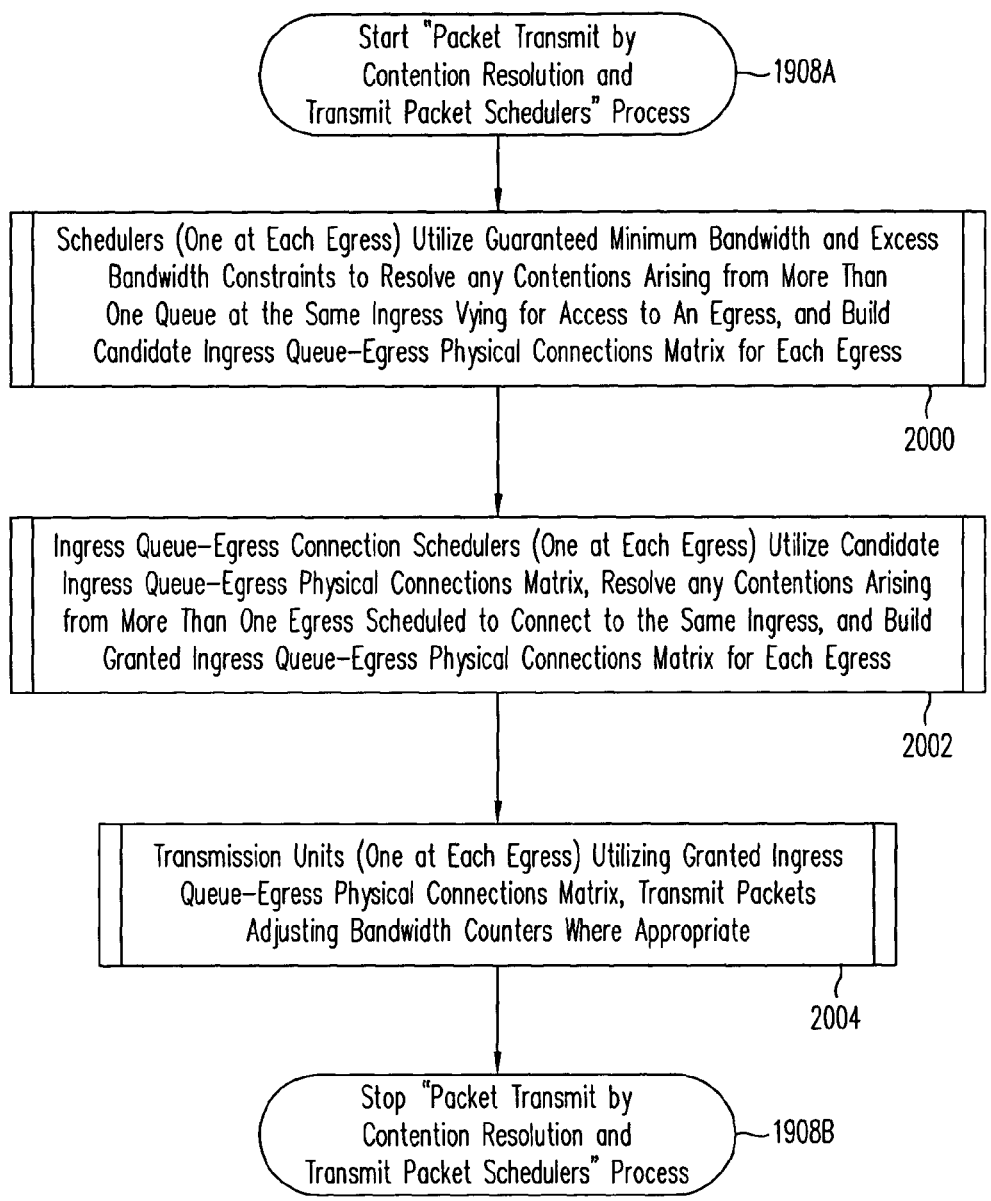
FIG. 20 shows an example of a "packet transmit by contention resolution and transmit packet scheduler" process.

Referring now to FIG. 20, shown is an example of a "packet transmit by contention resolution and transmit packet scheduler" process. Method step 1908A shows the start of "packet transmitted by contention resolution and transmit packets schedulers" process. Method step 2000 shows the engagement in a schedulers (one at each egress) utilize guaranteed minimum bandwidth and excess bandwidth constraints to resolve any contentions arising from more than one queue at the same ingress vying for access to an egress, and build Candidate Ingress Queue-Egress Physical Connections Matrix for each egress" process, which will essentially create, or build, Candidate Ingress Queue-Egress Physical Connections Matrix for a particular switch in question (e.g., a matrix such as Candidate Ingress Queue-Egress Physical Connections Matrix 1812 illustrated in FIG. 18) where the matrix built will indicate candidate physical connections between particular ingresses and particular egresses. Thereafter, as has been shown in the example of FIG. 18, it is possible and indeed likely that the created, or built, Candidate Ingress Queue-Egress Physical Connections Matrix will have more than one ingress contending for access to the same egress; consequently, method step 2002 depicts the engagement in an "ingress queue-egress connection schedulers (one at each egress) utilize Candidate Ingress Queue-Egress Physical Connections Matrix, resolve any contentions arising from more than one egress scheduled to connect to the same ingress, and build Granted Ingress Queue-Egress Physical Connections Matrix for each egress" process whereby any contentions such as those illustrated in near optimum candidates selected by schedulers diagram 1810 of FIG. 18 are resolved and physical connections, analogous to those illustrated in physical connection diagram 1814 of FIG. 18, are granted.

Subsequent to the establishment of the appropriate physical connections necessary to transmit the granted candidates, method step 2004 shows that a "transmission units (one at each egress), utilizing Granted Ingress Queue-Egress Physical Connections Matrix, transmit packets adjusting bandwidth counters as appropriate" process is engaged in. Thereafter, the process proceeds to method step 1908B which depicts the end of the "packet transmit by contention resolution and transmit packet schedulers" process.

Figure 21A:
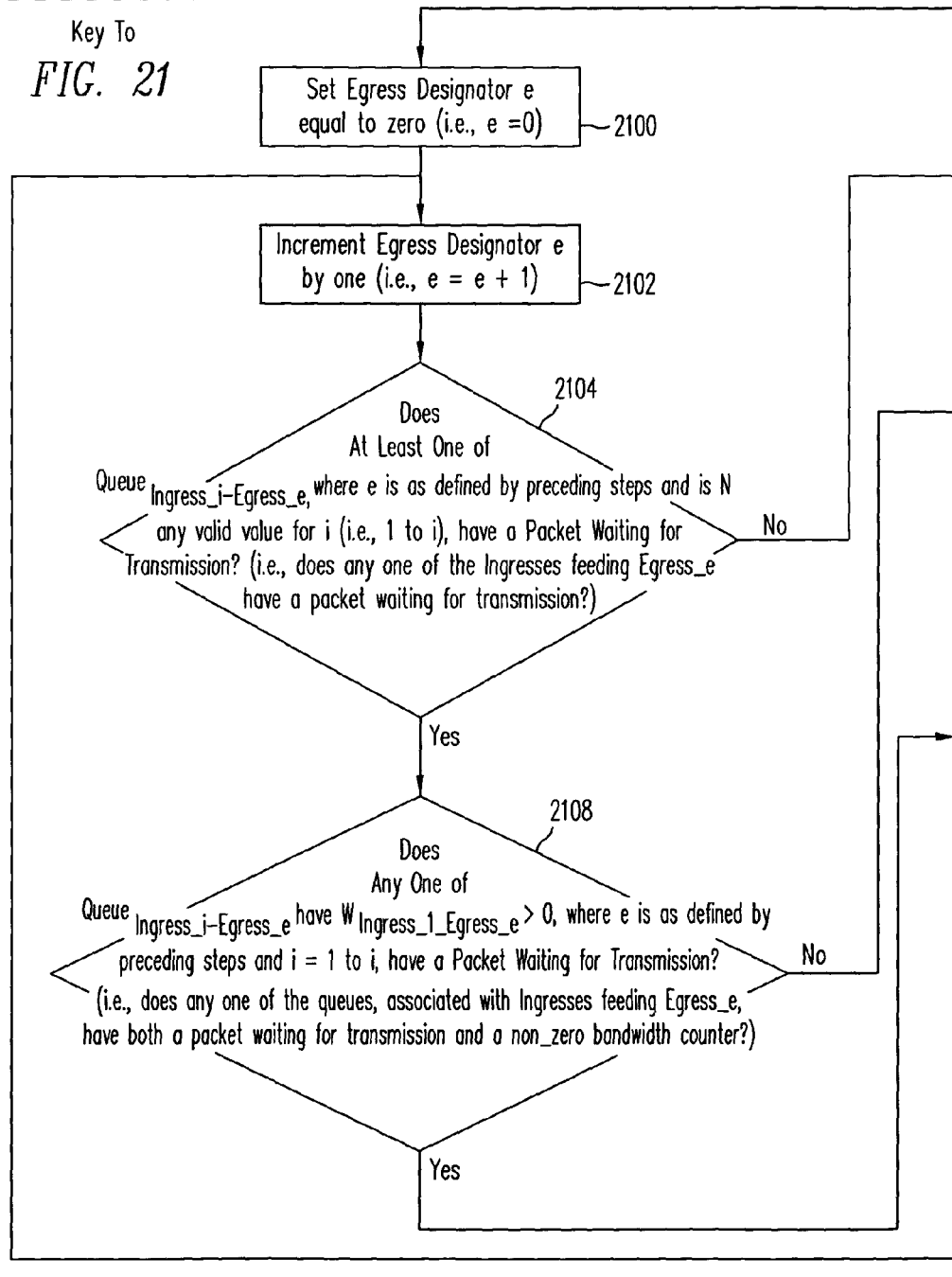
FIG. 21 shows an example of the "schedulers (one at each egress) utilize guaranteed minimum bandwidth and excess bandwidth constraints to resolve any contentions arising from more than one queue at the same ingress vying for access to an egress, and build Candidate Ingress Queue-Egress Physical Connections Matrix for each egress" process referenced in method step 2000.
Figure 21B:
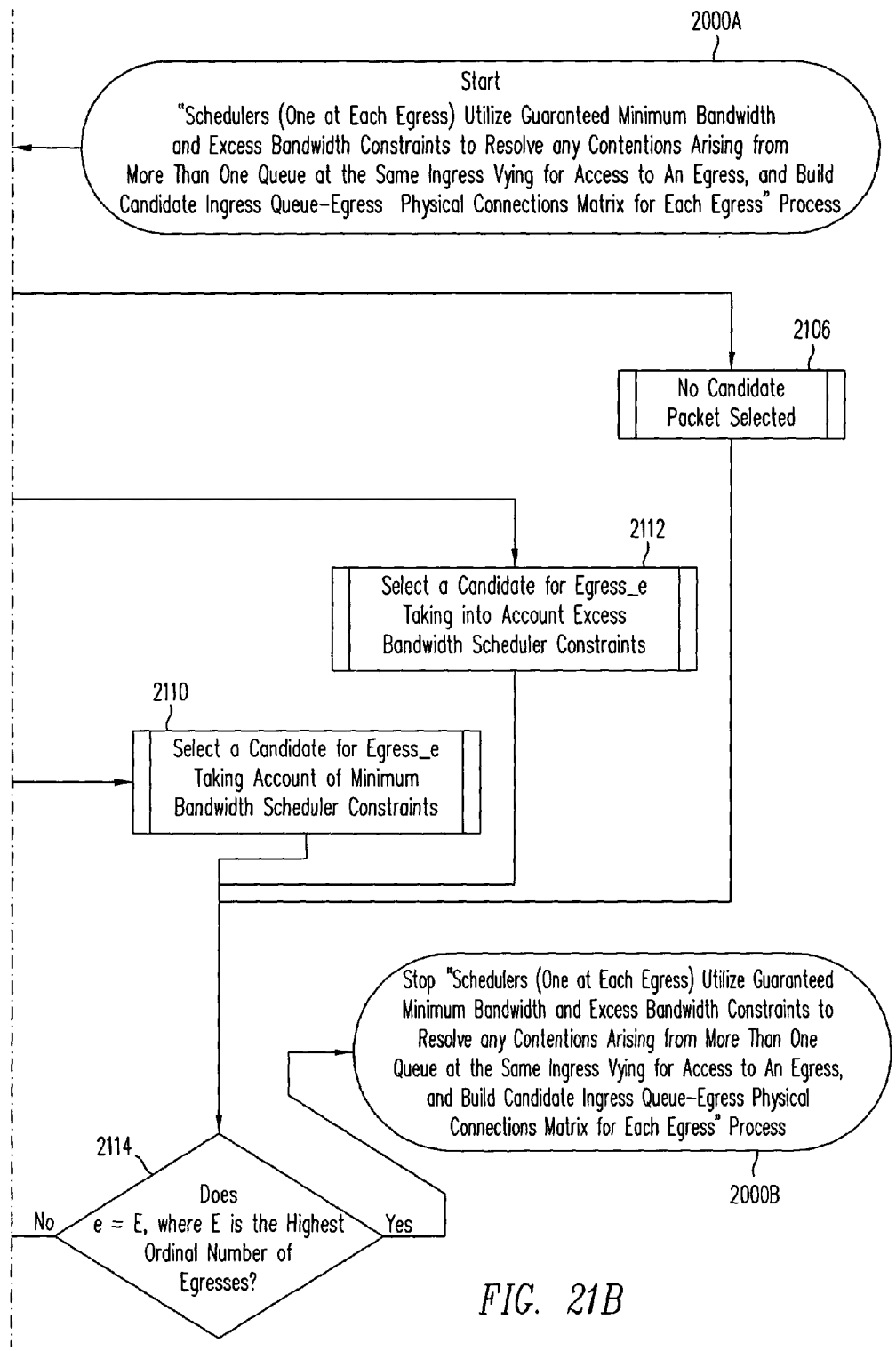

With reference now to FIG. 21, shown is an example of the "schedulers (one at each egress) utilize guaranteed minimum bandwidth and excess bandwidth constraints to resolve any contentions arising from more than one queue at the same ingress vying for access to an egress, and build Candidate Ingress Queue-Egress Physical Connections Matrix for each egress" process referenced in method step 2000. Method step 2000A depicts the start of the example of the "schedulers (one at each egress) utilize guaranteed minimum bandwidth and excess bandwidth constraints to resolve any contentions arising from more than one queue at the same ingress vying for access to an egress, and build Candidate Ingress Queue-Egress Physical Connections Matrix for each egress" process referenced in method stop 2000. Method step 2100 shows that an Egress Designator variable, "e", is initialized equal to zero (0). Thereafter, method step 2102 depicts that the egress designator variable "e" is incremented by one (1).

Method step 2104 illustrates the inquiry as to whether any queue associated with any ingress feeding the egress denoted by egress designator e has a packet waiting for transmission, which is illustrated as being accomplished by examining all $\text{Queue}_{Ingress\_i-Egress\_e}$ where e is the current value of egress designator e and i can take on any valid value from one to the highest ordinal number of ingresses I (e.g., in relation to the crossbar switch shown in FIG. 18, the highest ordinal number of ingresses I would be four (4), while in relation to the crossbar switch shown in FIG. 18, the highest ordinal number of ingresses I would be three (3)). If the inquiry illustrated in method step 2104 shows that no queue associated with any ingress feeding the egress denoted by egress designator e has a packet waiting for transmission, the process proceeds to method step 2106 which shows the engagement in a "no candidate packet selected" process which is discussed in detail below but which essentially builds the column of Ingress-Egress associated with Egress_e in such a fashion that it is apparent that there are to be no candidate Ingress-Egress connections associated with Egress e. Thereafter, the process proceeds to method step 2114.

Method step 2114 depicts the inquiry of whether e is equal to the greatest ordinal number of egresses, E, which indicates that all egresses have been examined in which case the process proceeds to method step 2000B which shows the end of the example of the "schedulers (one at each egress) utilize guaranteed minimum bandwidth and excess bandwidth constraints to resolve any contentions arising from more than one queue at the same ingress vying for access to an egress, and build Candidate Ingress Queue-Egress Physical Connections Matrix for each egress" process referenced in method stop 2000.

If the inquiry illustrated in method step 2104 shows that at least one queue associated with any ingress feeding the egress denoted by egress designator e has a packet waiting for transmission, the process proceeds to method step 2108 which depicts an inquiry of whether any one of $\text{Queue}_{Ingress\_i-Egress\_e}$, associated with any ingress feeding the egress denoted by egress designator e (i.e., Egress_e), having a packet waiting for transmission also has a non-zero bandwidth counter. If the inquiry illustrated in method step 2108 shows that at least one of $\text{Queue}_{Ingress\_i-Egress\_e}$, associated with any ingress feeding the egress denoted by egress designator e (i.e., Egress_e), having a packet waiting for transmission also has a non-zero bandwidth counter then it is known that the potential ingress candidate selection for Egress_e must take into account guaranteed minimum bandwidth concerns for one or more ingresses associated with Egress_e, and consequently the process proceeds to method step 2110 which shows the engagement in a "Select a Candidate for Egress_e Taking Into Account Minimum Bandwidth Scheduler Constraints" process, discussed in more detail below. Thereafter, the process proceeds to method step 2114 and continues from that point.

If the inquiry illustrated in method step 2104 shows that no queue associated with any ingress feeding the egress denoted by egress designator e has a packet waiting for transmission, then it is known that the potential ingress candidate selection for Egress_e need not take into account guaranteed minimum bandwidth concerns for one or more ingresses associated with Egress_e, and consequently the process proceeds to method step 2112 which shows the engagement in a "Select a Candidate for Egress_e Taking Into Account Excess Bandwidth Scheduler Constraints" process. Thereafter, the process proceeds to method step 2114 and continues from that point.

Figure 22:
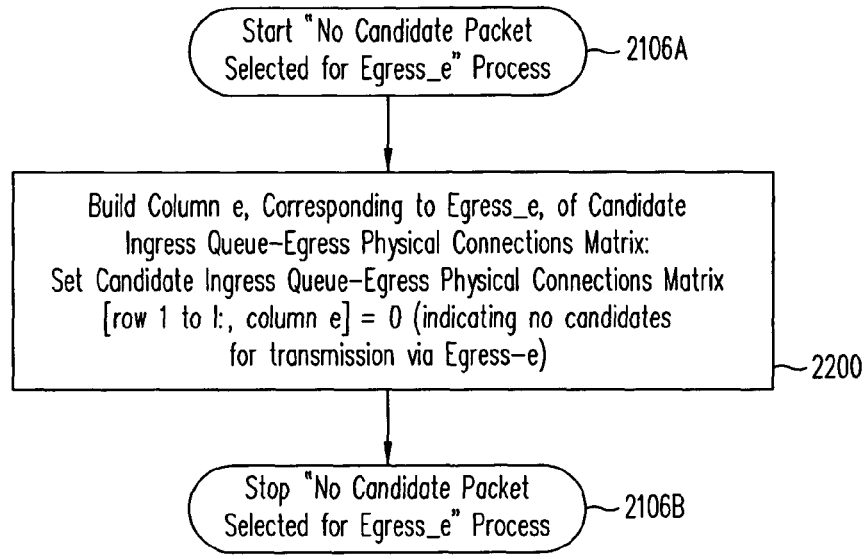
FIG. 22 depicts an example of the "no candidate packet selected" process referenced in method step 2106.

Referring now to FIG. 22, depicted is an example of the "no candidate packet selected" process referenced in method step 2106. Method step 2106A illustrates the start of the example of the "no candidate packet selected" process reference in method step 2106. Method step 2200 shows the building or construction of column e of Candidate Ingress Queue-Egress Physical Connections Matrix, which is utilized to denoted the candidate Ingress physical connection(s) associated with Egress_e, which is depicted as setting all row entries of column e of Candidate Ingress Queue-Egress Physical Connections Matrix to zero (0). Thereafter, the process proceeds to method step 2106B which illustrates the end of the example of the "no candidate packet selected" process reference in method step 2106.

Figure 23:
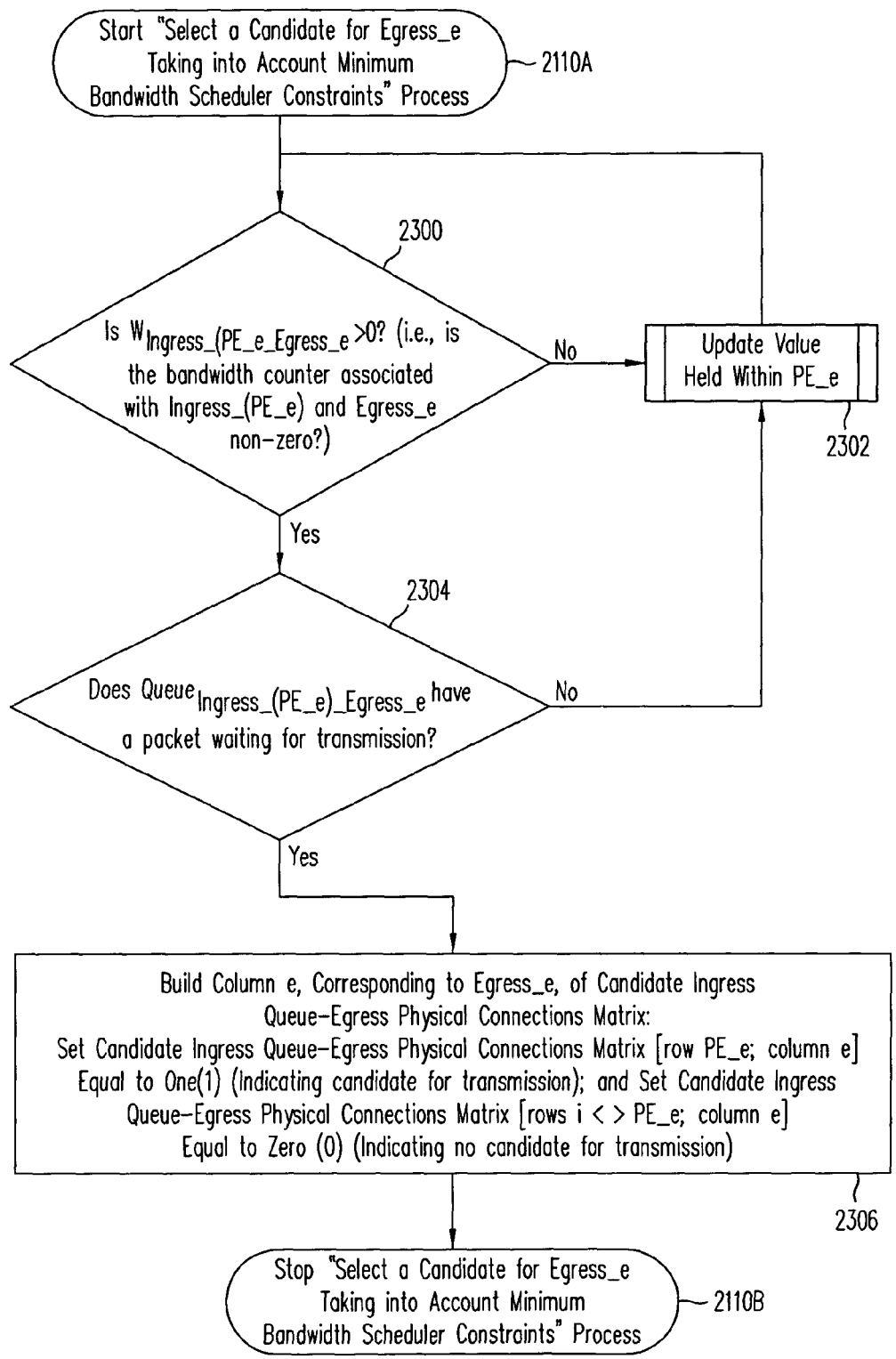
FIG. 23 illustrates an example of the "Select a Candidate for Egress_e Taking Into Account Minimum Bandwidth Scheduler Constraints" process referenced in method step 2110.

With reference now to FIG. 23, illustrated is an example of the "Select a Candidate for Egress_e Taking Into Account Minimum Bandwidth Scheduler Constraints" process referenced in method step 2110. Method step 2110A shows the start of the example of the "Select a Candidate for Egress_e Taking Into Account Minimum Bandwidth Scheduler Constraints" process referenced in method step 2110. Method step 2300 shows the inquiry of whether $W_{Ingess\_(PE\_e\_)\_Egress\_e}$, the bandwidth counter associated with Ingress_(PE_e)_Egress_e is non-zero (the notation used means that bandwidth counter associated with Ingress 3 feeding Egress 2 if e has value equal to two (2) and pointer PE_2 contains value equal to 3). In the event that the inquiry depicted in method step 2300 shows that $W_{Ingess\_(PE\_e\_)\_Egress\_e}$, the bandwidth counter associated with Ingress_(PE_e)_Egress_e is zero, it is known that the ingress denoted by the value of PE_e has had its guaranteed minimum bandwidth satisfied; consequently, the process proceeds to method step 2302 which shows the engagement in an "update value of PE_e" process, which is explained in more detail below, but which essentially increments the value held within PE_e (note that it is the value held within pointer PE_e that is being incremented—e is NOT being incremented at this point) so that PE_e is now pointing at the next ingress associated with Egress_e. Thereafter, the process proceeds to method step 2300.

In the event that the inquiry depicted in method step 2300 shows that $W_{Ingess\_(PE\_e\_)\_Egress\_e}$, the bandwidth counter associated with Ingress_(PE_e)_Egress_e is non-zero, it is known that the ingress denoted by the value of PE_e has NOT had its guaranteed minimum bandwidth satisfied; consequently, the process proceeds to method step 2304 which shows the engagement in an inquiry as to whether there is actually a packet waiting for transmission in the queue associated with Ingress_(PE_e)-Egress_e (this step is necessary in that it is possible that one of the ingresses feeding Egress_e might actually have a non-zero bandwidth counter but not have a packet awaiting transmission at this particular point in time). In the event that the inquiry depicted in method step 2304 which shows that there is no packet waiting for transmission in the queue associated with Ingress_(PE_e)-Egress_e the process proceeds to method step 2302 and engages in the "update value of PE_e" process, which essentially increments the value held within PE_e (note that it is the value held within pointer PE_e that is being incremented—e is NOT being incremented at this point) so that PE_e is now pointing at the next ingress associated with Egress_e. Thereafter, the process proceeds to method step 2300.

In the event that the inquiry depicted in method step 2304 which shows that there is a packet waiting for transmission in the queue associated with Ingress_(PE_e)-Egress_e the process proceeds to method step 2306, wherein is shown the building or construction of column e of Candidate Ingress Queue-Egress Physical Connections Matrix, which is utilized to denote the candidate Ingress physical connection(s) associated with Egress_e, where such construction or building is depicted as setting the row entry PE_e of column e of Candidate Ingress Queue-Egress Physical Connections Matrix to one (1) to indicate that Ingress_(PE_e) is an Ingress which has yet to have its access, or guaranteed minimum bandwidth requirements, with respect to Egress_e satisfied. Thereafter, the process proceeds to method step 2110B which illustrates the end of the example of the "Select a Candidate for Egress_e Taking Into Account Minimum Bandwidth Scheduler Constraints" process referenced in method step 2110.

Notice that even though an ingress has been selected as a candidate for possible physical connection to Egress_e, no adjustment subtraction from the bandwidth counter associated with the selected ingress has been done. The reason for this is that the fact that a particular input-buffered crossbar switch (e.g., crossbar switch 1800) can only connect to one ingress at a time, so the fact that an ingress has a packet deserving of immediate transmission does not mean that the packet will be transmitted. Whether or not it will be transmitted depends upon the ultimate actions by a contention resolution process described below, and thus the adjustment of the bandwidth counter must be deferred until a decision is made as to which candidate connections will be made and which queues actually will have packets transmitted.

Figure 24:
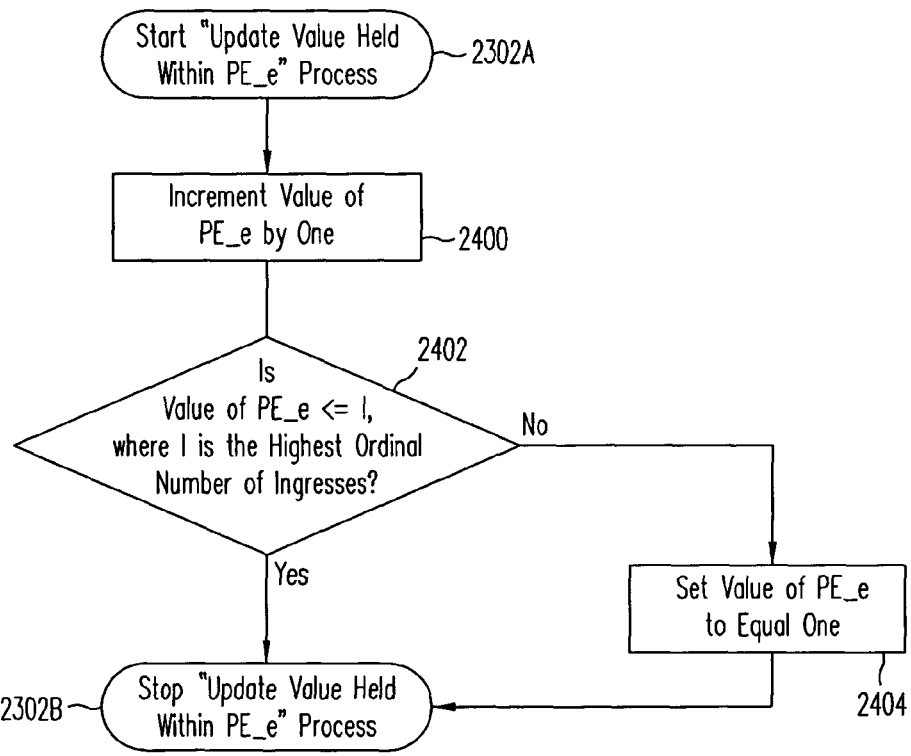
FIG. 24 shows an example of the "update value held within pointer PE_e" process referenced in method step 2302.

Referring now to FIG. 24, shown is an example of the "update value held within pointer PE_e" process referenced in method step 2302. Method step 2302A shows the start of the example of the "update value held within pointer PE_e" process referenced in method step 2302. Method step 2400 depicts that the value of (or held within) pointer PE_e is incremented by one (1) (again, realize that it is the value of PE_e that is being incremented—e is not being incremented). Thereafter, method step 2402 depicts the inquiry as to whether the value of PE_e is greater than I, where I is the highest ordinal number of ingresses. In the event that the inquiry of method step 2402 indicates that the value of PE_e is greater than I, where I is the highest ordinal number of ingresses, the process proceeds to method step 2404 which illustrates that the value of PE_e is set equal, or reinitialized, to one (1). Thereafter, the process proceeds to method step 2302B which shows the end of the example of the "update value held within pointer PE_e" process referenced in method step 2302.

Figure 25:
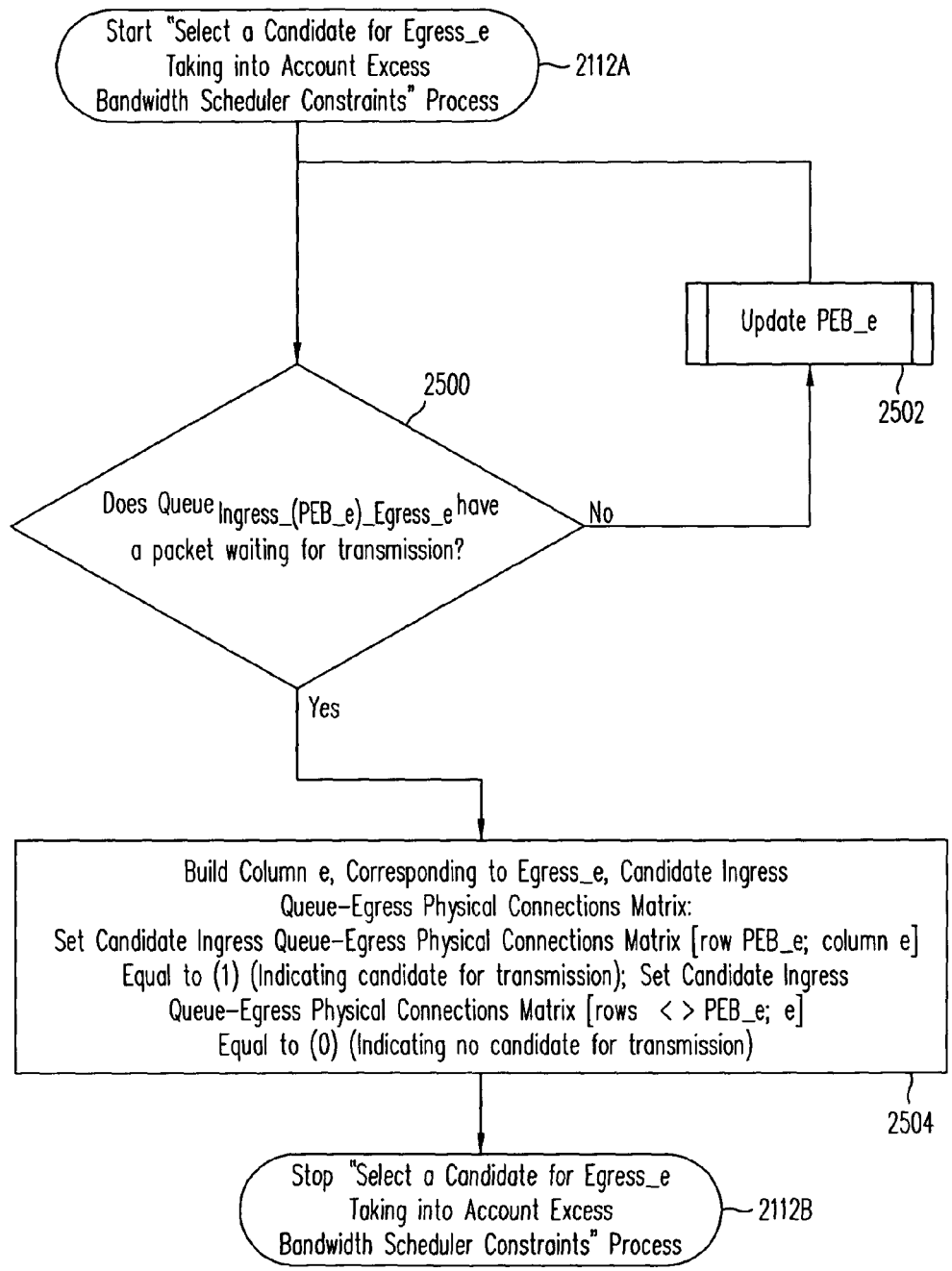
FIG. 25 depicts an example of the "Select a Candidate for Egress_e Taking Into Account Excess Bandwidth Scheduler Constraints" process referenced in method step 2112.

With reference now to FIG. 25, depicted is an example of the "Select a Candidate for Egress_e Taking Into Account Excess Bandwidth Scheduler Constraints" process referenced in method step 2112. Method step 2112A illustrates the start of the example the "Select a Candidate for Egress_e Taking Into Account Excess Bandwidth Scheduler Constraints" process referenced in method step 2112.

Method step 2500 shows the inquiry of whether Queue$_{Ingess\_(PEB\_e)\_Egress\_e}$ has a packet waiting for transmission (the notation used means that the queue being examined will be that associated with Ingress_1 feeding Egress_3 if e has value equal to three (3) and pointer PEB_3 contains value equal to one (1)). In the event that the inquiry depicted in method step 2500 shows that Q$_{Ingess\_(PEB\_e)\_Egress\_e}$, the queue associated with Ingress_(PEB_e)_Egress_e does not have a packet waiting for transmission, the process proceeds to method step 2502 which shows the engagement in an "update value of PEB_e" process, which is explained in more detail below, but which essentially increments the value held within PEB_e (note that it is the value held within pointer PEB_e that is being incremented—e is NOT being incremented at this point) so that PEB_e is now pointing at the next ingress associated with Egress_e. Thereafter, the process proceeds to method step 2500.

In the event that the inquiry depicted in method step 2500 shows that Q$_{Ingess\_(PEB\_e)\_Egress\_e}$, the queue associated with Ingress_(PE_e)_Egress_e, does have a packet waiting for transmission, the process proceeds to method step 2504 which shows the building or construction of column e of Candidate Ingress Queue-Egress Physical Connections Matrix, which is utilized to denote the candidate Ingress physical connection(s) associated with Egress_e, where such construction or building is depicted as setting the row entry PEB_e of column e of Candidate Ingress Queue-Egress Physical Connections Matrix to one (1) to indicate that Ingress_(PEB_e) is a potential candidate for connection with respect to Egress_e satisfied. Thereafter, the process proceeds to method step 2112B which illustrates the end of the example the "Select a Candidate for Egress_e Taking Into Account Excess Bandwidth Scheduler Constraints" process referenced in method step 2112.

Figure 26:
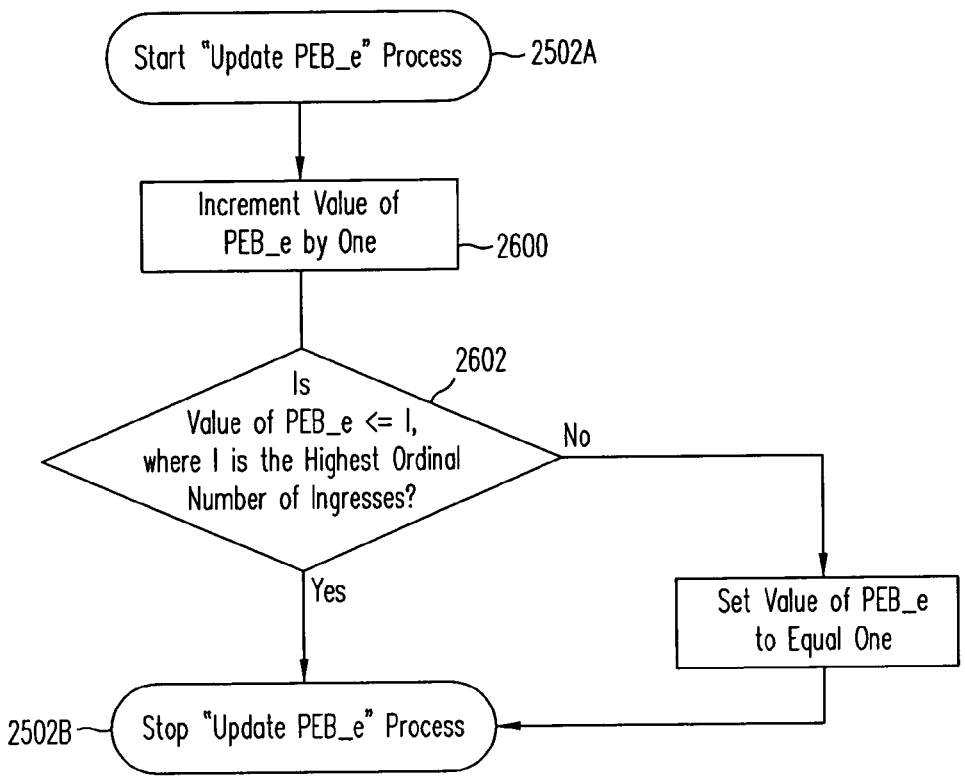
FIG. 26 shows an example of the "update value held within PEB_e" process referenced in method step 2502.

Referring now to FIG. 26, shown is an example of the "update value held within PEB_e" process referenced in method step 2502. Method step 2502A shows the start of the example of the "update value held within pointer PEB_e" process referenced in method step 2502. Method step 2600 depicts that the value of (or held within) pointer PEB_e is incremented by one (1) (again, realize that it is the value of PEB_e that is being incremented—e is not being incremented). Thereafter, method step 2602 depicts the inquiry as to whether the value of PEB_e is greater than I, where I is the highest ordinal number of ingresses. In the event that the inquiry of method step 2602 indicates that the value of PEB_e is greater than I, where I is the highest ordinal number of ingresses, the process proceeds to method step 2604 which illustrates that the value of PEB_e is set equal, or reinitialized, to one (1). Thereafter, the process proceeds to method step 2502B which shows the end of the example of the "update value held within pointer PEB_e" process referenced in method step 2502.

Figure 27A:
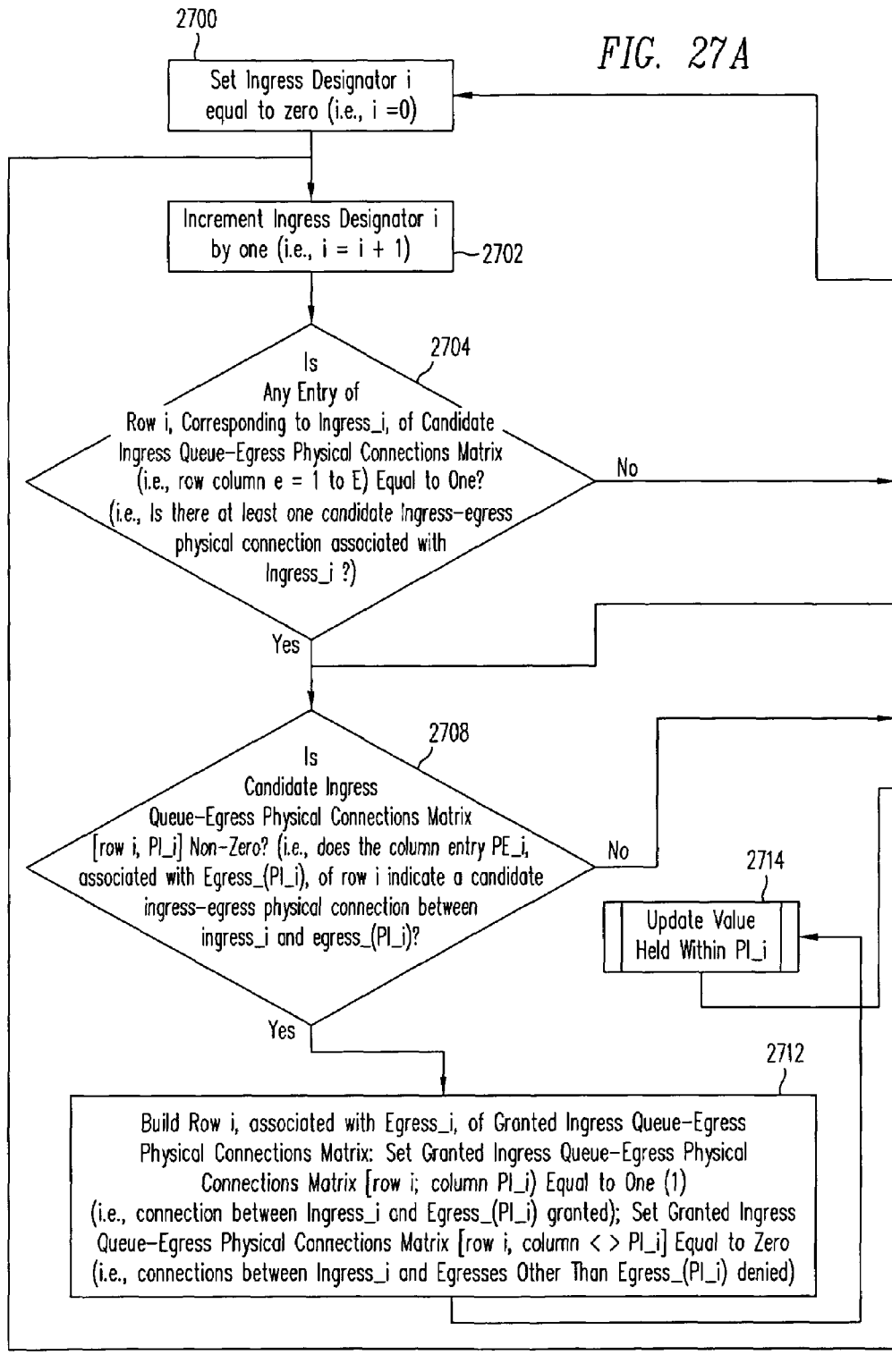
FIG. 27 shows an example of the "ingress queue-egress connection schedulers (one at each egress) utilize Candidate Ingress Queue-Egress Physical Connections Matrix, resolve any contentions arising from more than one egress scheduled to connect to the same ingress, and build Granted Ingress Queue-Egress Physical Connections Matrix for each egress" process referenced in method step 2002.

With reference now to FIG. 27, shown is an example of the "ingress queue-egress connection schedulers (one at each egress) utilize Candidate Ingress Queue-Egress Physical Connections Matrix, resolve any contentions arising from more than one egress scheduled to connect to the same ingress, and build Granted Ingress Queue-Egress Physical Connections Matrix for each egress" process referenced in method step 2002. Method step 2002A depicts the start of the example of the "ingress queue-egress connection schedulers (one at each egress) utilize Candidate Ingress Queue-Egress Physical Connections Matrix, resolve any contentions arising from more than one egress scheduled to connect to the same ingress, and build Granted Ingress Queue-Egress Physical Connections Matrix for each egress" process referenced in method step 2002. Method step 2700 illustrates that ingress designator, "i," is initialized equal to zero (0). Method step 2702 shows that ingress designator i is incremented by one (1).

Method step 2704 depicts the inquiry as to whether any entry of row i of Candidate Ingress Queue-Egress Physical Connections Matrix is non-zero, which is indicative of the fact that the ingress associated with row i (e.g., Ingress_i) has a packet which needs to be preferably immediately transmitted over an Egress associate with Ingress_i. In the event that the inquiry illustrated in method step 2704 shows that at least one entry of row i of Candidate Ingress Queue-Egress Physical Connections Matrix is non-zero, it is known that the ingress associated with row i (e.g., Ingress_i) has a packet which needs to be preferably immediately transmitted over an Egress associated with Ingress_i. At this point, since it is known that Candidate Ingress Queue-Egress Physical Connections Matrix was constructed on a column-by-column basis, it is also known that it is possible that more than one entry of row i is non-zero, which in practical terms means that the ingress associated with row i of the Candidate Ingress Queue-Egress Physical Connections Matrix (e.g., Ingress_i) has packets waiting for transmission in different queues which give rise to a need to simultaneously connect the different queues at Ingress_i to more than one egress. However, as has been discussed, in a input-buffered crossbar switch (e.g., crossbar switch 1800 having input buffers) such simultaneous connection of two or more queues at one ingress with two or more egresses is not possible. Thus, this contention needs to be resolved.

One way in which this contention can be resolved is to cycle through the row entries of row i and grant the first candidate connection encountered in a way which will now be illustrated. Method step 2708 depicts the inquiry as to whether column entry PI_i of row i of Candidate Ingress Queue-Egress Physical Connections Matrix is non-zero. If the inquiry illustrated in method step 2708 indicates that the column entry PI_i of row i of Candidate Ingress Queue-Egress Physical Connections Matrix is zero, it is known that no candidate connection with respect to the egress associated with column PI_i of Candidate Ingress Queue-Egress Physical Connections Matrix exists, and thus the process proceeds to method step 2710 which shows the engagement in an "update the value of PI_i" process, which will be explained in detail below but which essentially increments the value held within PI_i (note that it is the value held within PI_i which is updated—it is not incremented in this step). Thereafter, the process proceeds to method step 2716 which shows the determination of whether i is equal to I, which is the highest ordinal number of Ingresses. In the event that the inquiry depicted in method step 2716 shows that i does equal I, the process proceed to method step 2002B, which shows the end of the example of the "ingress queue-egress connection schedulers (one at each egress) utilize Candidate Ingress Queue-Egress Physical Connections Matrix, resolve any contentions arising from more than one egress scheduled to connect to the same ingress, and build Granted Ingress Queue-Egress Physical Connections Matrix for each egress" process referenced in method step 2002.

If the inquiry illustrated in method step 2708 indicates that the column entry PI_i of row i of Candidate Ingress Queue-Egress Physical Connections Matrix is non-zero, it is known that a candidate connection with respect to the egress associated with column PI_i of Candidate Ingress Queue-Egress Physical Connections Matrix exists, and thus the process proceeds to method step 2712 which shows the creation, or building, of row i of Granted Ingress Queue-Egress Physical Connections Matrix (i.e., the row corresponding the granted physical connection with Ingress_i which is associated with row i of the Candidate Ingress Queue-Egress Physical Connections Matrix), which is depicted as being achieved by setting to one (1) the row i column PI_i entry of the Granted Ingress Queue-Egress Physical Connections Matrix (where the setting of the entry to one indicates that the candidate connection between Ingress_i and Egress_(PI_i) has been granted) and setting to zero the rest of the row entries of row i where the columns do not equal PI_i (where the setting to zero of the other row entries means that any other candidate connections for Ingress_i have been denied—thus resolving any contentions associated with Ingress_i). Thereafter, the process proceeds to method step 2714 which shows the engagement in an "update the value of PI_i" process, which will be explained in detail below but which essentially increments the value held within PI_i (note that it is the value held within PI_i which is updated—it is not incremented in this step). Thereafter, the process proceeds to method step 2716.

Returning now to the inquiry of method step 2704, in the event that the inquiry illustrated in method step 2704 shows that no entry of row i of Candidate Ingress Queue-Egress Physical Connections Matrix is non-zero, it is known that the ingress associated with row i (e.g., Ingress_i) does not have a packet which needs to be preferably immediately transmitted over an Egress associated with Ingress_i. Accordingly, the process proceeds to method step 2706, which depicts that all entries of row i of Granted Ingress Queue-Egress Physical Connections Matrix are set equal to zero (where the setting of the entry to zero indicates that no physical connection between Ingress_i, associated with row i, and Egress_1 through Egress_E, associated with column 1 through E of the Granted physical connection matrix, has been granted). Thereafter, the process proceeds to method step 2716 and continues from that point.

Subsequent to method step 2002B, it is known what candidate physical connections, which were illustrated by the non-zero entries contained within Candidate Ingress Queue-Egress Physical Connections Matrix, have actually been granted. The actual physical connections granted are now illustrated by the non-zero entries contained within Granted Physical Connections Matrix.

It was mentioned above that the adjustment of bandwidth counters had to wait until contention were resolved and physical connections granted. Insofar as the foregoing has now been done, it is possible to transmit the pending packets of the established or granted physical connections, and adjust the bandwidth counters as appropriate. These operations referenced in method step 2004 and will be illustrated in FIG. 29, below.

Figure 28:
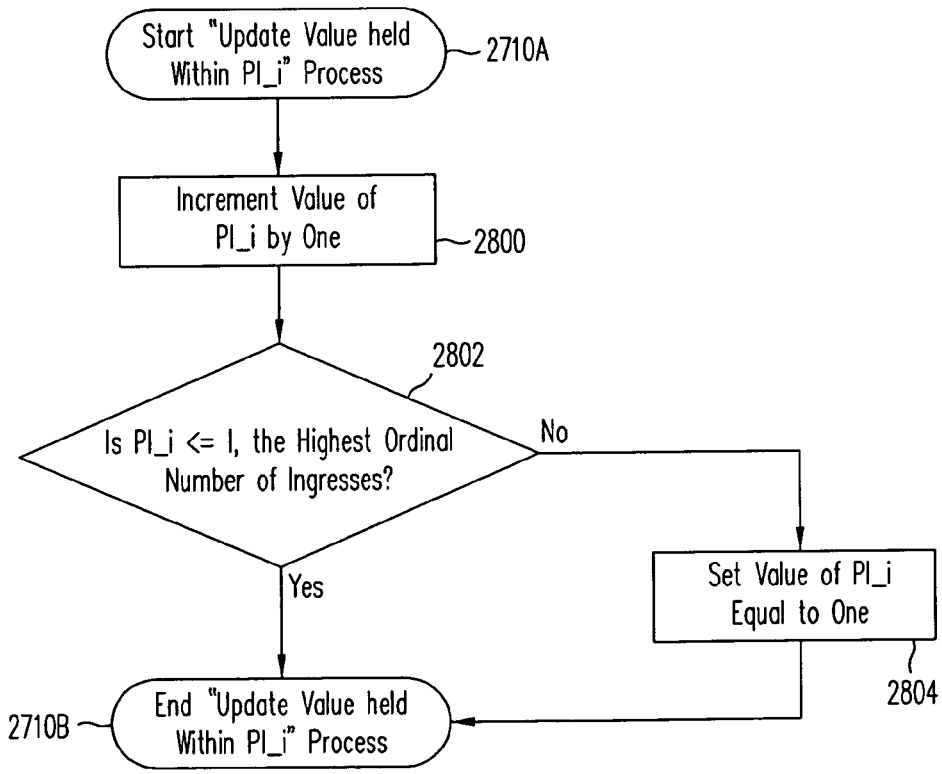
FIG. 28 shows an example of the "update value held within PI_i" process referenced in method steps 2714 and 2710.
Figure 29A:
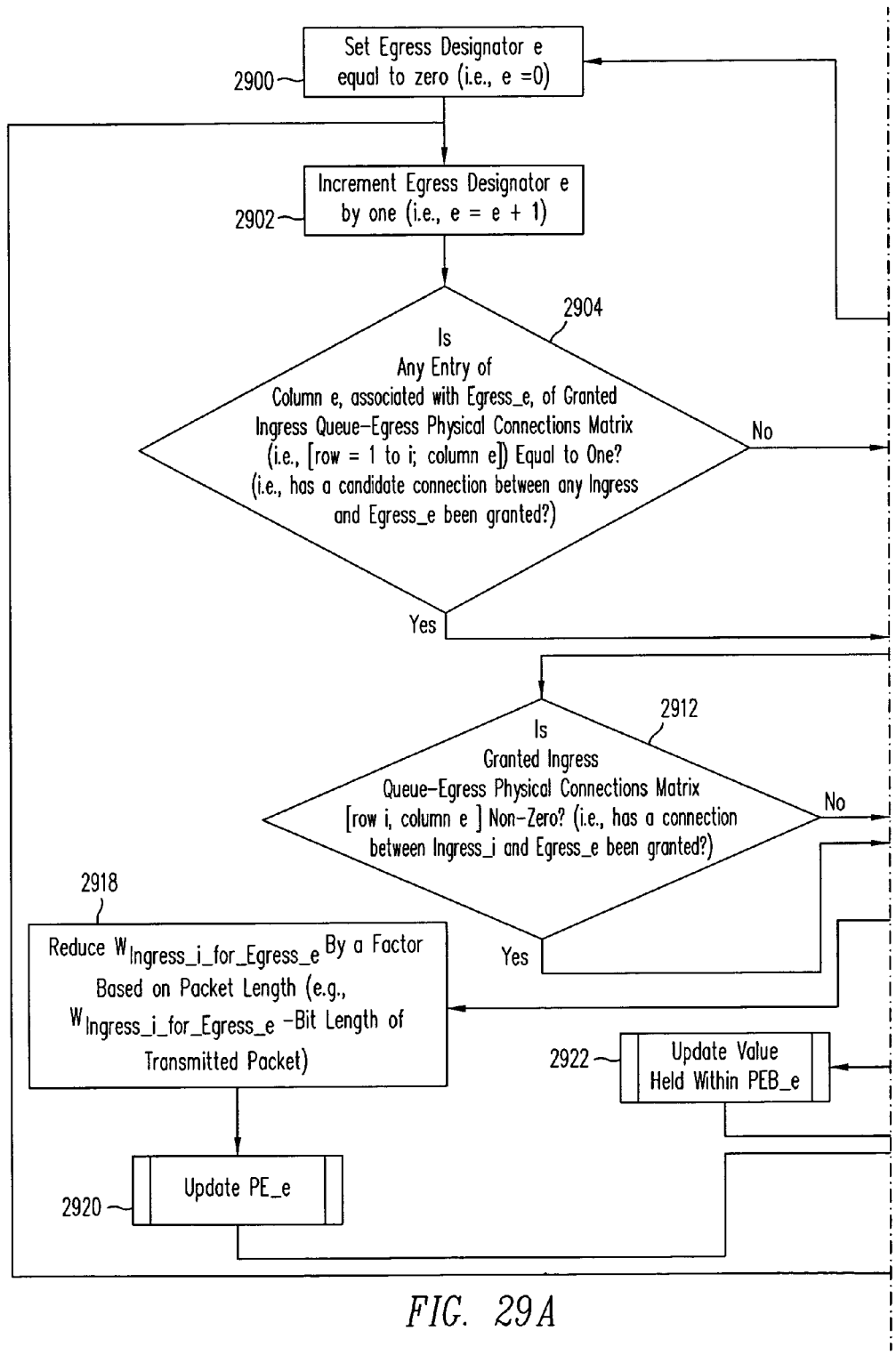
FIG. 29 shows an example of the "transmission units (one at each egress), utilizing Granted Ingress Queue-Egress Physical Connections Matrix, transmit packets adjusting bandwidth counters as appropriate" process referenced in method step 2004.

Referring now to FIG. 28, shown is an example of the "update value held within PI_i" process referenced in method steps 2714 and 2710. Method step 2710A shows the start of the example of the "update value held within PI_i" process referenced in method steps 2714 and 2710. Method step 2800 depicts that the value of (or held within) pointer PI_i is incremented by one (1) (again, realize that it is the value of PI_i that is being incremented—i is not being incremented). Thereafter, method step 2802 depicts the inquiry as to whether the value of PI_i is greater than I, where I is the highest ordinal number of ingresses. In the event that the inquiry of method step 2802 indicates that the value of PI_i is greater than I, where I is the highest ordinal number of ingresses, the process proceeds to method step 2804 which illustrates that the value of PI_i is set equal, or reinitialized, to one (1). Thereafter, the process proceeds to method step 2710B which shows the end of the example of the "update value held within PI_i" process referenced in method steps 2714 and 2710. With reference now to the FIG. 29, shown is an example of the "transmission units (one at each egress), utilizing Granted Ingress Queue-Egress Physical Connections Matrix, transmit packets adjusting bandwidth counters as appropriate" process referenced in method step 2004. Method step 2004A depicts the start of the example of the "transmission units (one at each egress), utilizing Granted Ingress Queue-Egress Physical Connections Matrix, transmit packets adjusting bandwidth counters as appropriate" process referenced in method step 2004. Method step 2900 illustrates that egress designator e is set, or initialized, equal to zero. Method step 2902 shows that egress designator e is incremented by one (1).

Method step 2904 depicts the inquiry as to whether any entry of Granted Ingress Queue-Egress Physical Connections Matrix within column e (i.e., the column associated with Egress_e) is non-zero, which indicates that a physical connection exists over which a packet is to be transmitted. In the event that the inquiry illustrated in method step 2904 shows that no entry of Granted Ingress Queue-Egress Physical Connections Matrix within column e (i.e., the column associated with Egress_e) is non-zero, it is known that no physical connection exists over which a packet is to be transmitted over Egress_e, and consequently the process proceeds to method step 2906 which depicts that no packet is transmitted over Egress_e. Thereafter, the process proceeds to method step 2924 wherein is illustrated that inquiry as to whether e is equal to E, the highest ordinal number of egresses.

In the event that the inquiry of shown in method step 2924 indicates that e is equal to E, the highest ordinal number of egresses, the process proceeds to method step 2004B, which shows the end of the example of the "transmission units (one at each egress), utilizing Granted Ingress Queue-Egress Physical Connections Matrix, transmit packets adjusting bandwidth counters as appropriate" process referenced in method step 2004. However, in the event that the inquiry shown in method step 2924 indicates that e is not equal to E, the highest ordinal number of egresses, the process proceeds to method step 2902 and proceeds from that point.

Returning to the inquiry shown in method step 2904, in the event that the inquiry illustrated in method step 2904 shows that at least one entry of Granted Ingress Queue-Egress Physical Connections Matrix within column e (i.e., the column associated with Egress_e) is non-zero, it is known that a physical connection exists over which a packet is to be transmitted over Egress_e, and consequently the process proceeds to method step 2908 which depicts that ingress designator i is set, or initialized, equal to zero (0). Thereafter, method step 2910 illustrates that ingress designator i is incremented by one.

Method step 2912 shows the inquiry as to whether row i, corresponding to Ingress_i, and column e, corresponding to Egress_e, of Granted Ingress Queue-Egress Physical Connections Matrix has a non-zero (e.g., 1) entry, in which case it is known that a physical connection has been granted between Ingress_i and Egress_e. In the event that the inquiry depicted in method step 2912 shows row i, corresponding to Ingress_i, and column e, corresponding to Egress_e, of Granted Ingress Queue-Egress Physical Connections Matrix contain a non-zero (e.g., 1) entry, it is known that a physical connection has been granted between Ingress_i and Egress_e; accordingly, the process proceeds to method step 2914 wherein is illustrated that a packet is transmitted from $Q_{Ingess\_i-Egress\_e}$. Thereafter, method step 2916 shows the inquiry as to whether the bandwidth counter, $W_{Ingress\_i\_Egress\_e}$, associated with the ingress from which the packet was transmitted in method step 2914 is greater than zero, in which case the process proceeds to method step 2918 which shows that that the bandwidth counter $W_{Ingress\_i\_Egress\_e}$, associated with the ingress from which the packet was transmitted in method step 2914 is decreased by a factor based on packet length (again, as was discussed in relation to the processes applicable to crosspoint buffer switches above, a short-cut approach can be used to adjust the bandwidth counter when each packet transmitted is of the same fixed length; that is, the bandwidth counter will be specified as a whole number of packets to be transmitted during the interval T and thus each time a packet is transmitted the number one (1) is merely subtracted from the bandwidth counter). Thereafter, the process proceeds to method step 2920, which shows the engagement in an "update the value contained in pointer PE_e" process, which was described in detail, above. Subsequently, the process proceeds to method step 2924 and proceeds from that point.

In the event that the inquiry depicted in method step 2916 shows that the bandwidth counter, $W_{Ingress\_i\_Egress\_e}$, associated with the ingress from which the packet was transmitted in method step 2914 is NOT greater than zero, the process proceeds to method step 2922 which shows the engagement in an "update the value contained in pointer PEB_e" process, which was described in detail, above. Subsequently, the process proceeds to method step 2924 and proceeds from that point.

The foregoing detailed description set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention is implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles.

What is claimed is:

1. A system, comprising:

a plurality of ingress queues, wherein each ingress queue is configured to buffer packets received via a respective one of a plurality of ingresses for output via a respective one of a plurality of egresses; and a plurality of schedulers coupled to the plurality of ingress queues and the plurality of egresses, wherein each scheduler is associated with a respective one of the plurality of egresses and configured to select one of the plurality of ingress queues as a candidate ingress queue for connecting to the respective one of the plurality of egresses, wherein if more than one of the plurality of schedulers select candidate ingress queues associated with a same ingress of the plurality of ingresses, the plurality of schedulers is configured to only connect one of the candidate ingress queues associated with the same ingress to any of the plurality of egresses.

2. The system of claim 1, wherein each of the plurality of schedulers is configured to select the candidate ingress queue for connecting to the respective one of the plurality of egresses dependent on information indicating whether a minimum bandwidth has been provided at each of the plurality of ingress queues associated with the respective one of the plurality of egresses.

3. The system of claim 2, wherein the one of the plurality of ingress queues selected by one of the plurality of schedulers has a queued packet for transmission via the respective one of the plurality of egresses and is indicated as not having been provided the minimum bandwidth; and the one of the plurality of schedulers is configured to select the one of the plurality of ingress queues indicated as not having been provided the minimum bandwidth as the candidate ingress queue before selecting a different one of the plurality of ingress queues that includes a queued packet for transmission via the respective one of the plurality of egresses and is indicated as already having been provided the minimum bandwidth.

4. A system, comprising:

a plurality of ingress queues, wherein each ingress queue is configured to buffer packets received via a respective one of a plurality of ingresses for output via a respective one of a plurality of egresses;

a scheduler coupled to the plurality of ingress queues and the plurality of egresses, wherein the scheduler is configured to select one of the plurality of ingress queues as a candidate ingress queue for connecting to one of the plurality of egresses dependent on information indicating whether a minimum bandwidth has been provided at each of the plurality of ingress queues; and a transmission unit, wherein the transmission unit is associated with the respective one of the plurality of egresses, and in response to transmitting data via a connection between the respective one of the plurality of egresses and the one of the plurality of ingress queues, the transmission unit is configured to modify the information indicating whether the minimum bandwidth has been provided at the one of the plurality of ingress queues.

5. The system of claim 4, wherein the one of the plurality of ingress queues has a queued packet for transmission via one of the plurality of egresses and is indicated as not having been provided the minimum bandwidth; and the scheduler is configured to select the one of the plurality of ingress queues indicated as not having been provided the minimum bandwidth as the candidate ingress queue before selecting a different one of the plurality of ingress queues that includes a queued packet for transmission via the one of the plurality of egresses and is indicated as already having been provided the minimum bandwidth.

6. The system of claim 5, wherein the scheduler is configured to select the one of the plurality of ingress queues indicated as not having been provided the minimum bandwidth before selecting the different one of the plurality of ingress queues even if a higher priority packet is queued in the different one of the plurality of ingress queues than in the one of the plurality of ingress queues.

7. The system of claim 4, further comprising:

a plurality of schedulers, wherein each one of the plurality of schedulers is configured to select one of the plurality of ingress queues as a candidate ingress queue for connecting to a respective one of the plurality of egresses with which that one of the plurality of schedulers is associated.

8. The system of claim 7, wherein if the information indicating whether the minimum bandwidth has been provided at each of the plurality of ingress queues indicates that at least one ingress queue associated with a particular egress of the plurality of egresses has not been provided the minimum bandwidth, one of the plurality of schedulers associated with the particular egress is configured to use a set of minimum bandwidth constraints to select the candidate ingress queue for connecting to the particular egress.

9. The system of claim 8, wherein if the information indicating whether the minimum bandwidth has been provided at each of the plurality of ingress queues indicates that all ingress queues associated with the particular egress have been provided the minimum bandwidth, the one of the plurality of schedulers associated with the particular egress is configured to use a set of excess bandwidth constraints to select the candidate ingress queue for connecting to the particular egress.

10. The system of claim 7, wherein each one of the plurality of schedulers is configured to use the information indicating whether the minimum bandwidth has been provided at each of the plurality of ingress queues to resolve contentions between ones of the plurality of ingress queues that include queued packets for transmission via the respective one of the plurality of egresses with which that one of the plurality of schedulers is associated.

11. The system of claim 7, wherein the plurality of schedulers is further configured to determine whether more than one of the plurality of schedulers has selected an ingress queues associated with a same ingress.

12. The system of claim 11, wherein if more than one of the plurality of schedulers selects an ingress queue associated with a same ingress, the plurality of schedulers is configured to only allow one of the more than one of the plurality of schedulers to schedule a connection between a respective candidate ingress queue and a respective egress.

13. The system of claim 7, wherein
each of the plurality of schedulers is configured to build a respective column of a candidate ingress queue-egress connections matrix in response to selecting one of the plurality of ingress queues as the candidate ingress queue.

14. The system of claim 13, further comprising:
a plurality of ingress queue-egress connection schedulers configured to build a granted ingress queue-egress connections matrix dependent on the candidate ingress queue-egress connections matrix, wherein
the granted ingress queue-egress connections matrix indicates which of the plurality of ingress queues will be granted connections to one of the plurality of egresses.

15. The system of claim 4, wherein
the information indicating whether the minimum bandwidth has been provided at each one of the plurality of ingress queues is maintained in a plurality of bandwidth counters; and
each of the plurality of bandwidth counters is associated with a respective one of the plurality of ingresses and a respective one of the plurality of egresses.

16. The system of claim 15, wherein
each of the plurality of bandwidth counters is configured to store a value representing a relationship between an actual amount of data, transmitted from the respective one of the plurality of ingresses to the respective one of the plurality of egresses during a given amount of time, and a target minimum amount of data transmission from the respective one of the plurality of ingresses to the respective one of the plurality of egresses.

17. The system of claim 15, wherein
one of the plurality of bandwidth counters is reset upon the expiration of a time interval associated with a respective one of the plurality of egresses.

18. The system of claim 4, wherein
if the minimum bandwidth has been provided to all of the plurality of ingress queues, the scheduler is configured to select candidate ingress queues dependent on a set of excess bandwidth constraints.

19. The system of claim 4, further comprising:
a plurality of schedulers, wherein
each scheduler is associated with a respective one of the plurality of egresses, and
if more than one scheduler selects an ingress queue associated with a same one of the plurality of ingresses, all but one of the more than one schedulers is configured to wait for the connection.

20. The system of claim 4, wherein
ingress queues associated with a same one of the plurality of ingresses are not accessible independently of each other.

21. A system, comprising:
a plurality of ingress buffers, wherein each of the plurality of ingress buffers is configured to store packets received via a respective one of a plurality of ingresses; and
a plurality of schedulers coupled to the plurality of ingress buffers, wherein:
each of the plurality of schedulers is associated with a respective one of a plurality of egresses and configured to select one of a plurality of ingress buffers from which to transfer a packet in response to information indicating whether a minimum amount of data transmission per unit time has been provided from each of the plurality of ingress buffers to each of the plurality of egresses; and
the plurality of schedulers is configured to resolve a conflict that arises if more than one of the plurality of schedulers selects a same one of the plurality of ingress buffers.

22. A computer readable medium, comprising computer executable program instructions to:
select one of a plurality of ingress queues as a candidate ingress queue for connecting to one of a plurality of egresses dependent on information indicating whether a minimum bandwidth has been provided at each of the plurality of ingress queues, wherein
each of the plurality of ingress queues is configured to buffer packets received via a respective one of a plurality of ingresses for output via a respective one of a plurality of egresses,
the one of the plurality of ingress queues has a queued packet for transmission via one of the plurality of egresses and is indicated as not having been provided the minimum bandwidth, and
select the one of the plurality of ingress queues indicated as not having been provided the minimum bandwidth as the candidate ingress queue before selecting a different one of the plurality of ingress queues that includes a queued packet for transmission via the one of the plurality of egresses and is indicated as already having been provided the minimum bandwidth.

23. The computer readable medium of claim 22, wherein
the program instructions are executable to select the one of the plurality of ingress queues indicated as not having been provided the minimum bandwidth before selecting the different one of the plurality of ingress queues even if a higher priority packet is queued in the different one of the plurality of ingress queues than in the one of the plurality of ingress queues.

24. The computer readable medium of claim 22, wherein
the program instructions are executable to implement a plurality of schedulers, wherein
each one of the plurality of schedulers is configured to select one of the plurality of ingress queues as a candidate ingress queue for connecting to a respective one of the plurality of egresses with which that one of the plurality of schedulers is associated.

25. The computer readable medium of claim 24, wherein
if the information indicating whether the minimum bandwidth has been provided at each of the plurality of ingress queues indicates that at least one ingress queue associated with a particular egress of the plurality of egresses has not been provided the minimum bandwidth, one of the plurality of schedulers associated with the particular egress is configured to use a set of minimum bandwidth constraints to select a candidate ingress queue for connecting to the particular egress.

26. The computer readable medium of claim 24, wherein
the program instructions are executable to resolve a conflict that arises if more than one of the plurality of schedulers has selected an ingress queues associated with a same ingress.

27. The computer readable medium of claim 22, wherein
in response to data being transmitted via a connection between a one of the plurality of egresses and one of the plurality of ingress queues, the program instructions are executable to modify the information indicating whether the minimum bandwidth has been provided at the one of the plurality of ingress queues.

28. The computer readable medium of claim 22, wherein the program instructions are executable to maintain the information indicating whether the minimum bandwidth has been provided at each one of the plurality of ingress queues in a plurality of bandwidth counters; and each of the plurality of bandwidth counters is associated with a respective one of the plurality of ingresses and a respective one of the plurality of egresses.

29. The computer readable medium of claim 28, wherein each of the plurality of bandwidth counters is configured to store a value representing a relationship between an actual amount of data, transmitted from the respective one of the plurality of ingresses to the respective one of the plurality of egresses during a given amount of time, and a target minimum amount of data transmission from the respective one of the plurality of ingresses to the respective one of the plurality of egresses.

30. The computer readable medium of claim 28, wherein the program instructions are executable to reset one of the plurality of bandwidth counters upon the expiration of a time interval associated with the respective one of the plurality of egresses.

31. A computer readable medium, comprising computer executable program instructions to:
track whether a minimum amount of data transmission per unit time has occurred for each of a plurality of ingress-egress pairs;
schedule a candidate connection between one of the plurality of ingress-egress pairs that has not been provided the minimum amount of data transmission per unit of time before scheduling a candidate connection between one of the plurality of ingress-egress pairs that has been provided the minimum amount of data transmission per unit time; and
grant the candidate connection if no other candidate connections have been scheduled for ingress-egress pairs including the same ingress as the one of the plurality of ingress-egress pairs.

32. A method, comprising:
selecting one of a plurality of ingress queues as a candidate ingress queue for connecting to one of a plurality of egresses dependent on information indicating whether a minimum bandwidth has been provided at each of the plurality of ingress queues, wherein
each of the plurality of ingress queues is configured to buffer packets received via a respective one of a plurality of ingresses for output via a respective one of the plurality of egresses; and
selecting the one of the plurality of ingress queues as the candidate ingress queue before selecting a different one of the plurality of ingress queues, wherein the one of the plurality of ingress queues includes a queued packet for transmission via one of the plurality of egresses and is indicated as not having been provided the minimum bandwidth, and
the different one of the plurality of ingress queues includes a queued packet for transmission via the one of the plurality of egresses and is indicated as already having been provided the minimum bandwidth.

33. The method of claim 32, wherein said selecting comprises:
selecting the one of the plurality of ingress queues indicated as not having been provided the minimum bandwidth before selecting the different one of the plurality of ingress queues even if a higher priority packet is queued in the different one of the plurality of ingress queues than in the one of the plurality of ingress queues.

34. The method of claim 32, further comprising:
each of a plurality of schedulers selecting one of the plurality of ingress queues as a candidate ingress queue for connecting to a respective one of the plurality of egresses with which that one of the plurality of schedulers is associated.

35. The method of claim 34, further comprising:
if the information indicating whether the minimum bandwidth has been provided at each of the plurality of ingress queues indicates that at least one ingress queue associated with a particular egress of the plurality of egresses has not been provided the minimum bandwidth, one of the plurality of schedulers associated with the particular egress using a set of minimum bandwidth constraints to select a candidate ingress queue for connecting to the particular egress.

36. The method of claim 34, further comprising:
resolving a conflict that arises if more than one of the plurality of schedulers has selected an ingress queues associated with a same ingress.

37. The method of claim 32, further comprising:
in response to data being transmitted via a connection between a one of the plurality of egresses and one of the plurality of ingress queues, modifying the information indicating whether the minimum bandwidth has been provided at the one of the plurality of ingress queues.

38. The method of claim 32, further comprising:
maintaining the information indicating whether the minimum bandwidth has been provided at each one of the plurality of ingress queues in a plurality of bandwidth counters; wherein:
each of the plurality of bandwidth counters is associated with a respective one of the plurality of ingresses and a respective one of the plurality of egresses.

39. The method of claim 38, further comprising:
each of the plurality of bandwidth counters storing a value representing a relationship between an actual amount of data, transmitted from the respective one of the plurality of ingresses to the respective one of the plurality of egresses during a given amount of time, and a target minimum amount of data transmission from the respective one of the plurality of ingresses to the respective one of the plurality of egresses.

40. The method of claim 38, further comprising:
resetting one of the plurality of bandwidth counters upon the expiration of a time interval associated with the respective one of the plurality of egresses.

41. A method, comprising:
tracking whether a minimum amount of data transmission per unit time has occurred for each of a plurality of ingress-egress pairs;
scheduling a candidate connection between one of the plurality of ingress-egress pairs that has not been provided the minimum amount of data transmission per unit of time before scheduling a candidate connection between one of the plurality of ingress-egress pairs that has been provided the minimum amount of data transmission per unit time; and
granting the candidate connection if no other candidate connections have been scheduled for ingress-egress pairs including the same ingress as the one of the plurality of ingress-egress pairs.

* * * * *